(12) United States Patent
Kakii

(10) Patent No.: US 7,584,351 B2
(45) Date of Patent: Sep. 1, 2009

(54) METHOD OF TRANSFERRING DIGITAL CERTIFICATE, APPARATUS FOR TRANSFERRING DIGITAL CERTIFICATE, AND SYSTEM, PROGRAM, AND RECORDING MEDIUM FOR TRANSFERRING DIGITAL CERTIFICATE

(75) Inventor: Hiroshi Kakii, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 908 days.

(21) Appl. No.: 11/030,157

(22) Filed: Jan. 7, 2005

(65) Prior Publication Data

US 2005/0204164 A1 Sep. 15, 2005

(30) Foreign Application Priority Data

Jan. 9, 2004 (JP) ............................. 2004-004722
Dec. 13, 2004 (JP) ............................. 2004-360615

(51) Int. Cl.
*H04L 29/06* (2006.01)
(52) U.S. Cl. .................. 713/157; 713/156; 713/169; 713/175; 713/176; 713/177; 713/178; 709/225
(58) Field of Classification Search ................ 709/225; 713/156–158, 175–178, 169
See application file for complete search history.

(56) References Cited

U.S. PATENT DOCUMENTS

| | | | | |
|---|---|---|---|---|
| 6,301,659 B1* | 10/2001 | Micali | ......................... | 713/158 |
| 6,442,688 B1* | 8/2002 | Moses et al. | ................. | 713/158 |
| 6,487,658 B1* | 11/2002 | Micali | ......................... | 713/158 |
| 6,671,803 B1* | 12/2003 | Pasieka | ....................... | 713/156 |
| 6,816,900 B1* | 11/2004 | Vogel et al. | ................... | 709/225 |
| 7,290,133 B1* | 10/2007 | Montgomery | ................ | 713/156 |
| 2003/0088771 A1* | 5/2003 | Merchen | ...................... | 713/175 |
| 2004/0093493 A1* | 5/2004 | Bisbee et al. | ................ | 713/156 |
| 2005/0138364 A1* | 6/2005 | Roskind et al. | .............. | 713/156 |

FOREIGN PATENT DOCUMENTS

| | | |
|---|---|---|
| JP | 2002-251492 | 9/2002 |
| JP | 2002-353959 | 12/2002 |
| JP | 2004-201088 | 7/2004 |

OTHER PUBLICATIONS

RSA Keon (Registered trademark) Factory-CA solution, RSA Security, URL.
Rsa Keon (Registered trademark) Factory-CA solution, RSA Security, (2003) http://rsasecurity.com/japan/products/keon/keon_factory-ca.html.

* cited by examiner

*Primary Examiner*—Kambiz Zand
*Assistant Examiner*—Karl L Schmidt
(74) *Attorney, Agent, or Firm*—Oblon, Spivak, McClelland, Maier & Neustadt, P.C.

(57) ABSTRACT

A method of transferring digital certificates from a digital-certificate transferring apparatus to a communications counterpart. The method includes authenticating the communications counterpart using a common certificate and transferring a normal certificate to the communications counterpart when the authenticating succeeds. The method further includes receiving a first normal certificate at an address from said communications counterpart, and when, it is determined to be necessary, transferring to the communications counterpart a second normal certificate along with the information identifying the communications counterpart and an address corresponding to a second normal certificate. The second normal certificate is of a different type than the first normal certificate.

16 Claims, 33 Drawing Sheets

|  | OBTAIN CALL | OBTAIN PERIODIC REPORTING | SET CERTIFICATE | EXECUTE COMMAND |
|---|---|---|---|---|
| RESCUE PUBLIC-KEY CERTIFICATE | NO | NO | YES | NO |
| NORMAL PUBLIC-KEY CERTIFICATE | YES | YES | YES | YES |

FIG.7

Data (DATA SECTION)
    Version (VERSION OF X.509)
    Serial Number (SERIAL NUMBER)
    Signature Algorithm (ENCRYPTING ALGORITHM USED BY CA)
    Issuer (ISSUER OF CERTIFICATE)
    Validity (EXPIRATION DATE)
    Subject (TARGET TO BE CERTIFIED)
    Subject Public Key Info (INFORMATION REGARDING PUBLIC KEY OF TARGET TO BE CERTIFIED)
        Public Key Algorithm (ALGORITHM OF PUBLIC KEY)
        RSA Public Key (PUBLIC KEY)
        X509v3 extensions (EXTENSIONS OF X.509 VERSION.3)
           . . .
Signature Algorithm (ENCRYPTING ALGORITHM USED BY CA)
Signature (DIGITAL SIGNATURE BY CA)

FIG.8

Data:
    Version: 3 (0x2)
    Serial Number: 0 (0x0)
    Signature Algorithm: md5WithRSAEncryption
A — Issuer: C=JP, ST=Tokyo, L=Ohtaku, O=XXX Company, Ltd, CN=CA001
    Validity
B     Not Before: Jan 1 00:00:00 2003 GMT
    Not After : Jan 1 00:00:00 2004 GMT
C — Subject: C=JP, Tokyo, L=Ohtaku, O=XXX Company, Ltd, CN=Device-0123456
    Subject Public Key Info:
        Public Key Algorithm: rsaEncryption
X — RSA Public Key: (1024 bit)
        Modulus (1024 bit):
            [PUBLIC KEY OF DEVICE-0123456]
        Exponent: 65537 (0x10001)
Signature Algorithm: md5WithRSAEncryption
Signature:
    [SIGNATURE DATA BY CA001]

FIG.9

```
Data:
    Version: 3 (0x2)
    Serial Number: 0 (0x0)
    Signature Algorithm: md5WithRSAEncryption
D ─ Issuer: C=JP, ST=Tokyo, L=Ohtaku, O=XXX Company, Ltd, CN=RescueCA
    Validity
        Not Before: Jan 1 00:00:00 2000 GMT
        Not After : Jan 1 00:00:00 2050 GMT
E ─ Subject: C=JP, Tokyo, L=Ohtaku, O=XXX Company, Ltd, CN=0
    Subject Public Key Info:
        Public Key Algorithm: rsaEncryption
        RSA Public Key: (1024 bit)
            Modulus (1024 bit):
            ┌─────────────────────────────────┐
            │ PUBLIC KEY OF DEVICE-0123456    │
            └─────────────────────────────────┘
            Exponent: 65537 (0x10001)
    Signature Algorithm: md5WithRSAEncryption
    Signature:
        ┌─────────────────────────────────┐
        │ SIGNATURE DATA BY RESCUE CA     │
        └─────────────────────────────────┘
```

FIG.10

```
Data:
    Version: 3 (0x2)
    Serial Number: 0 (0x0)
    Signature Algorithm: md5WithRSAEncryption
F ─ Issuer: C=JP, ST=Tokyo, L=Ohtaku, O=XXX Company, Ltd, CN=RescueCA
    Validity
G {     Not Before: Jan 1 00:00:00 2000 GMT
        Not After : Jan 1 00:00:00 2050 GMT
H ─ Subject: C=JP, Tokyo, L=Ohtaku, O=XXX Company, Ltd, CN=Device-0123456
    Subject Public Key Info:
        Public Key Algorithm: rsaEncryption
        RSA Public Key: (1024 bit)
            Modulus (1024 bit):
            ┌─────────────────────────────────┐
            │ PUBLIC KEY OF DEVICE-0123456    │
            └─────────────────────────────────┘
            Exponent: 65537 (0x10001)
    Signature Algorithm: md5WithRSAEncryption
    Signature:
        ┌─────────────────────────────────┐
        │ SIGNATURE DATA BY RESCUE CA     │
        └─────────────────────────────────┘
```

FIG.12

CERTIFICATE SET

FIRST CA PUBLIC-KEY CERTIFICATE FOR LOWER APPARATUS

FIRST CA PRIVATE-KEY FOR LOWER APPARATUS

FIRST CA ROOT-KEY CERTIFICATE FOR UPPER-APPARATUS AUTHENTICATION

FIG.16

NORMAL URL

CERTIFICATE SET

NORMAL PUBLIC-KEY CERTIFICATE FOR LOWER APPARATUS

NORMAL PRIVATE KEY FOR LOWER APPARATUS

NORMAL ROOT-KEY CERTIFICATE FOR UPPER-APPARATUS AUTHENTICATION

FIG.18

```
Data:
    Version: 3 (0x2)
    Serial Number: 101 (0x0)
    Signature Algorithm: md5WithRSAEncryption
J ── Issuer: C=JP, ST=Tokyo, L=Ohtaku, O=XXX Company, Ltd, CN=CA002
    Validity
        Not Before: May 20 00:00:00 2003 GMT
        Not After : May 20 00:00:00 2004 GMT
K ── Subject: C=JP, Tokyo, L=Ohtaku, O=XXX Company, Ltd, CN=Device-0123456
    Subject Public Key Info:
        Public Key Algorithm: rsaEncryption
    Y ── RSA Public Key: (2048 bit)
            Modulus (2048 bit):
            ┌─────────────────────────────────────────────┐
            │ MAIN BODY OF PUBLIC KEY OF DEVICE-0123456   │
            └─────────────────────────────────────────────┘
            Exponent: 65537 (0x10001)
Signature Algorithm: md5WithRSAEncryption
Signature:
    ┌──────────────────────────┐
    │ SIGNATURE DATA BY CA002  │
    └──────────────────────────┘
```

FIG.23

| EQUIPMENT NUMBER | FLAG FOR USING SECOND CA CERTIFICATE |
|---|---|
| ⋮ | ⋮ |
| 012-3456 | ON |
| 012-3457 | ON |
| ⋮ | ⋮ |
| 013-5001 | OFF |
| 013-5002 | OFF |
| ⋮ | ⋮ |

FIG.25

U1 — URL:https://www.cal.co.jp

S1 —
Machine Public Key:
Version: 3
Serial Number: 123
Signature Algorithm: md5WithRSAEncryption
Issuer: C=JP, ST=Tokyo, L=Ohtaku, O=XXX Company, CN=CA001
Validity
  Not Before: Jan  1 00:00:00 2000 GMT
  Not After : Dec 31 00:00:00 2005 GMT
Subject: C=JP, Tokyo, L=Ohtaku, O=XXX Company, CN=Device-0123456
Subject Public Key Info:
    xxxxxxxxxxxxxxxxxxxxxxxxxxxxxxxxxxxxx Machine Private Key:
Subject Private Key Info:
    xxxxxxxxxxxxxxxxxxxxxxxxxxxxxxxxxxxxx Root Certificate:
Version: 3
Serial Number: 1
Signature Algorithm: md5WithRSAEncryption
Issuer: C=JP, ST=Tokyo, L=Ohtaku, O=XXX Company, CN=CA001
Validity
  Not Before: Jan  1 00:00:00 2000 GMT
  Not After : Dec 31 00:00:00 2010 GMT
Subject Public Key Info:
    xxxxxxxxxxxxxxxxxxxxxxxxxxxxxxxxxxxxx

FIG.30

| PARAMETER | CONDITION | APPLYING? |
|---|---|---|
| COUNTRY CODE | JP | YES |
| MODEL | 1234 & 4567 | YES |
| MODEL | 1474 | NO |
| CERTIFICATE SERIAL | 1000 =< | NO |
| CERTIFICATE VERSION | 1.0 =< | NO |
| CERTIFICATE VALIDITY | JAN 1 00:00:00 2005 =< | NO |
| USER NAME | COMPANY A | NO |
| ⋮ | ⋮ | ⋮ |

FIG.31

| NUMBER | NAME | TELEPHONE NUMBER | FAX NUMBER | ADDRESS | AFFILIATION | COUNTRY CODE |
|---|---|---|---|---|---|---|
| 001 | AAA TRADING | xx-1234-5678 | xx-1234-5679 | B CITY, A PREF. | IMPORTS | JP |
| 002 | BBB CONSTRUCTION | xx-2234-5678 | xx-2234-5679 | C CITY, A PREF. | MATERIALS | JP |
| 003 | CCC MACHINERY | xx-3234-5678 | xx-3234-5679 | E CITY, D PREF. | GENERAL AFFAIRS | JP |
| 004 | CCC MACHINERY | yy-3234-5678 | yy-3234-5679 | E CITY, D PREF. | GENERAL AFFAIRS | JP |
| 005 | EEE TRADING | yy-7234-5678 | yy-7234-5679 | F CITY, D PREF. | ACCOUNTING | JP |
| 006 | FFF PRECISION | zz-6234-5678 | zz-6234-5679 | N CITY, M STATE | IMPORTS | XX |
| ... | ... | ... | ... | ... | ... | ... |

| DELIVERED DATE | EQUIPMENT NUMBER | MODEL CODE | CERTIFICATE SERIAL | CERTIFICATE VERSION | CERTIFICATE VALIDITY |
|---|---|---|---|---|---|
| 96/01/10 | 1234-123456 | 1234 | xxxx | 1.0 | JAN 1 00:00:00 2005 |
| 97/01/10 | 4567-963258 | 4567 | xxxx | 2.0 | JAN 1 00:00:00 2010 |
| 97/01/22 | 1474-258963 | 1474 | xxxx | 1.0 | JAN 1 00:00:00 2005 |
| 96/10/10 | 1234-987654 | 1234 | xxxx | 1.0 | JAN 1 00:00:00 2005 |
| 96/09/10 | 1234-852147 | 1234 | xxxx | 1.0 | JAN 1 00:00:00 2006 |
| 97/01/10 | 1234-741369 | 1234 | xxxx | 1.0 | JAN 1 00:00:00 2006 |
| ... | ... | ... | ... | ... | ... |

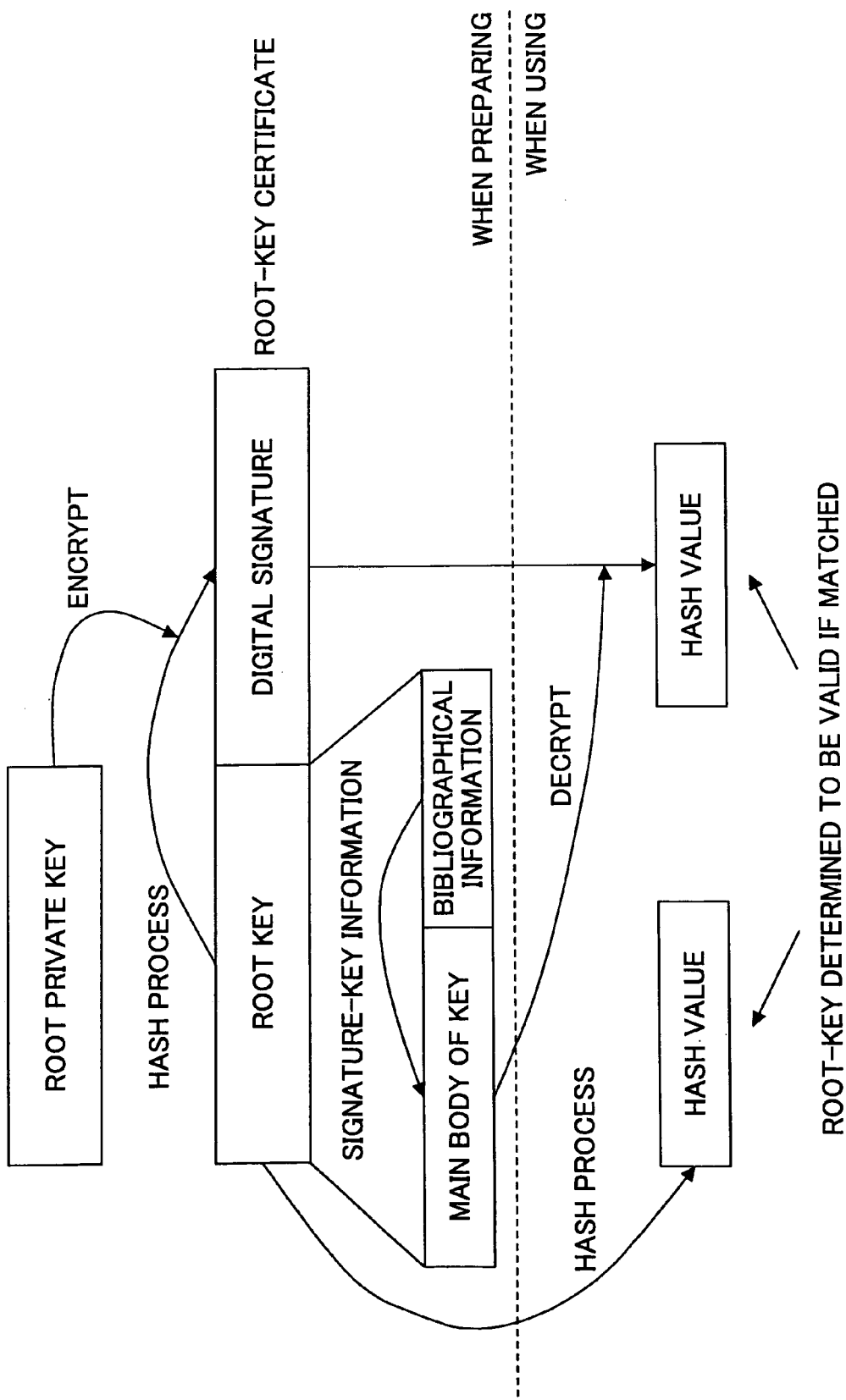

METHOD OF TRANSFERRING DIGITAL CERTIFICATE, APPARATUS FOR TRANSFERRING DIGITAL CERTIFICATE, AND SYSTEM, PROGRAM, AND RECORDING MEDIUM FOR TRANSFERRING DIGITAL CERTIFICATE

TECHNICAL FIELD

The present invention generally relates to a technology for a digital certificate, and more particularly to a method of transferring digital certificates for transferring a digital certificate from a digital-certificate transferring apparatus to a communications apparatus to be its communications counterpart, an apparatus for transferring digital certificates for transferring the digital certificate to the communications apparatus to be the communications counterpart, a system comprising the digital-certificate transferring apparatus and the communications apparatus to be its communications counterpart as described above, a program for causing a computer to function as the digital-certificate transferring apparatus as described above, and a computer-readable recording medium having recorded such a program.

BACKGROUND ART

Conventionally, connecting multiple communications apparatuses, each having its own communications function, via a network for communicating, and building various systems are performed. As an example, there is a so-called electronic-commerce system such that an order for a product is transmitted from a computer such as a PC (Personal Computer) that functions as a client apparatus and accepts the order in a server apparatus that communicates with the client apparatus via the Internet. Moreover, a system is being proposed such that various electronic apparatuses are provided with a function of a client apparatus or a server apparatus so as to be connected via an network, and are remotely controlled by mutual communications.

In building such systems, it is important to confirm when communicating whether a communications counterpart is appropriate, or whether information being transmitted has not been tampered with. Moreover, especially in the Internet, as often information goes through computers that are unrelated before reaching the communications counterpart, when transmitting secret information, there is also a demand for making sure that the contents are not viewed secretly. Then, a protocol such as SSL (Secure Sockets Layer), for example, as a communications protocol to respond to such demand is being developed and widely used. Using this protocol to communicate combines public-key encrypting methods and common-key encrypting methods for authenticating the communications counterpart as well as preventing tampering and tapping by encrypting information. Moreover, even at the communications-counterpart side, a communications-originating apparatus that requests for communications is authenticated.

As technologies related to authentication using such SSL and public-key encrypting, there are those described in Patent Documents 1 and 2:
Patent Document 1
JP2002-353959A
Patent Document 2
JP2002-251492A Now, a communications procedure for mutually authenticating according to this SSL is described focusing on the authentication process portion. FIG. 34 is a diagram illustrating a flow of a process of executing in each apparatus when communications apparatuses A and B mutually authenticate according to the SSL, along with information used for the process.

As illustrated in FIG. 34, when mutually authenticating according to the SSL, there is a need to first have a root-key certificate, a private key, and a public-key certificate stored in both of the communications apparatuses. This private key is a private key issued to each apparatus by a CA (Certificate Authority), while the public-key certificate is one such that the public key corresponding to the private key is appended with a digital signature by the CA so as to be set as a digital certificate. Moreover, the root-key certificate is one such that a root key corresponding to a root-private key used in the digital signature is appended with a digital signature so as to be set as a digital certificate.

FIGS. 34A and 34B illustrate these relationships.

As illustrated in FIG. 35A, a public key A is configured from a main body of the key for decrypting text encrypted using a private key A, and bibliographical information which includes such information as issuer (CA) of the public key and validity. Then, in order to indicate that the main body of the key and the bibliographical information are not tampered with, a hash value obtained by hashing the public key A is encrypted using a root-private key so as to be applied to a client common key as a digital signature. Moreover, at that time, information identifying the root-private key used in the digital signature is added as signature-key information to the bibliographical information of the public key A. Then, the public-key certificate having this digital signature applied is a common-key certificate A.

When using this common-key certificate A for authenticating, the digital signature contained therein is decrypted using a main body of a root key being a public key corresponding to the root-private key. It is understood when this decrypting is performed successfully that the digital signature is certainly applied by the CA. Moreover, it is understood when the hash value obtained by hashing the public key A portion and a hash value obtained by decrypting matches that the key itself is also neither damaged nor tampered with. Furthermore, it is understood when it is possible to successfully decrypt the received data using this public key A that the data is transmitted from the owner of the private key A.

Now, while it is necessary to store in advance a root key for performing authentication, as illustrated in FIG. 34B, this root key is stored as a root-key certificate having applied a digital signature by the CA. This root-key certificate is in a self-signature format enabled to decrypt the digital signature with a public key contained therein. Then, when using the root key, the main body of the key contained in the root-key certificate is used to decrypt the digital signature so as to compare with the hash value obtained by hashing the root key. When there is a match, it is possible to confirm that the root key is not corrupted, for instance.

Now the flowcharts in FIG. 34 are described. It is noted that in this diagram, an arrow between the two flow charts represents transferring of data such that the transmitting side performs a transferring process at a step from which the arrow originates, while the receiving side once the information is received performs a process of a step to which the arrow points. Moreover, when a process of each of the steps is not successfully completed, at that time a response of having failed authentication is returned so as to suspend the process. The same holds when a response of having failed authentication is received from the counterpart, or upon time-out of the process.

Now, with a communications apparatus A requesting for communications with a communications apparatus B, when performing this request, the CPU of the communications apparatus A executing a required control program starts a process of the flowchart illustrated on the left-hand side of FIG. 34. Then, in step S11, a request for connection is transmitted to the communications apparatus B.

On the other hand, the CPU of the communications apparatus B once receiving this request for connection executing a required control program starts a process of the flowchart illustrated on the right-hand side of FIG. 34. Then, in step S21 a first random number is generated for encrypting using a private key B. Then, in step S22, the encrypted first random number and a public-key certificate B are transmitted to the communications apparatus A.

At the communications apparatus A side, when receiving this, in step S12 the validity of the public-key certificate B is confirmed using a root-key certificate.

Then once confirmed, in step S13 the first random number is decrypted using a public key B contained in the received public-key certificate B. When the decrypting here is successful, confirming that the first random number is certainly received from a subject to which the public-key certificate is issued is enabled. Then, when the confirming as described above is successful, information indicating success of authentication is transmitted to the communications apparatus B.

Moreover, at the communications apparatus B side, upon receiving this information, in step S23, transmission of a public-key certificate for authentication is requested from (request sent to) the communications apparatus A.

Then, at the communications apparatus A, based on the above request for transmission, in step S14, a second random number and a common-key seed are generated. A common-key seed may be generated based on data transacted in previous communications, for example. Then, in step S15 the second random number is encrypted using a private key A, the common-key seed is encrypted using the public key B, and in step S16 these are transmitted with a public-key certificate A to the communications apparatus B side. Encrypting the common-key seed is performed for the purpose of making sure that the random number is not known to apparatuses other than the communications counterpart.

Then, in the next step S17, a common key for use in encrypting subsequent communications is generated from the common-key seed generated in step S14.

At the communications apparatus B side, when receiving this, in step S24 the validity of the public-key certificate A is confirmed using the root-key certificate. Then once confirmed, in step S25, the second random number is decrypted using a public key A contained in the public-key certificate A received. When the decrypting here is successful, confirming that the second random number is certainly received from a subject to which the public-key certificate A is issued is enabled.

Subsequently, in step S26 the common-key seed is decrypted using a private key B. It can be said that, in the process thus far, the first through the third common-key seed common to the communications apparatus A side and the communications apparatus B side are shared. Then, at least the common-key seed does not become known to apparatuses other than the communications apparatus A having generated the number and the communications apparatus B having the private key B. Once the process described thus far succeeds, also at the communications apparatus B side in step S27 a common key for use in encrypting subsequent communications is generated from the common-key seed obtained by decrypting.

Then, once the process of step S17 at the communications apparatus A side and the process of step S27 at the communications apparatus B side are terminated, success of authentication and encrypting method for use in subsequent communications are mutually confirmed for terminating the process regarding authentication assuming that the generated common key is used to conduct the subsequent communications using the encrypting method confirmed as described above. It is noted that the confirming as described above includes a response from the communications apparatus B that authentication has succeeded. The process as described above enables mutually establishing communications so as to subsequently use the common key generated in step S17 or S27 and to encrypt data according to the common-key encrypting method for conducting communications.

Performing such process as described above enables securely sharing a common key upon the communications apparatus A and communications apparatus B mutually authenticating their counterparts, and establishing a path for communicating securely.

It is noted that in the process as described above, it is not mandatory to encrypt the second random number with the private key A and to transmit the public-key certificate A to the communications apparatus B. In this way, the process of steps S23 and S24 at the communications apparatus B side is not required so that the process becomes as illustrated in FIG. 36. In this way, while it is not possible for the communications apparatus B to authenticate the communications apparatus A, this process is sufficient when it suffices for the communications apparatus A to only authenticate the communications apparatus B. Then in this case, it is necessary to have only the root-key certificate stored in the communications apparatus A so that neither the private key A nor the public-key certificate A are needed. Moreover, it is not necessary to have the root-key certificate stored in the communications apparatus B.

In the authentication process as described above, the authentication is performed such that, using the fact that the contents encrypted with a public key can only be decrypted at an apparatus having a corresponding private key, and, the contents encrypted with a private key can only be decrypted with a corresponding public key, a communications counterpart is described in a public-key certificate as its subject to which the certificate is issued (or a user of the apparatus is a user for which the public-key certificate describes as the subject to which the certificate is issued).

Moreover, it is understood that, assuming the integrity of privacy of the root-private key of the CA, the public-key certificate is authenticated by the CA such that (the provider of) the CA guarantees the accuracy of the contents described in the public-key certificate. However, the fact that the communications counterpart is certainly the same as the apparatus described in the public-key certificate can only be determined by relying on the guarantee of the CA having issued the public-key certificate. Therefore, the reliability of the CA becomes an important factor when maintaining the security of communications by authentication using public-key encrypting.

Then, in a case of trying to authenticate a communications counterpart using such a public-key certificate, for preventing such behavior as getting authenticated by disguising as another apparatus or using a counterfeit certificate to get authenticated, describing in the public-key certificate information identifying the apparatus being the subject of issuing or using the public-key certificate issued by a highly-reliable, trusted third party is effective.

However, even when trying to authenticate using such a public-key certificate, successful authenticating is not possible when the public-key certificate is corrupted or the validity has expired. More specifically, as the public-key certificate issued by a trusted third party has a short validity period of approximately 1 to 3 years, the validity may expire while the apparatus having stored the certificate is stored in a warehouse.

Then, in a case where the communications counterpart has stored only one type of public-key certificate, the communications counterpart can no longer be authenticated. Moreover, as it is not possible to establish a secure communications path with the communications counterpart, having the communications counterpart to securely store a new public-key certificate (and private key) causes the need to send these via a different route such as post.

However, when sending the new public-key certificate, etc., via the post, etc., setting the communications apparatus needs to be done manually. Therefore, this setting is difficult when updating by an operator is difficult due to the skill level of the user envisaged and the user environment, or it is not preferable to have the operator freely set a public-key certificate from the point of view of operating the apparatus.

The applicant of the present application has proposed a method of updating a public-key certificate and has made patent applications (i.e. Japanese Patent Application Nos. 2003-201638 and 2003-341329, etc., pending); the method, as a method of settling the problems as described above, is such that a communications apparatus is set to store a public-key certificate for normal use, as well as a common-key certificate to be stored as a common one for each apparatus without having to include information identifying the apparatus, and a public-key certificate having a validity period longer than the public-key certificate for normal use, that are to be used as a rescue certificate, so as to update a public-key certificate being corrupted or a public-key certificate for which the validity has expired.

In this method, in each communications apparatus, when authentication with the public-key certificate for normal use in the communications apparatus is no longer possible, an apparatus having a function of setting a certificate provides for using a rescue public-key certificate to authenticate the communications apparatus so that when this is successful a new public-key certificate, etc., for normal use is transmitted to the communications apparatus.

Therefore, according to such a method, even when the public-key certificate for normal use is made unavailable for use, securely obtaining a new public-key certificate, etc., from the apparatus having the function of setting a certificate so as to set the certificate, etc., is enabled, providing the ability to get reauthenticated using a public-key certificate for normal use.

Now, even when mutually authenticating using a public-key certificate, etc., such that the security is sufficiently maintained, it is possible that the security may become not sufficient due to such reasons as the strength of the cipher becoming insufficient due to progress in technologies. For instance, when a computationally-superior computer or a suitable algorithm is developed, if a public key having a short key-length is used, there will be risk that a private key is derived from the public key in a short time frame. Thus, in order to respond to such a situation, there is a demand for making it possible to respond by changing the key length of the public key.

Moreover, in order to describe many information items within the public-key certificate, there is a demand for changing the format of the public-key certificate.

Thus when changing the key length or the format of the public key, there arises a need for a CA to newly provide the public key. However, in this case, as the validity of the new digital certificate issued by the CA cannot be confirmed with a previous root key, it is not possible to authenticate. Therefore, for authentication, a public-key certificate, a private key, and a root-key certificate supporting a new key-length or format need to be transferred.

It is possible to apply a technology as described in the Non-Patent Document 1, for example, when having a newly produced apparatus store a certificate or a key in response to such a new key-length or algorithm. However, the Non-Patent Document 1 describes no method for delivering such certificate having the new key-length or format to an apparatus already shipped and being operated by a customer.

Non-Patent Document 1

"RSA Keon (Registered trademark) Factory—CA Solution", (online), RSA Security Co., (searched Nov. 26, 2003), the Internet <URL: http://www.rsasecurity.com/japan/products/keon/keon_factory-ca.html>

On the other hand, it is possible to transfer the public-key certificate, etc., supporting the new key-length and the format as described above with the method of using the rescue public-key certificate as described above. In other words, when an apparatus authenticating each apparatus stops authenticating using a public-key certificate before a change, the communications apparatus cannot get authenticated with the public-key certificate before the change. Then a method is possible such that, as a predetermined communications counterpart is requested authentication with a rescue public-key certificate, when the communications counterpart authenticates the communications apparatus with the rescue public-key certificate, a public-key certificate, etc., supporting a new key-length or format is delivered to the communications apparatus.

However, as the public-key certificate used for rescue is always enabled for authenticating using the certificate, it has a characteristic of not containing information identifying the apparatus or having a long validity period so as to be somewhat inferior relative to the public-key certificate for normal use from the security point of view. Moreover, as the communications path being maintained for using the rescue public-key certificate is strictly for use in an emergency, when it is known in advance that authentication cannot be made, there is a demand for making do with as little as possible.

Furthermore, when trying to deliver a new public-key certificate, etc., to a large number of communications apparatuses, immediately after authenticating using the public-key certificate before the change is stopped, a large number of accesses to the apparatus delivering the new public-key certificate, etc., for rescue ends up becoming concentrated. Therefore, there is a problem such that the apparatus for delivery may end up going down, making delivering of the new public-key certificate, etc., impossible.

DISCLOSURE OF THE INVENTION

Accordingly, it is a general object of the present invention to provide a technology for a digital certificate that substantially obviates one or more problems caused by the limitations and disadvantages of the related art.

It is a more particular object of the present invention to provide a method of transferring a digital certificate that enables securely delivering to a communications apparatus a digital certificate being different from one currently used and accurately delivering such digital certificate to a large number of apparatuses.

According to the invention, a method of transferring digital certificates for transferring, by means of a digital-certificate transferring apparatus, a digital certificate to a communications apparatus to be a communications counterpart of the digital-certificate transferring apparatus, includes the step of causing the digital-certificate transferring apparatus to execute: a first transferring procedure of using a common certificate being a digital certificate without apparatus-identifying information so as to authenticate the communications counterpart, and transfer a normal certificate being a digital certificate with information identifying the communications counterpart to the communications counterpart when the authenticating succeeds; and a second transferring procedure of receiving a first normal certificate from the communications counterpart, and when, based on the received first normal certificate, transferring a second normal certificate, with the information identifying the communications counterpart, and being different from the first normal certificate, is determined to be necessary, transferring the second normal certificate to the communications counterpart.

The method of transferring digital certificates in an embodiment of the invention enables securely delivering to a communications apparatus a digital certificate being different from one currently used and accurately delivering such digital certificate to a large number of apparatuses.

According to another aspect of the invention, an apparatus for transferring digital certificates for transferring a digital certificate to a communications apparatus to be a communications counterpart includes: first transferring means for using a common certificate being a digital certificate without apparatus-identifying information so as to authenticate the communications counterpart, and transfer a normal certificate being a digital certificate with information identifying the communications counterpart to the communications counterpart when the authenticating succeeds; and second transferring means for receiving a first normal certificate from the communications counterpart, and when, based on the received first normal certificate, transferring a second normal certificate, with the information identifying the communications counterpart, and being different from the first normal certificate, is determined to be necessary, transferring the second normal certificate to the communications counterpart.

The apparatus for transferring digital certificates in an embodiment of the invention enables securely delivering to a communications apparatus a digital certificate being different from one currently used and accurately delivering such digital certificate to a large number of apparatuses.

According to yet another aspect of the invention, a system for transferring digital certificates includes a digital-certificate transferring apparatus for transferring a digital certificate to a communications apparatus; the communications apparatus being a communications counterpart of the digital-certificate transferring apparatus, the digital-certificate transferring apparatus further including: first transferring means for using a common certificate being a digital certificate without apparatus-identifying information so as to authenticate the communications counterpart, and transfer a normal certificate being a digital certificate with information identifying the communications apparatus to the communications apparatus when the authenticating succeeds; and second transferring means for receiving a first normal certificate from the communications apparatus, and when, based on the received first normal certificate, transferring a second normal certificate, with the information identifying the communications apparatus, and being different from the first normal certificate, is determined to be necessary, transferring the second normal certificate to the communications apparatus; the communications apparatus further including: means for receiving each one of the first normal certificate and second normal certificate from the certificate-transferring means so as to store the received certificates.

The system for transferring digital certificates in an embodiment of the invention enables securely delivering to a communications apparatus a digital certificate being different from one currently used and accurately delivering such digital certificate to a large number of apparatuses.

BRIEF DESCRIPTION OF THE DRAWINGS

Other objects, features, and advantages of the present invention will become more apparent from the following detailed description when read in conjunction with the accompanying drawings, in which:

FIG. 7 is a diagram for describing an exemplary format of a normal public-key certificate;

FIG. 8 is a diagram illustrating an exemplary first CA public-key certificate for the lower apparatus according to the format described in FIG. 6B;

FIG. 9 is a diagram illustrating an exemplary rescue public-key certificate for the lower apparatus according to the format described in FIG. 6B;

FIG. 10 is a diagram illustrating another exemplary rescue public-key certificate for the lower apparatus according to the format described in FIG. 6B;

FIG. 12 is an diagram illustrating an exemplary certificate set for transferring from the upper apparatus to the lower apparatus illustrated in FIGS. 1 and 3;

FIG. 16 is a diagram illustrating an exemplary certificate package for transferring from the upper apparatus to the lower apparatus, in the system for transferring digital certificate as illustrated in FIGS. 1 and 3;

FIG. 18 is a diagram illustrating an exemplary second CA public-key certificate for the lower apparatus according to the format described in FIG. 6B;

FIG. 23 is a table illustrating an exemplary setting of a flag for using a second CA certificate in the upper apparatus as illustrated in FIGS. 1 and 3;

FIG. 25 is a diagram illustrating the state of storage with a communications destination when communicating using a first CA certificate set and its certificate in a certificate storage of the lower apparatus as illustrated in FIGS. 1 and 3;

FIG. 30 is a table illustrating an exemplary updating-condition table to be stored in the upper apparatus as illustrated in FIGS. 1 and 3;

FIG. 31 is a table illustrating an exemplary equipment-information table to be stored in the upper apparatus as illustrated in FIGS. 1 and 3;

FIGS. 35A and 35B are diagrams for describing relationships among a root key, a root-private key, and a public-key certificate in the authenticating process as illustrated in FIG. 34.

BEST MODE FOR CARRYING OUT THE INVENTION

Descriptions are given next, with reference to the accompanying drawings, of embodiments of the present invention.

Below, an apparatus for transferring digital certificates for executing a process regarding a method of transferring the digital certificates according to the present invention, and a configuration of an embodiment of a system for transferring digital certificates of the present invention that is configured using the apparatus for transferring digital certificates are described.

Figure 1:
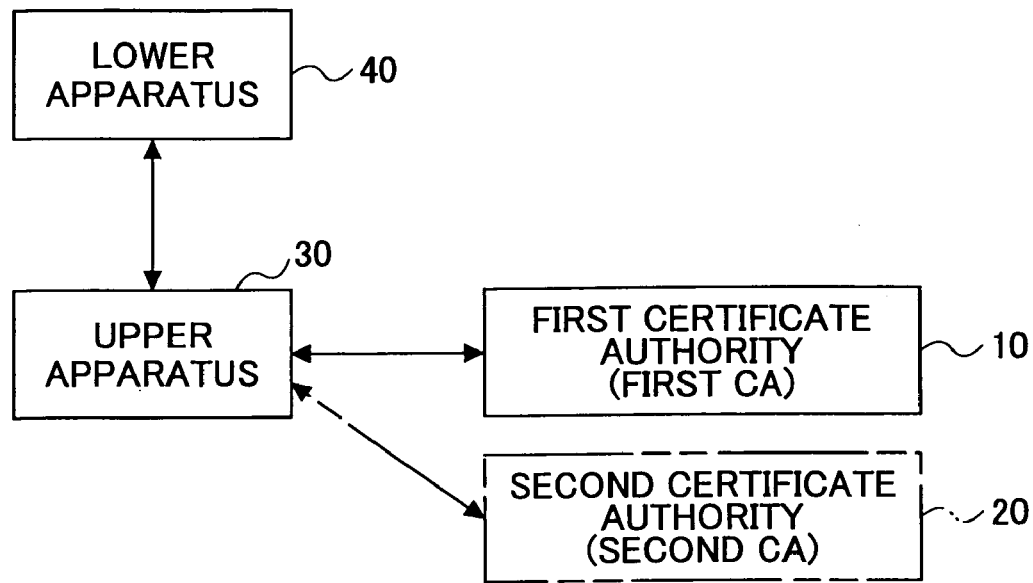
FIG. 1 is a block diagram illustrating an exemplary configuration of a system for transferring digital certificates being an embodiment of the present invention.

Now in FIG. 1 the configuration of the system for transferring digital certificates is illustrated.

In this embodiment, an upper apparatus 30 being the apparatus for transferring digital certificates and a lower apparatus 40 being a communications apparatus to be its communications counterpart configure the system for transferring digital certificates. Moreover, the upper apparatus 30 is enabled for communicating with a first certificate authority (a first CA) 10 which issues a digital certificate to the upper apparatus 30 and the lower apparatus 40. A second certificate authority (a second CA) 20 is described below.

This system for transferring digital certificates provides for having the upper apparatus 30, when trying to communicate with the lower apparatus 40, to establish communications with the lower apparatus 40 when the lower apparatus 40 is authenticated as a valid communications counterpart with authentication according to a SSL protocol being a method of authenticating using a public-key cipher and a digital certificate. Then, the lower apparatus 40 performs a necessary process so as to return a response to a request for operating (a command) that is transmitted by the upper apparatus 30 causing the system to function as a client-server system.

Conversely, this system provides for the lower apparatus 40, when trying to communicate with the upper apparatus 30, to establish communications with the upper apparatus 30 when the upper apparatus 30 is authenticated as a valid communications counterpart with authentication according to the SSL protocol. Then, the upper apparatus 30 performs a necessary process so as to return a response to a request for operating (a command) transmitted by the lower apparatus 40 causing the system to function as a client-server system.

In either of the above cases, the side requesting communications is to function as a client, while the side being requested to communicate is to function as a server.

Moreover, the first CA 10 is an apparatus for issuing and managing the digital certificate for use in the mutual authenticating as described above.

Figure 13:
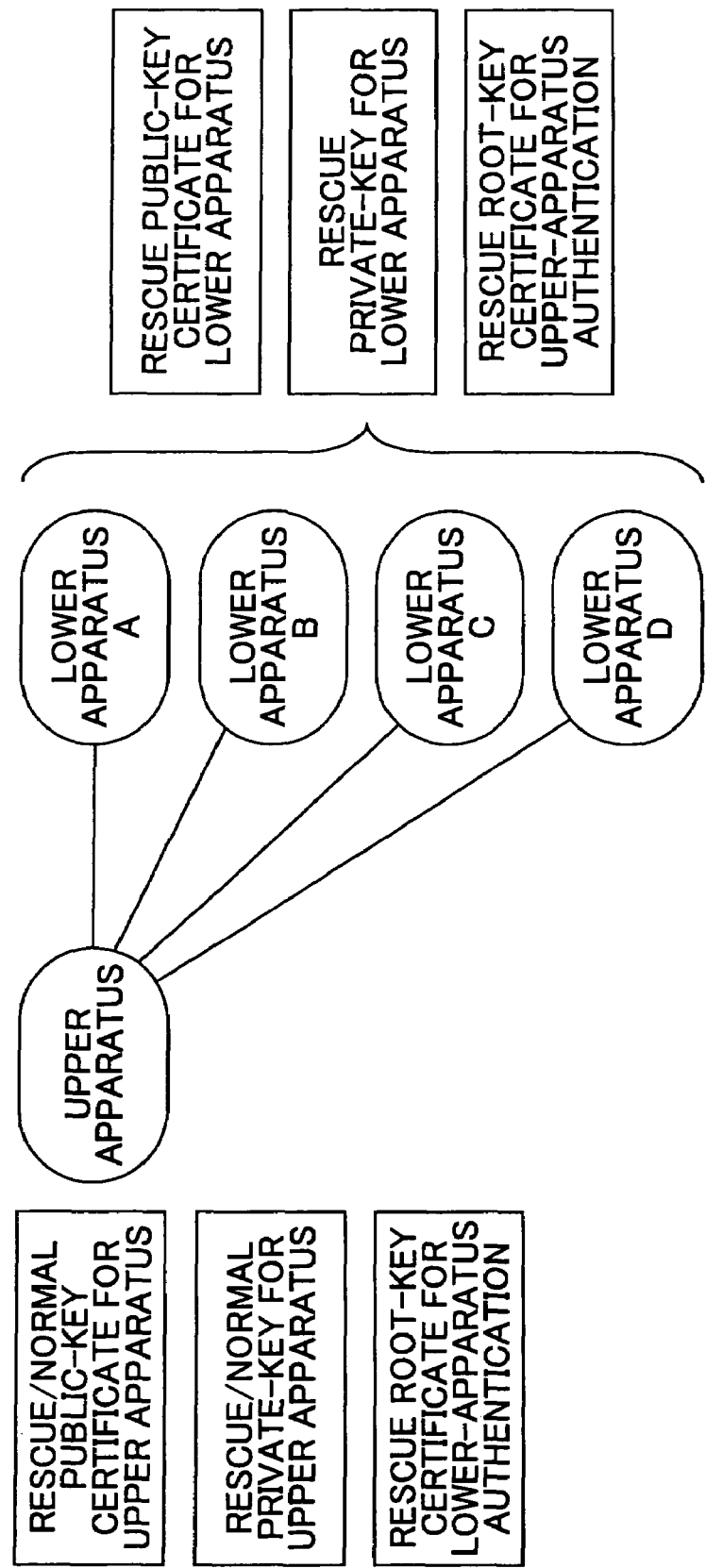
FIG. 13 is an diagram illustrating an exemplary system configuration when having provided multiple lower apparatuses in the system for transferring digital certificate illustrated in FIGS. 1 and 3.
Figure 28:
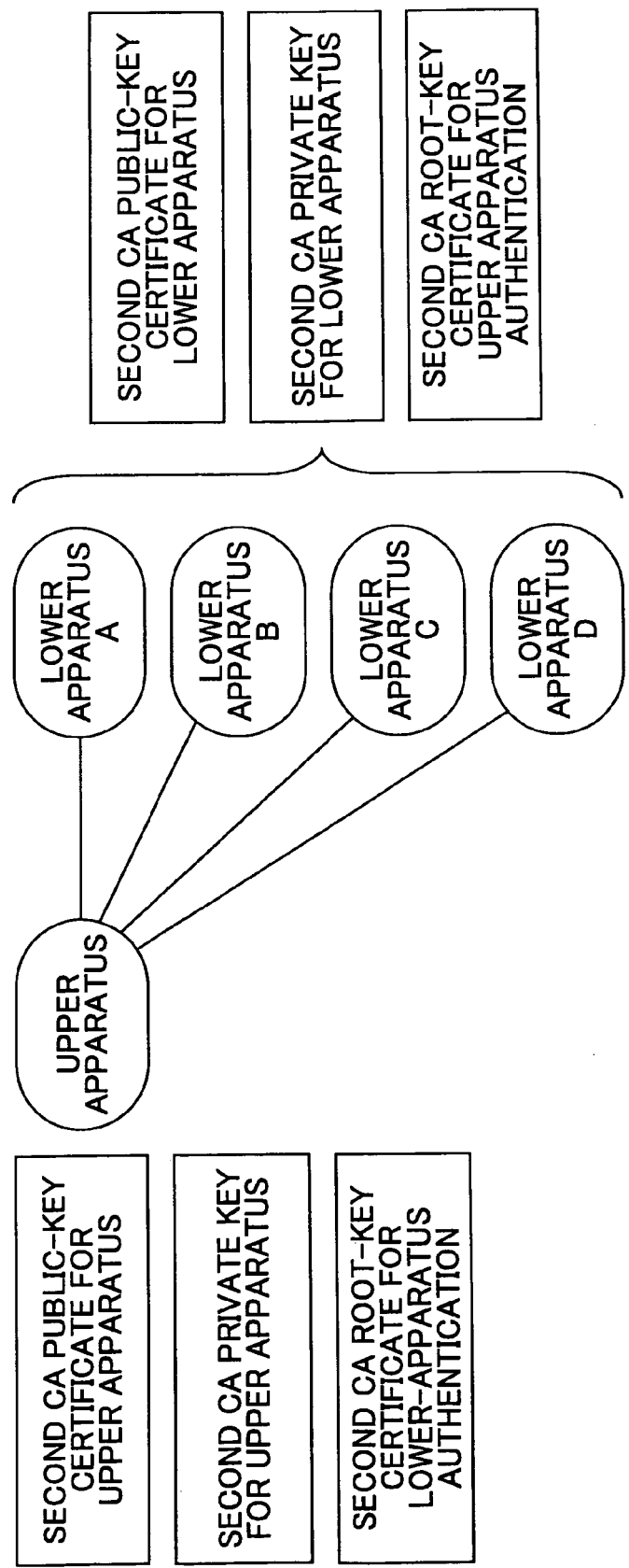
FIG. 28 is a diagram illustrating the state after completing certificate updating when multiple lower apparatuses are provided in the system for transferring digital certificates as illustrated in FIGS. 1 and 3.

It is noted that, in FIG. 1, while only one lower apparatus 40 is illustrated, as illustrated in FIGS. 13 and 28, it is possible to provide multiple lower apparatuses 40. Furthermore, while there is one upper apparatus 30 for one system for transferring digital certificates, it is possible for one first CA 10 to communicate with multiple upper apparatuses 30 and to communicate with multiple systems for transferring digital certificate.

Including the communications between the upper apparatus 30 and the lower apparatus 40 as described above, such a system for transferring digital certificates provides for each node to be the first CA 10, the upper apparatus 30, and the lower apparatus 40 to transmit "a request" for a process to a method of an application program being mutually implemented so as to obtain "a response" as a result of the requested process according to a RPC (a Remote Procedure Call).

In order to implement the RPC, known protocols (communications rules), technologies, and specifications, etc. such as SOAP (Simple Object Access Protocol), HTTP (Hyper Text Transfer Protocol), FTP (File Transfer Protocol), COM (Component Object Model), CORBA (Common Object Request Broker Architecture), etc. may be used.

Next, configurations and functions of each apparatus illustrated in FIG. 1 are described in greater detail.

Figure 2:
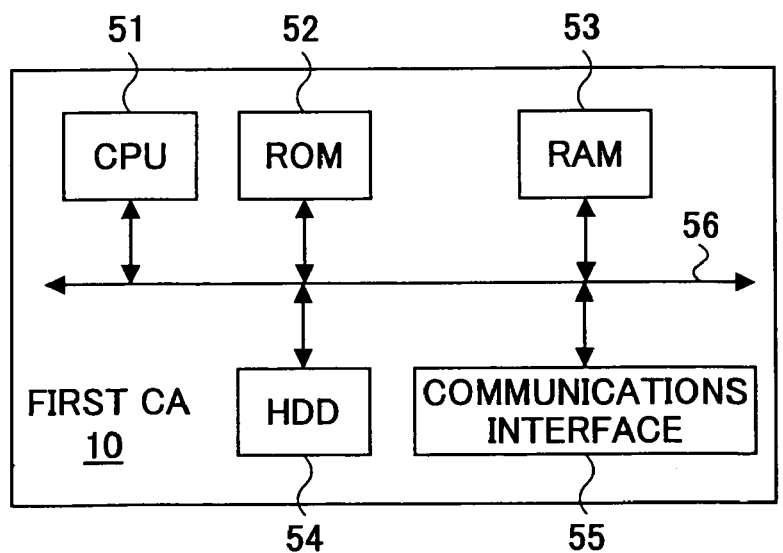
FIG. 2 is a block diagram illustrating a hardware configuration of a first CA illustrated in FIG.

FIG. 2 is a block diagram illustrating a hardware configuration of the first CA 10. As illustrated, the first CA 10 comprises a CPU 51, a ROM 52, a RAM 53, a HDD 54, and a communications interface 55, which are connected via a system bus 56. Then, the CPU 51 executes various control programs stored in the ROM 52 and the HDD 54 for controlling an operation of this first CA 10 and implementing such functions as issuing and managing the digital certificate.

It is noted that as a piece of hardware of the first CA 10 a known computer may be adopted as appropriate. Of course, as needed another piece of hardware may be added.

The upper apparatus 30 and the lower apparatus 40 may take various configurations depending on such objectives as remote apparatus control and electronic commerce. For instance, in the case of remote control, an electronic apparatus such as a printer, a facsimile apparatus, a copying machine, a scanner, an image-processing apparatus such as digital multi-functional equipment, as well as a piece of networked consumer-electronic equipment, an automated vending-machine, a piece of medical equipment, a power-supply apparatus, an air-conditioning system, a system for measuring gas, water, and electricity, etc., an automobile, and an aircraft may be set as a lower apparatus 40 being an apparatus to be controlled, while a control apparatus for gathering information from these apparatuses to be controlled, and sending a command so as to cause these apparatuses to be controlled to operate may be set as an upper apparatus 30. It is noted that regardless of the configuration the upper apparatus 30 is to have a function of transferring a digital certificate to the lower apparatus 40 as described below.

Moreover, each of the upper apparatus 30 and the lower apparatus 40 is to comprise at least a CPU, a ROM, a RAM, a communications interface for communicating with an external apparatus via a network, and storage means for storing information necessary for authentication, so that the CPU executing a required control program stored in the ROM, etc. causes the respective apparatuses to implement each function in the present invention.

It is noted that, for this communication, various communication lines (communication paths) for building a network, wired or wireless, may be adopted. The same holds for communication with the first CA 10. It is noted that for the communication with the first CA 10, taking into account security considerations, it is preferable to conduct them via a network using dedicated circuits, as is being done here.

Figure 3:
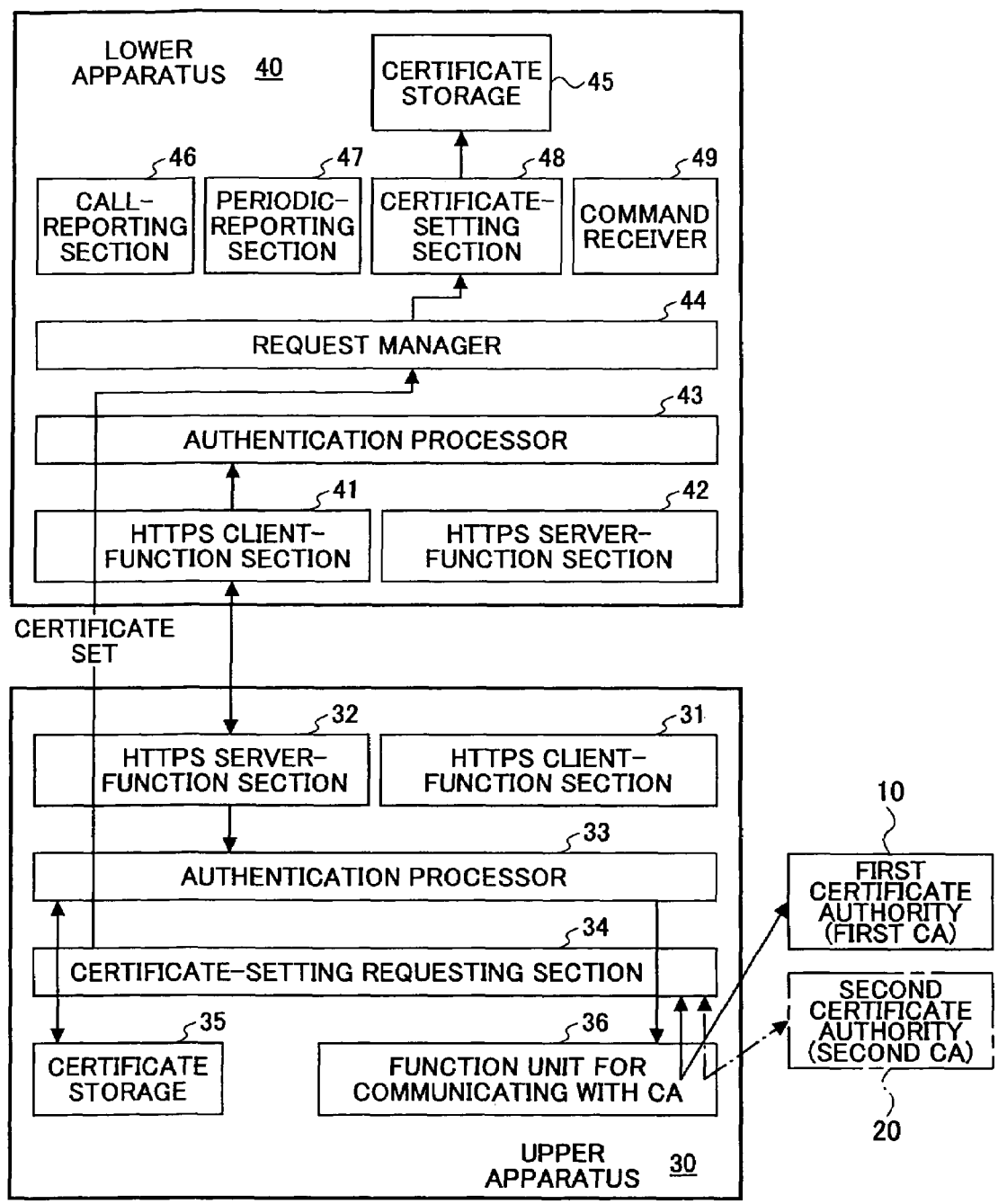
FIG. 3 is a functional block diagram illustrating a functional configuration of portions related to features of the present invention, for an upper apparatus and a lower apparatus illustrated in FIG. 1.

Now, in FIG. 3 is illustrated a functional block diagram of portions related to the present invention, for the upper apparatus 30 and the lower apparatus 40. In this diagram, illustrations of those portions not related to the present invention are omitted.

First the upper apparatus 30 comprises a HTTPS (Hypertext Transfer Protocol Secure) client-function section 31, a HTTPS server-function section 32, an authentication processor 33, a certificate-setting request section 34, a certificate storage 35, and a functional section for communicating with CAs 36.

The HTTPS client-function section 31 has a function of using a HTTPS protocol including authenticating and encrypting according to the SSL so as to request for communications to an apparatus having a function of a HTTPS server, such as the lower apparatus 40.

On the other hand, the HTTPS server-function section 32 has a function of accepting a request for communications using the HTTPS protocol from the apparatus having the HTTPS client function.

Then, these HTTPS client-function section 31 and HTTPS server-function section 32 implement a function of transmitting a command and a data item to the communications counterpart so as to cause operations depending on the command and the data item to be implemented, and a function of receiving a request and a data item from the communications counterpart so as to cause each portion of the apparatus to execute operations depending on the request and the data item for returning the result as a response to the requestor. In this case, the side requesting the communications may transmit a command, or the side accepting the request may transmit the command. The same holds for responses.

The authentication processor 33 functions as authenticating means for authenticating using a digital certificate received from the communications counterpart and various certificates and private key, etc., being stored in the certificate storage 35 when the HTTPS client-function section 31 or the HTTPS server-function section 32 authenticates the communications counterpart. Moreover, it has a function of transmitting to the communications counterpart a digital certificate being stored in the certificate storage 35 via the HTTPS client-function section 31 and the HTTPS server-function section 32 in order to request an authentication from the communications counterpart.

The certificate-setting request section 34 functions as certificate-transferring means for transferring in a predetermined case as described below a certificate set, and a communications-destination information item, and functions as certificate-setting means for requesting, when performing the transferring, the apparatus to be transferred to, to set the certificate set, the certificate package, and the communications-destination information item.

The certificate storage 35 has a function of storing information for authenticating various certificates and private key, etc., to provide for authenticating in the authentication processor 33.

The function section for communicating with CAs 36 has a function of communicating with a certificate authority such as the first CA 10 and the second CA 20, requesting issuing of a certificate set for the lower apparatus 40 or the upper apparatus 30 itself to use in authenticating, and receiving the issued certificate set. It is noted here that communications between the upper apparatus 30 and the certificate authorities to be conducted via the network using the dedicated circuits does not allow for connecting from the outside so that the SSL is not used. However, when using the SSL, communications may be requested from the HTTPS client-function unit 31 to the certificate authority.

Then, the functions of each of the sections as described above are implemented by the CPU of the upper apparatus 30 executing a required control program so as to control operations of each portion of the upper apparatus 30.

Next, the lower apparatus 40 comprises a HTTPS client-function section 41, a HTTPS server-function section 42, an authentication processor 43, a request manager 44, a certificate storage 45, a call-reporting section 46, a periodic-reporting section 47, a certificate-setting section 48, and a command receiver 49.

The HTTPS client-function section 41, the same as the HTTPS client-function section 31 of the upper apparatus 30, has a function of using the HTTPS protocol to request communications with the apparatus having the function of the HTTPS server such as the upper apparatus 30 as well as transmitting/receiving a command and a response to the command.

The HTTPS server-function section 42, again, being the same as the HTTPS server-function section 32, has a function of accepting a request for communications from the apparatus having the HTTPS client function as well as transmitting/receiving a command and a response to and from the command.

While a function of the authentication processor 43, again, is the same as that of the authentication processor 33 of the upper apparatus 30, the certificate, etc., for use in authenticating are those being stored in the certificate storage 45.

The request manager 44 has a function of determining, for the command received from the upper apparatus, whether to execute operations based on the command. Then, it also has a function of, when accepting executing, passing on the command to the function sections 46 through 49 for executing operations based on the command.

Figures 4, 5:
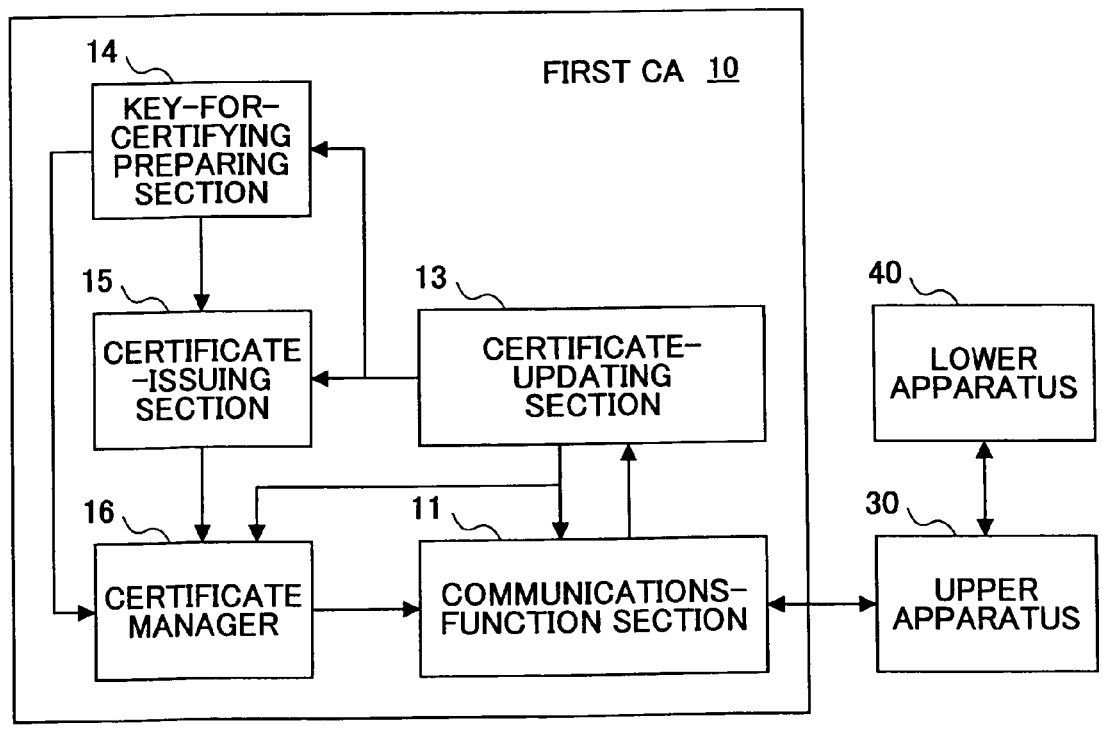
FIG. 4 is a table for describing criteria for determining accepting/not accepting a request in a request manager of the lower apparatus illustrated in FIG. 3.
FIG. 5 is a functional block diagram for illustrating a functional configuration of portions related to features of the present invention, for the first CA illustrated in FIG. 1.

In FIG. 4 is illustrated criteria for determining whether to execute as described above, which are types of commands and types of digital certificates used for authenticating in the authentication processor 43. While details are described below, the digital certificates, being stored in the upper apparatus 30 and the lower apparatus 40, consist of a normal public-key certificate for use in normal communications and a rescue public-key certificate for use in an emergency for recovering from the state of not being able to authenticate by the normal public-key certificate, so that the request manager 44, as illustrated in FIG. 4, provides for accepting all operations when authenticating with the normal public-key certificate, while accepting only an operation of setting a certificate when authenticating with the rescue public-key certificate. It is noted that a certificate for setting (including updating) is to be limited to the normal public-key certificate so that the rescue public-key certificate is not to be set. Therefore, the rescue public-key certificate is said to be a certificate for use only when having the lower apparatus 40 to store a new normal public-key certificate (and a private key and a root-key certificate for having the lower apparatus store that are associated with the new normal public-key certificate).

The certificate storage 45 functions as certificate-storage means for storing authentication information such as various certificates and private keys, etc., the same as the certificate storage 35 of the upper apparatus, so as to provide for authenticating in the authentication processor 43. It is noted that the certificates, etc., being stored are, as described below, different from those of the certificate storage 35.

The call-reporting section 46 has a function of performing a call for reporting to the upper apparatus 30 when an abnormality is detected or when there is an instruction from a user.

The periodic-reporting section 47 has a function of reporting periodically from the lower apparatus 40 to the upper apparatus 30. The contents of the reporting may be, for example in a case of an image-forming apparatus, a value of a counter for counting the number of images formed, and in a case of a measuring system the measured value thereof, etc.

The certificate-setting section 48 has a function of setting at the certificate storage 45 the certificate, etc., received from the upper apparatus 30 for use in authenticating, and updating the certificate, etc.

The command receiver 49 has a function of executing an operation corresponding to a request for a function other than functions of the function sections 46 through 48 as described above. The operation may be to transmit data being stored in the lower apparatus 40 or to control as needed an operation of an engine (the illustration being omitted).

Then, the function of each of these sections is implemented by the CPU of the lower apparatus 40 executing a required control program so as to control the operation of each section of the lower apparatus 40.

Moreover, in FIG. 5 is illustrated a functional configuration of portions related to the present invention, for the first CA 10.

As illustrated, the first CA 10 comprises a communications-function section 11, a certificate-updating section 13, a key-for-certifying preparing section 14, a certificate-issuing section 15, and a certificate manager 16.

The communications-function section 11 has a function of communicating with the upper apparatus 30, causing each section of the apparatus to execute operations such as receiving a request for issuing a certificate set and transmitting a certificate set issued, as well as operations according to a request and a data item received, and returning a response to the requestor.

It is noted that when using the SSL for communicating with the upper apparatus 30, it is possible for setting the communications-function section 11 to have a function of such section as the HTTPS server-function section or the HTTPS client-function section. In this case, an authentication processor, as in the cases of the upper apparatus 30 and the lower apparatus 40, is provided so as to provide for authenticating using an appropriate certificate.

The certificate-updating section 13 has a function of, when there is a request for issuing a certificate from the upper apparatus 30, causing the key-for-certifying preparing section 14 and the certificate-issuing section 15 to issue a new certificate set of the target lower apparatus 40 so as to cause the key-for-certifying preparing section 14 and the certificate-issuing section 15 to transmit the set to the upper apparatus 30 from the certificate manager 16 via the communications-function section 11.

The key-for-certifying preparing section 14 functions as key-for-certifying preparing means for preparing a root-private key being a private key for certifying that is used in preparing a digital signature, and a root key being a public key for certifying (a certifying key) corresponding to the root-private key that is for confirming the validity of the digital certificate.

The certificate-issuing section 15 has a function of issuing to the upper apparatus 30 and the lower apparatus 40 a public key for use in authenticating according to the SSL protocol and its corresponding private key. Then in addition, it functions as certificate-issuing means for applying to the respectively issued public keys a digital signature using a root-private key prepared at the key-for-certifying preparing section 14 so as to issue a public-key certificate. Moreover, issuing a root-key certificate having applied a digital signature to a root key is also a function of this certificate-issuing section 15.

The certificate manager 16 functions as certificate-managing means for managing a digital certificate issued by the certificate-issuing section 15, a root-private key used in the preparation thereof, and a root key corresponding to the root-private key. Then, the certificate and the keys are stored together with information on the validity and the subject, ID, and whether updated thereof.

Then, the functions of each of the sections as described above are implemented by the CPU of the first CA 10 executing a required control program so as to control the operation of each of the sections of the first CA 10.

Next, the characteristics and the usage of each of the certificates and keys used in authenticating by the apparatuses as described above are described.

Figure 6A:
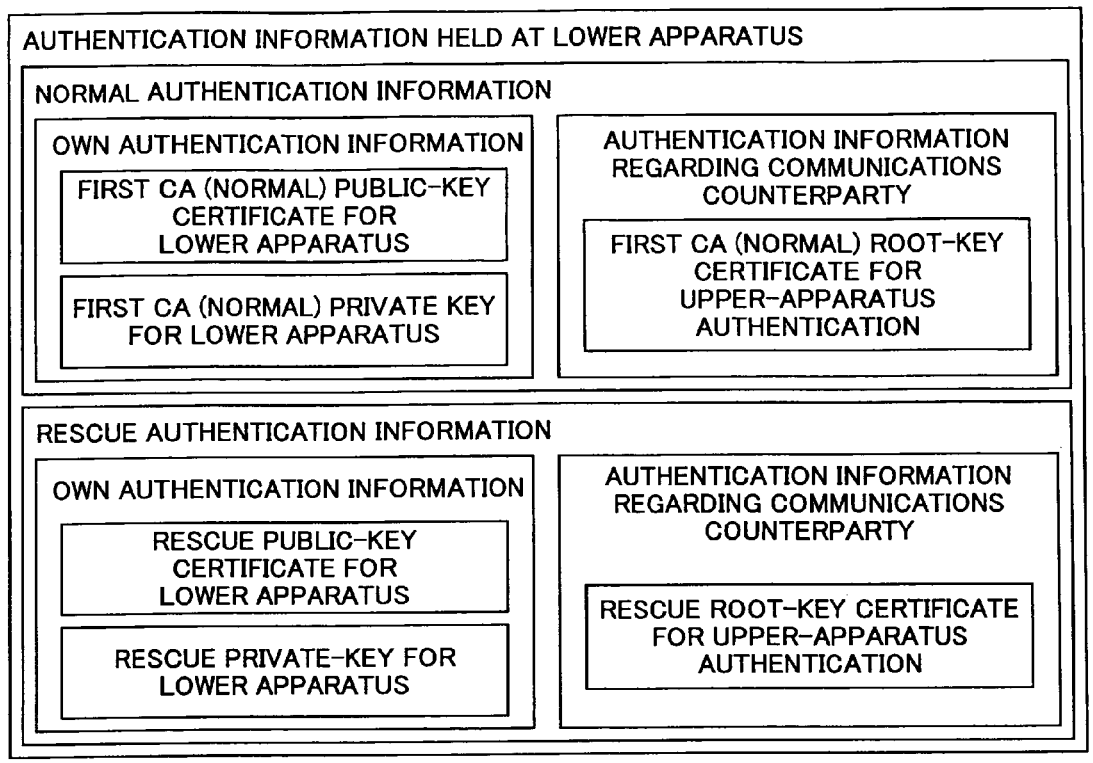
FIG. 6A is a diagram for describing authentication information being stored in the upper apparatus illustrated in FIGS. 1 and 3.
Figure 6B:
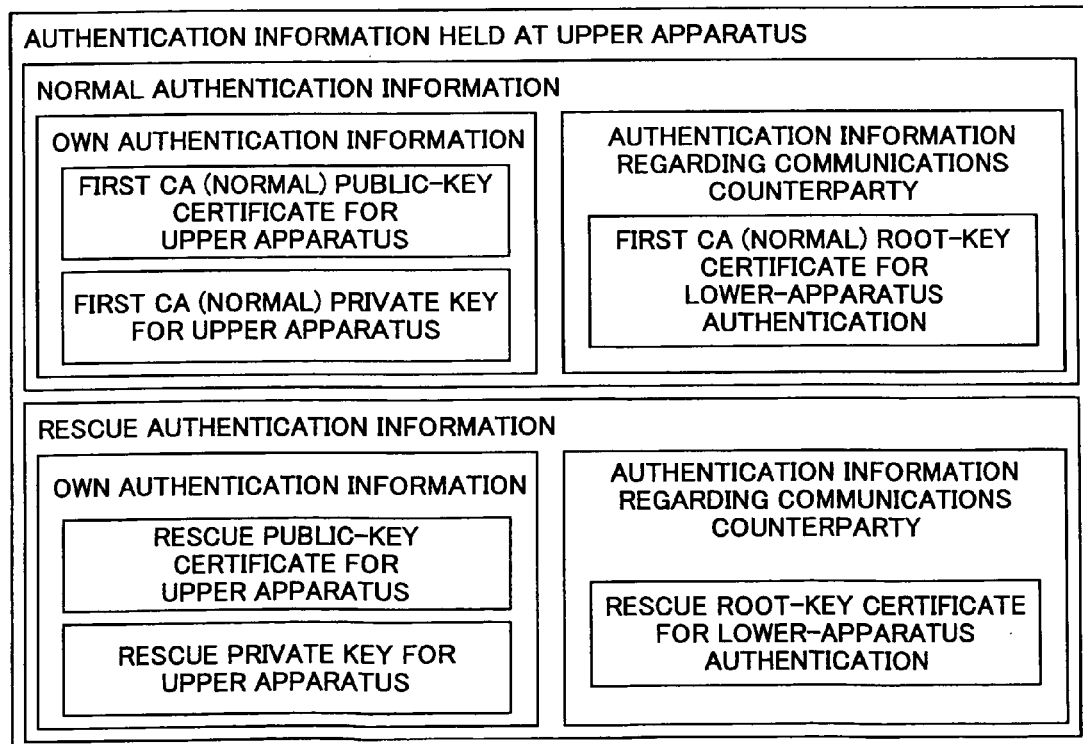
FIG. 6B is a diagram for describing authentication information being stored in the lower apparatus illustrated in FIGS. 1 and 3.

FIG. 6A is a diagram illustrating the types of certificates and keys being stored in the certificate storage 45 of the lower apparatus 40, while FIG. 6B is a diagram illustrating the types of certificates and keys being stored in the certificate storage 35 of the upper apparatus 30.

As illustrated, the upper apparatus 30 and the lower apparatus 40 have stored therein information broadly divided into normal authentication information and rescue authentication information. Then, the normal authentication information and the rescue authentication information are each configured from a public-key certificate and a private key that are authentication information regarding own apparatus, and a root-key certificate being authentication information regarding the communications counterpart.

Figure 34:
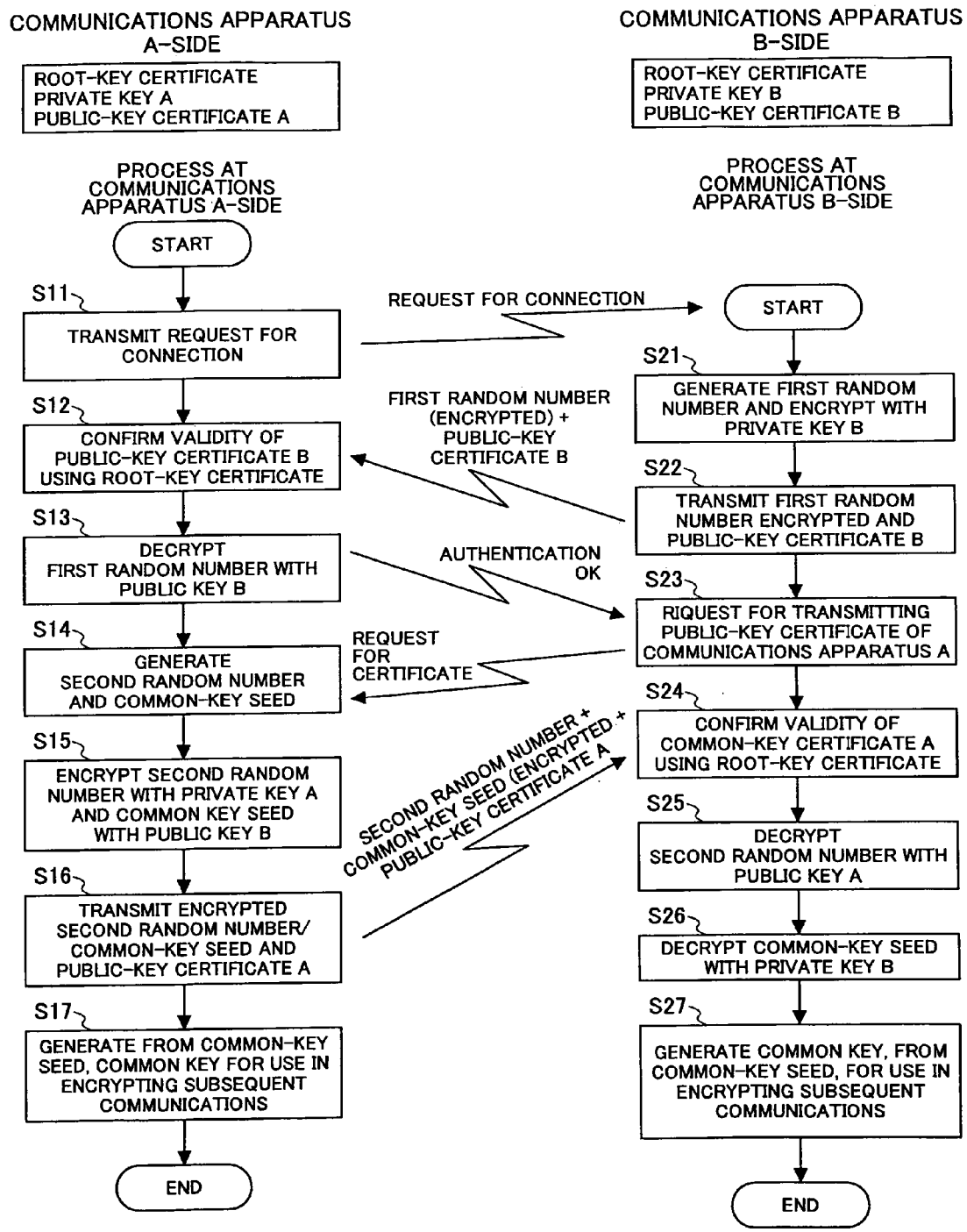
FIG. 34 is a diagram illustrating a flow of a process for executing in each apparatus when two communications apparatuses mutually authenticate according to SSL, as well as information for use in the process.
Figure 35A:
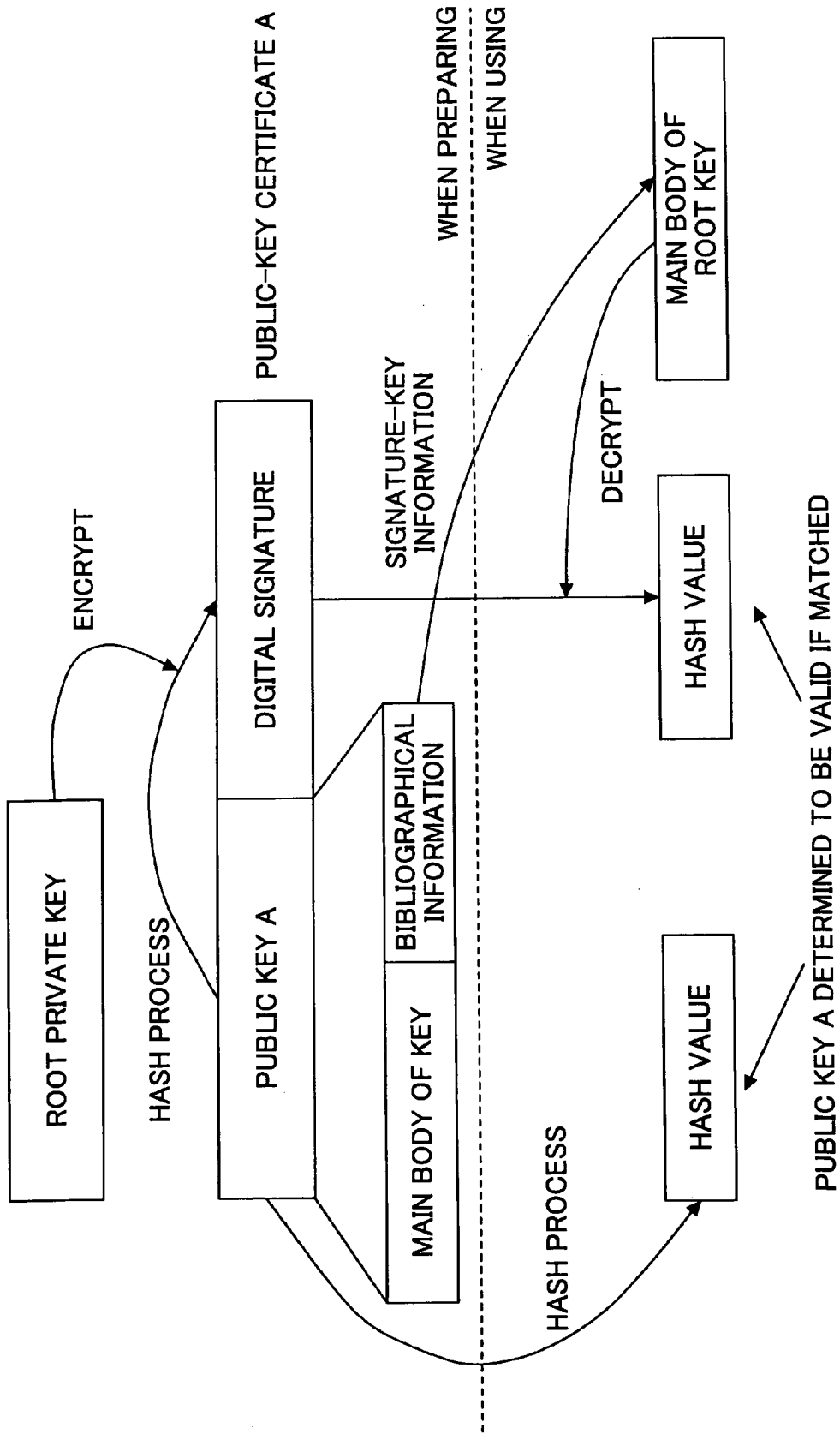

Then, each apparatus, when conducting normal communications, uses these authentication-information items so as to perform according to the SSL the authentication procedure as illustrated in FIG. 34.

Figure 36:
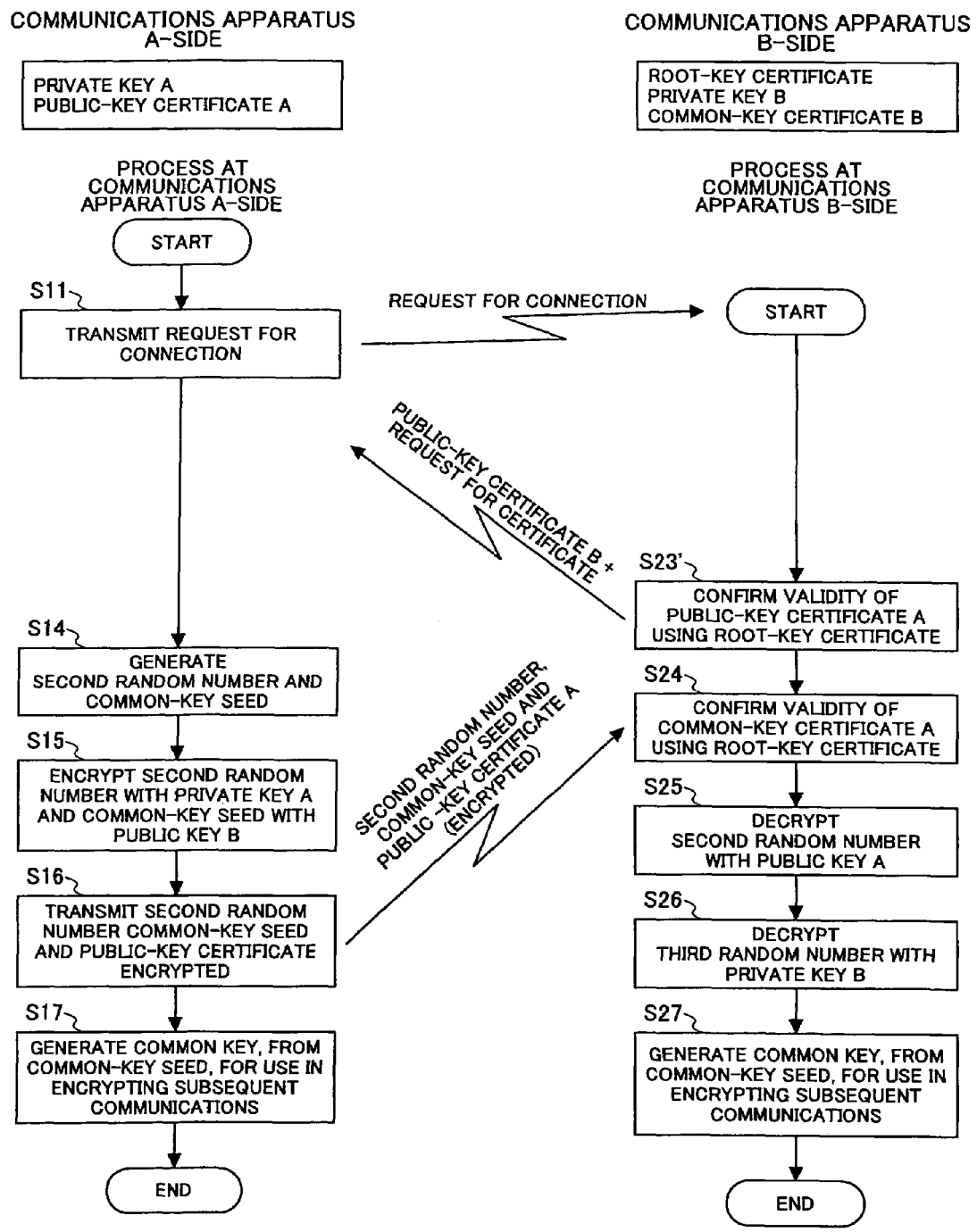
FIG. 36 is a diagram illustrating an exemplary variant authentication process, together with information used in the process.

Moreover, though different from the normal SSL, it is possible to perform an authentication process having omitted a procedure of encrypting a first random number with a private key B for transmitting the encrypted number with a public-key certificate B to a communications apparatus A. The process in this case being as illustrated in FIG. 36, when compared with the process as illustrated in FIG. 34, does not require the process of steps S21 and S22 at the communications apparatus B side and the process of steps S12 and S13 at the side of the communications apparatus A (the apparatus functioning as the client). In this way, while the communications apparatus A cannot authenticate the communications apparatus B (the apparatus functioning as the server), this process suffices when only the communications apparatus B authenticating the communications apparatus A is needed. Then, in this case, there is no need to have the communications apparatus A store a root-key certificate. It is noted that as a public key B and a private key B are used for securely transmitting a common-key seed from the communications apparatus A to the communications apparatus B, while not for use in authentication, these keys are to be stored in the communications apparatus B.

Moreover, out of the certificates and keys illustrated in FIGS. 6A and 6B, a certificate and a key having a name including "first CA" are ones issued by the first CA 10. For example, a first CA public-key certificate for the lower apparatus is a digital certificate having applied to a first CA public key issued by the first CA 10 to the lower apparatus 40, a digital signature enabled to confirm its validity using a first CA root key for authenticating the lower apparatus. Then, this is a public-key certificate for use in authenticating in normal communications by the lower apparatus, corresponding to a first normal certificate.

It is noted that the names such as normal public-key certificate, etc., shown in parentheses in FIGS. 6A and 6B represent public-key certificates, etc., for use in authenticating in normal communications. Moreover, as public-key certificates, etc., for use in authenticating in normal communications, there are also ones issued by the second CA 20 as described below, which are also to be collectively referred to as normal public-key certificates, etc. Then, when it is necessary to distinguish between the public-key certificates, etc., issued by the first CA 10 and the public-key certificates, etc., issued by the second CA 20, they are to be referred to with names including "first CA" or "second CA".

Now, the public-key certificate, for which one illustrated in FIG. 7 may be used as an example, describes the public key itself as well as information on the issuer of the certificate, the validity period of the certificate, the subject to be certified (an apparatus or a user of the issuer of the certificate), etc. More specifically, the certificate may be prepared according to a format referred to as X. 509 for example, so that the first CA public-key certificate for the lower apparatus that is prepared according to the format becomes one such as illustrated in FIG. 8, for example.

In this example, A represents information identifying the first CA 10, while C represents information identifying the lower apparatus 40 being the subject of the certificate. These include information such as location, name, equipment number, or code. It is noted that, for the subject apparatus, it is not mandatory to describe identifying information, which would enable identifying individual apparatuses, such as the equipment number. Moreover, B represents the validity period with the starting date/time and the ending date/time specifying the validity period.

Moreover, the first CA private key for the lower apparatus is a private key corresponding to the first CA public key as described above, while the first CA root-key certificate for authenticating the lower apparatus is a digital certificate applying to a first CA root key for authenticating the lower apparatus using a root-private key corresponding to itself a digital signature able to confirm itself the validity.

It is noted that even when having provided multiple lower apparatuses 40, the digital signatures applied to the first CA public key of each apparatus are applied using the same root-private key and the first CA root-key certificates required for confirming the validity set to be common. However, the first CA public-key included in the first CA public-key certificate and its corresponding private key differ from apparatus to apparatus.

The same relationship holds for the first CA public-key certificate for the upper apparatus, the first CA private key for the upper apparatus, and the first CA root-key certificate for authenticating the upper apparatus.

Then, for example, when the upper apparatus 30 and the lower apparatus 40 mutually authenticate, in response to a request for communications from the lower apparatus 40, the upper apparatus 30 transmits to the lower apparatus 40 a first random number encrypted using the first CA private key for the upper apparatus, along with a first CA public-key certificate for the upper apparatus. At the lower apparatus 40 side, a first CA root-key certificate is used to first confirm the validity of the first CA public-key certificate for the upper apparatus (that there is no damage or tampering) so as to decrypt the first random number with the public key included therein when the validity is confirmed. When the decrypting is successful, the lower apparatus 40 is able to recognize that the upper apparatus 30 of the communications counterpart is certainly a subject of the first CA public-key certificate for the upper apparatus so as to be able to specify the apparatus from identifying information included in the certificate. Then, success of an authentication can be determined depending on whether the specified apparatus is suitable as a communications counterpart.

Then, also at the upper-apparatus 30 side, receiving a first CA public-key certificate for the lower apparatus that is transmitted thereto when authentication succeeds at the lower apparatus 40 side, and a random number encrypted with the first CA private key for the lower apparatus so as to use a first CA root-key certificate for authenticating the lower apparatus that is stored to perform the same authentication is enabled.

Now, this procedure is a process when the lower apparatus 40 by means of the HTTPS client-function section 41 requests for communications to the HTTPS server-function unit 32 of the upper apparatus 30 so that when the upper apparatus 30 by means of the HTTPS client-function section 31 requests for communications to the HTTPS server-function unit 42 of the upper apparatus 40, while the certificates and keys used are the same, the process of the upper apparatus 30 and the process of the lower apparatus 40 are reversed.

Now, as apparent from the description thus far, even when each apparatus sends the normal public-key certificate to the communications counterpart, if the certificate is corrupted or the validity period of the certificate has expired, authenticating is not possible. Then, such a state as described above may well occur in a case such that a power supply is turned off during the updating of authentication information so as to cause a failure of the updating or in a case such that the power supply of the apparatus is left in the state of being turned off so that the updating cannot be done within the validity period of the certificate.

Now, if each apparatus can only authenticate using a normal public-key certificate, when the validity period has expired, there is no way of securely transmitting to the target apparatus via a network a new normal public-key certificate and a normal private key, and a normal root-key certificate. However, each communications apparatus configuring this system for transferring digital certificates has stored therein rescue authentication information to deal with such circumstances, providing for authenticating the communications counterpart using two different types of digital certificates. Then, using the rescue authentication information provides for securely transmitting via a network a new normal public-key certificate, etc.

This rescue authentication information, having roughly the same configuration as the normal authentication information, is a digital certificate having applied to the rescue public-key issued to the lower apparatus by a rescue CA (not illustrated) a digital signature to confirm the validity using a rescue root-key for authenticating the lower apparatus. Moreover, a rescue private-key for the lower apparatus is a private key corresponding to the rescue public-key while a rescue root-key certificate for authenticating the lower apparatus is a digital certificate having applied to the rescue root-key for authenticating the lower apparatus a digital signature to confirm the validity using own apparatus.

Then, it is possible to use, as such rescue authentication information, information having two types of features depending on the usage.

It is possible to use, as a first type, a rescue public-key certificate without apparatus-identifying information. It is noted that such digital certificate corresponds to a common certificate.

In this case, all the apparatuses having the same level (in the example illustrated in FIG. 1, the levels of the upper apparatus and the lower apparatus exist) are set to have the same rescue public-key certificates stored therein. As each apparatus of the same level does not need to be distinguishable individually, it suffices to have all the common ones including the rescue public-key included in the certificate and its corresponding rescue private-key. Then, as the rescue public-key certificates of the communications counterparties are all the same, the root-key certificate is common for all apparatuses that are to be a communications counterpart of an apparatus of a certain level. In other words, it can be said that even when having provided multiple lower apparatuses as illustrated in FIG. 13, the same rescue authentication information is set to be stored in each of the lower apparatuses.

The same holds for the rescue authentication information of the upper apparatus 30.

Moreover, the format, in which such a rescue public-key certificate may be prepared, may be the same as one for the normal public-key certificate, and may be set as illustrated in FIG. 9, for example. In this case, for example, as represented with a letter E, it is possible to set zero (0) as the equipment number (CN) of the subject apparatus so as to indicate it as being a common certificate. Then, as for information on the issuer CA, as represented with a letter D information identifying the rescue CA is provided.

Such rescue authentication information having the characteristics of being common to each one of all of the apparatuses of the same level enables storing, at the time of manufacturing the apparatus, information according to the level specified depending on the model. In other words, as the information does not include apparatus-identifying information, there is no need for each individual certificate to each apparatus being assigned an identification number upon completing an inspection process so as to have the certificate stored, so that storing a large number of apparatuses is a simple task. For example, rescue authentication information may be set to be included in a control program master file so as to cause the rescue authentication information to be stored as well when copying the control program to the apparatus. Then, by making sure not to subsequently update the rescue authentication information, maintaining the state of being able to authenticate using the rescue public-key certificate included in the rescue authentication information is enabled even when, as described above, the updating of the normal authentication information cannot be done, or the normal authentication information is corrupted so that authentication with the normal public-key certificate cannot be done.

Now, when using a rescue public-key certificate without information identifying the apparatus, even if performing authentication using the certificate, it is not possible to specifically identify the apparatus of the communications counterpart. However, it is possible to obtain information about the communications counterpart to a certain extent.

In other words, when, for example, a certain vendor sets to have all of the apparatuses that correspond to the lower apparatus 40 out of its in-house products, store therein rescue authentication information for the lower apparatus (a rescue public-key certificate for the lower apparatus, a rescue private-key for the lower apparatus and a rescue root-key certificate for the upper apparatus) and sets to have all of the apparatuses that correspond to the upper apparatus 30, to be their communications counterparts, store therein rescue authentication information for the upper apparatus (a rescue public-key certificate for the upper apparatus, a rescue private-key for the upper apparatus and a rescue root-key certificate for the lower apparatus), the lower apparatus 40 is able to recognize that the counterpart from which the public-key certificate enabled to confirm the validity with the rescue root-key certificate for authenticating the upper apparatus being stored on its own, when transmitted, is the upper apparatus 30 of the same vendor, and conversely the upper apparatus 30 is able to recognize as well that the counterpart from which the public-key certificate enabled to confirm the validity with the rescue root-key certificate for authenticating the lower apparatus being stored on its own, when transmitted, is the lower apparatus 40 of the same vendor.

Then, when such authentication succeeds, as described above, exchanging a common key with the communications counterpart so as to provide a secure communications path using the common-key cipher is enabled, also enabling subsequently exchanging equipment-number information, etc., so as to identify the communications counterpart.

Therefore, even when not using identifying information described in the normal public-key certificate, it is possible to identify the communications counterpart.

As a second case, it is possible to use having a validity period of the rescue public-key certificate that is set longer than the validity period of a normal public-key certificate. It is noted that such a digital certificate corresponds to a long-term certificate.

An exemplary rescue public-key certificate in this case is illustrated in FIG. 10. In this certificate as well, as in the case of the common certificate as described above, information identifying a rescue CA as represented with a letter F is provided. Moreover, as represented with a letter H, as information identifying the subject apparatus, the same identifying information as the subject of the first CA public-key certificate is applied. Then, the validity period in the first CA public-key certificate illustrated in FIG. 8 is set to be one year from 00:00 am, Jan. 1, 2003 to 00:00 am, Jan. 1, 2004, while the validity period of the rescue public-key certificate, as illustrated with a letter G in FIG. 10, is set to be fifty years from 00:00 am, Jan. 1, 2000 to 00:00 am, Jan. 1, 2050.

Moreover, it is possible to use rescue authentication information including a rescue public-key certificate having combined the characteristics of both the common certificate and the long-term certificate as described above. Then, in the following descriptions, as the process executed by each apparatus is the same regardless of whether the rescue public-key certificate corresponds to a common certificate or a long-term certificate so that these need not be distinguishable, the certificate is described as being merely a rescue public-key certificate.

Now, when authenticating according to the SSL protocol, as the server is not able to know, at the time there is a request for communications from the client, the state of the client, inevitably, when accessing a specific URL (Uniform Resource Locator), the same public-key certificate is returned all the time. Therefore, basically, it is not possible to adopt a configuration such that one apparatus has multiple public-key certificates so as to choose a suitable one, depending on the type of public-key certificate that the communications counterpart is trying to use in authenticating, for transmitting. However, in each apparatus illustrated in FIG. 1, adopting a special configuration enables making proper use of the normal public-key certificate and the rescue public-key certificate as appropriate.

Figure 11:
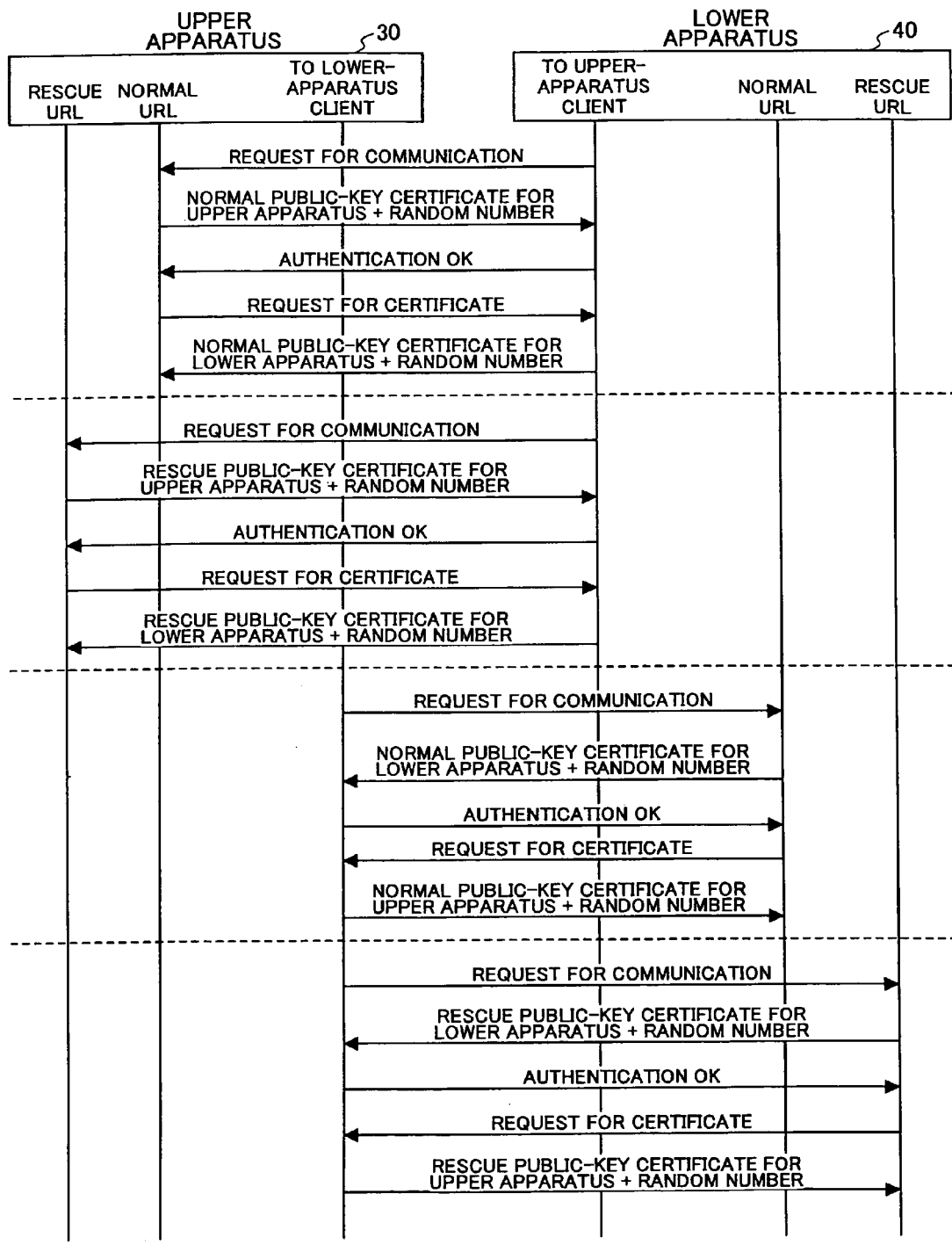
FIG. 11 is a sequence diagram for describing a configuration for making proper use of the normal public-key certificate and the rescue public-key certificate in the upper apparatus illustrated in FIGS. 1 and 3.

Now, the configuration for making proper use is described using FIG. 11.

As described above, the server basically can return only a specific public-key certificate to the client requesting for communications. However, it is possible to return a different public-key certificate per URL when the URLs of the requests for communications differ.

Therefore, as illustrated in FIG. 11, then the upper apparatus 30 and the lower apparatus 40 are respectively provided with a normal URL for authenticating with a normal public-key certificate and a rescue URL for authenticating with a rescue public-key certificate, providing for the side requesting communications (the side functioning as the client) to selectively specify either of the URLs depending on the type of authentication requested so as to provide for sending the request for communications.

When adopting the SSL as a communications protocol between the upper apparatus 30 and the lower apparatus 40, as port 443 is typical for a port used in communications, there is a need to change the IP address between the normal URL and the URL for the first CA. Therefore, the upper apparatus 30 and the lower apparatus 40 are to be configured as apparatuses consisting of multiple portions enabled for setting respectively different IP addresses (that may be in different enclosures or in the same enclosure).

In this way, the side being requested to communicate (the side functioning as the server) distinguishes a request for communications depending on the URL accepting the request for communications so as to provide for returning a normal public-key certificate when accepting at the normal URL and returning a rescue public-key certificate when accepting at the rescue URL.

It is noted that the side of the client requesting communications is able to know to which URL the request for communications is sent, enabling choosing an appropriate public-key certificate depending on the URL when mutually authenticating so as to transmit the chosen certificate.

When the lower apparatus 40 tries to communicate with the upper apparatus 30, at first authentication using a normal public-key certificate is tried. When the authentication fails due to corrupting of the normal public-key certificate or expiring of the validity period, etc., trying authentication using a rescue public-key certificate is provided for. Moreover, authentication using a rescue certificate succeeds as long as the upper apparatus 30 is suitable as a communications counterpart and the validity period of the rescue public-key certificate has not expired, and the upper apparatus 30 has provided therein a function of, when the authentication succeeds, updating normal authentication information of the lower apparatus 40.

In other words, when the lower apparatus 40 requests for communications with the upper apparatus 30, first a request for communications is transmitted to a normal URL so as to authenticate using a normal public-key certificate, whereas when the authentication fails, then a request for communications is transmitted to a rescue URL so as to authenticate using a rescue public-key certificate.

Then, the upper apparatus 30, when authenticating the lower apparatus 40 using the rescue public-key certificate so as to determine the lower apparatus as a suitable communications counterpart, requesting a certificate set for updating from a CA (the first CA 10, for example) so as to transmit the obtained set to the lower apparatus 40 for storage is provided for.

Even for authentication using a rescue public-key certificate, as sharing a common key is possible as in the case of using a normal public-key certificate, a certificate set can be securely transmitted by encrypting using the shared common key. It is noted that the configuration of this certificate set illustrated in FIG. 12 configures normal authentication information to be stored by the lower apparatus 40. Then as a matter of course, a normal public-key certificate included in a certificate set for updating is one within the validity period.

Then the lower apparatus 40 provides for, when receiving the request as described above, having the certificate storage 45 to store therein the received certificate set by means of the certificate-updating section 13 so as to update the previous normal authentication information.

The successful updating results in having the lower apparatus 40 store therein again a normal public-key certificate which is within its validity period and which is not corrupted, etc., enabling authenticating using a normal public-key certificate. Therefore subsequently authenticating using a normal public-key certificate so as to execute communications may be provided for.

It is noted that in the authentication information illustrated in FIGS. 6A and 6B, the same normal root-key certificate may be used regardless of the authentication subject (the root-key certificate for authenticating the upper apparatus and the root-key certificate for authenticating the lower apparatus may be the same). This is because as the normal certificate has appended apparatus-identifying information, when it is possible to confirm the validity using the root-key certificate, it is possible to subsequently refer to the identifying information so as to identify the model and the level of the apparatus. The same holds for a rescue root-key certificate when adopting a long-term certificate. On the other hand, when adopting a common certificate, as apparatus-identifying information is not appended to the public-key certificate, distinguishing the type is performed based on whether the validity may be confirmed with a specific root-key certificate. Thus, the rescue root-key certificate in this case needs to be different per level of the authentication subject.

Next, a process is described of updating a certificate using such two types of authentication information, namely normal authentication information and rescue authentication information. A process at the lower apparatus 40 side is illustrated in a flowchart in FIG. 14, while a process at the upper apparatus 30 side is illustrated in a flowchart in FIG. 15. In each of these processes, being one in which the CPU of the upper apparatus 30 and the CPU of the lower apparatus 40 respectively execute a required control program, the process at the upper apparatus 30 side is a process regarding a first transfer procedure such that in this process the CPU of the upper apparatus 30 functions as first transferring means.

It is noted that in these flowcharts a process in which the lower apparatus 40 requests for communications with the upper apparatus 30 is illustrated.

Figure 14:
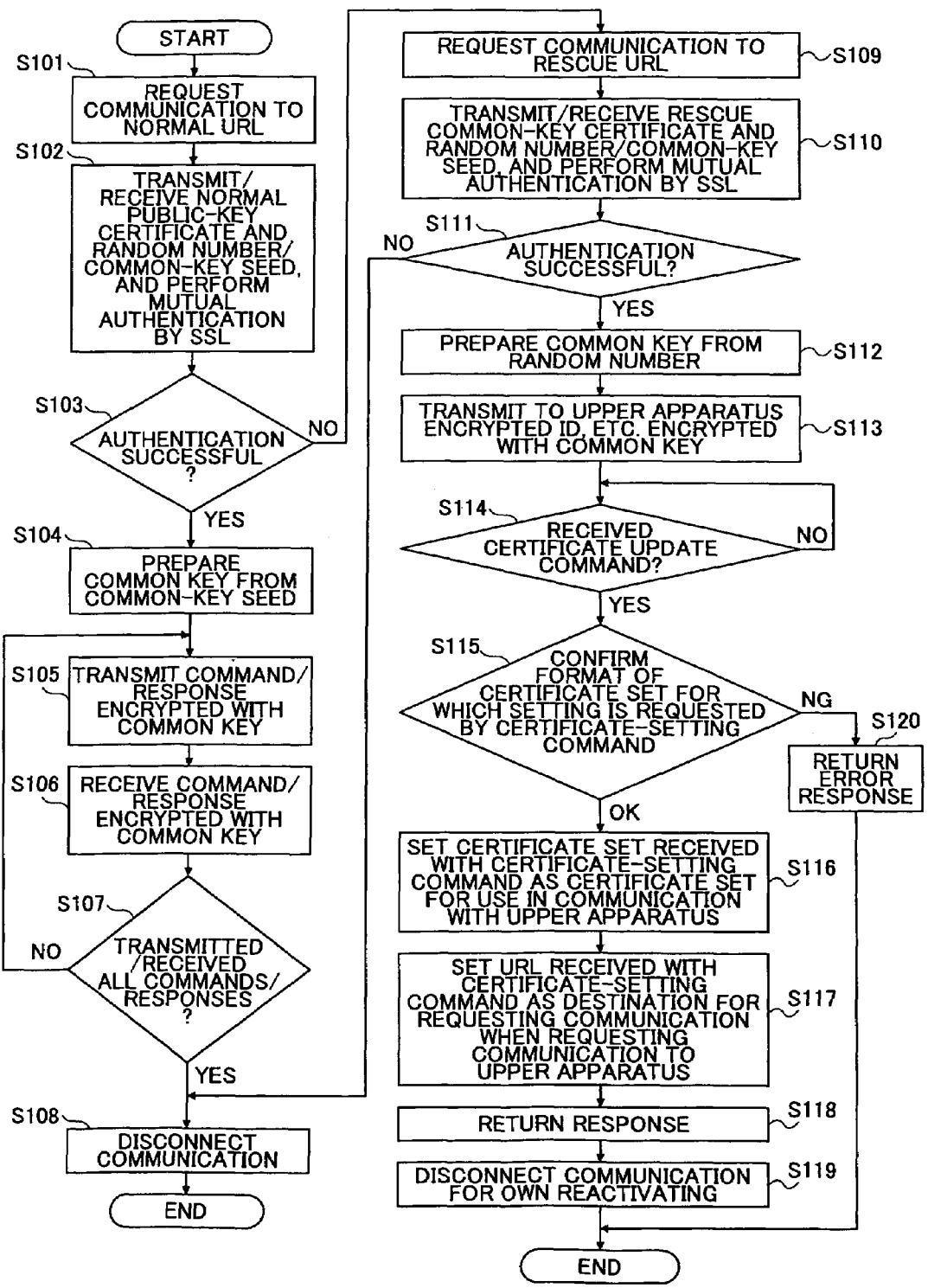
FIG. 14 is a flowchart illustrating executing at the lower-apparatus side out of the process regarding updating of a certificate according to a rescue method, in the system for transferring digital certificates as illustrated in FIGS. 1 and 3.

When the lower apparatus 40 transmits a command or a notice to an upper apparatus 30 or when polling in order to receive a command or a report from the upper apparatus 30, the process illustrated in the flowchart in FIG. 14 is started so that first in step S101 a request for communications is transmitted to a normal URL of the upper apparatus 30. It is noted that the lower apparatus 40 is to have stored therein a normal URL and a rescue URL as destinations for requesting communications for the upper apparatus 30 to be the communications counterpart.

Figure 33:
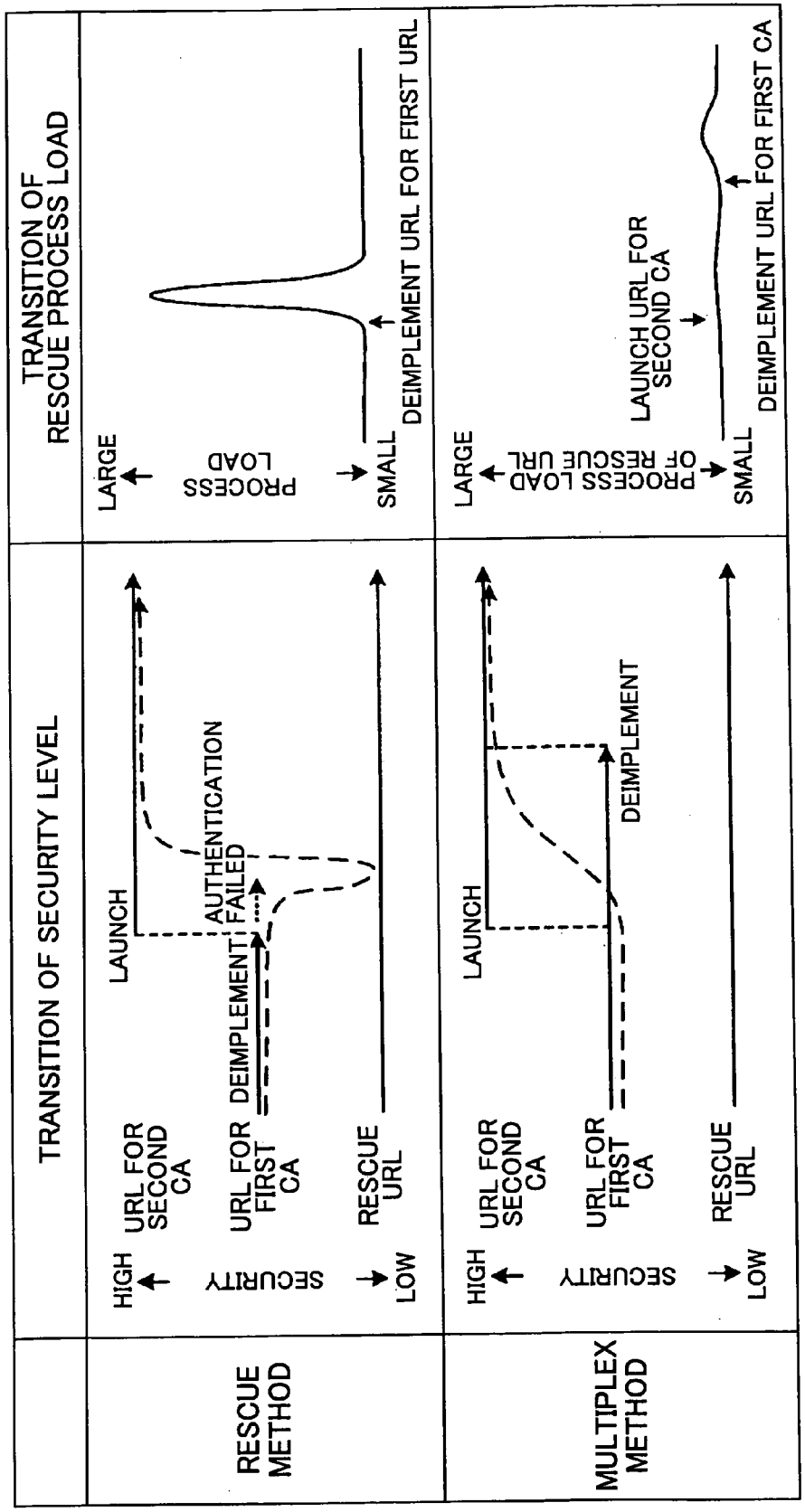
FIG. 33 is a diagram for describing the advantages of the present invention.

Now then in step S102 a normal public-key certificate and a random number and a common-key seed are transmitted/received with the upper apparatus 30 and mutual authentication using the SSL as illustrated in FIG. 33 is performed. This process includes a process of obtaining information identifying the originator of the request for communications from the received public-key certificate.

Then, in step S103 whether this authentication has succeeded is determined. Then, if successful, communication is established with the upper apparatus 30 so as to proceed to step S104 and beyond for performing normal communications.

In other words, first in step S104 a common key is generated from the common-key seed exchanged in step S102. Then in step S105 a command and a response to a received command are encrypted with the generated common key so as to be transmitted to an apparatus currently communicating (the upper apparatus 30 here), and in step S106 a command and a response to a transmitted command in the state of being encrypted with the same common key are received from the apparatus currently communicating. Then, in step S107 whether all commands and responses are transmitted/received is determined. Then, if there is any remaining one, the process returns to step S105 so as to repeat steps S105-107, and if all are transmitted/received, the process proceeds to step S108 so as to disconnect the communications and terminating the process.

It is noted that steps S105 and S106 do not have to be in any particular order and are omitted when there are no commands/responses to be transmitted/received. Then, executing the process regarding the received command so as to generate a response, and interpreting the contents of the received response so as to perform the operations corresponding to the interpreted results, are to be executed separately from the flowchart illustrated in FIG. 14, having the received commands and responses stored.

On the other hand, when the authentication has failed in step S103, the process proceeds to step S109 and beyond so that rescue authentication information is used so as to attempt obtaining a certificate set for updating. It is noted that when the cause of the failure of authentication is not one due to an abnormality of a certificate, such as a communication abnormality, not performing this process may be provided for.

In the process of step S109 and beyond, first in step S109, a request for communications is transmitted to a rescue URL of the upper apparatus 30. Then, in step S110, a rescue public-key certificate and a random number and a common-key seed are transmitted/received with the upper apparatus 30 so as to mutually authenticate according to the SSL as illustrated in FIG. 33. This process includes a process of obtaining from the received public-key certificate, if any, information identifying the originator of the request for communications.

Then, in step S111, whether this authentication has succeeded is determined. When the authentication has failed here, without performing the process in step S108 the communication is disconnected so as to terminate the process, while when the authentication has succeeded, the communication is established with the upper apparatus 30 so as to proceed to step S112 and beyond for performing the process regarding obtaining and setting the certificate set for updating.

In other words, first in step S112, a common key is generated from the random number exchanged in step S110. Then, in step S113, information of the equipment number, etc., encrypted with the common key is transmitted to the upper apparatus 30. In the upper apparatus 30 this information is used for confirming that the lower apparatus 40 is a valid communications counterpart, and is also used as information identifying the lower apparatus 40 described in the certificate for updating. It is noted that when there is sufficient information provided in the rescue public-key information, step S113 is not needed.

After the step S113, in step S114, the process waits for a certificate-setting command from the upper apparatus 30. As described above, when authenticating using the rescue public-key certificate, not performing operations regarding requests other than the one described above is provided for.

Then, when receiving the certificate-setting command, the process proceeds to step S115 for checking the format of a certificate set for which setting is requested with a certificate-setting command. Then, if the result is unsuitable (NG), in step S120 an error response indicating that the setting of a certificate set and a URL has failed is returned so as to terminate the process.

On the other hand, in step S115 if the result is suitable (OK), the process proceeds to step S116 for setting the certificate set for which setting is requested by the certificate-setting command as a certificate set for use in communicating with the upper apparatus 30. Then, in step S117, the URL for which setting is requested by the certificate-setting command is set as a destination for requesting communications when requesting for communications with the upper apparatus 30, in other words when communicating using a new certificate set.

Then, once this is completed, in step S118 a response is returned, and in step S119 the communication is disconnected so as to reactivate itself. This reactivating, being necessary when changing an important setting in the lower apparatus 40, corresponds here to the setting of the certificate set. When reactivating, an authorization for reactivating may be sought from the user. Moreover, while FIG. 14 illustrates such that the post-process of step S119 is terminated, actually when reactivating step S119 the process is suspended.

It is noted that the settings in steps S116 and S117 are performed by having to store the certificate set and the URL in the certificate storage 45.

Moreover, when receiving a certificate set and a URL for which setting is requested by a certificate setting command, separately from a certificate-setting command, preferably, having to store temporarily the received certificate set and URL in a suitable storage area so as to set the certificate set and the URL at the time of having received the certificate-setting command is provided for.

Figure 15:
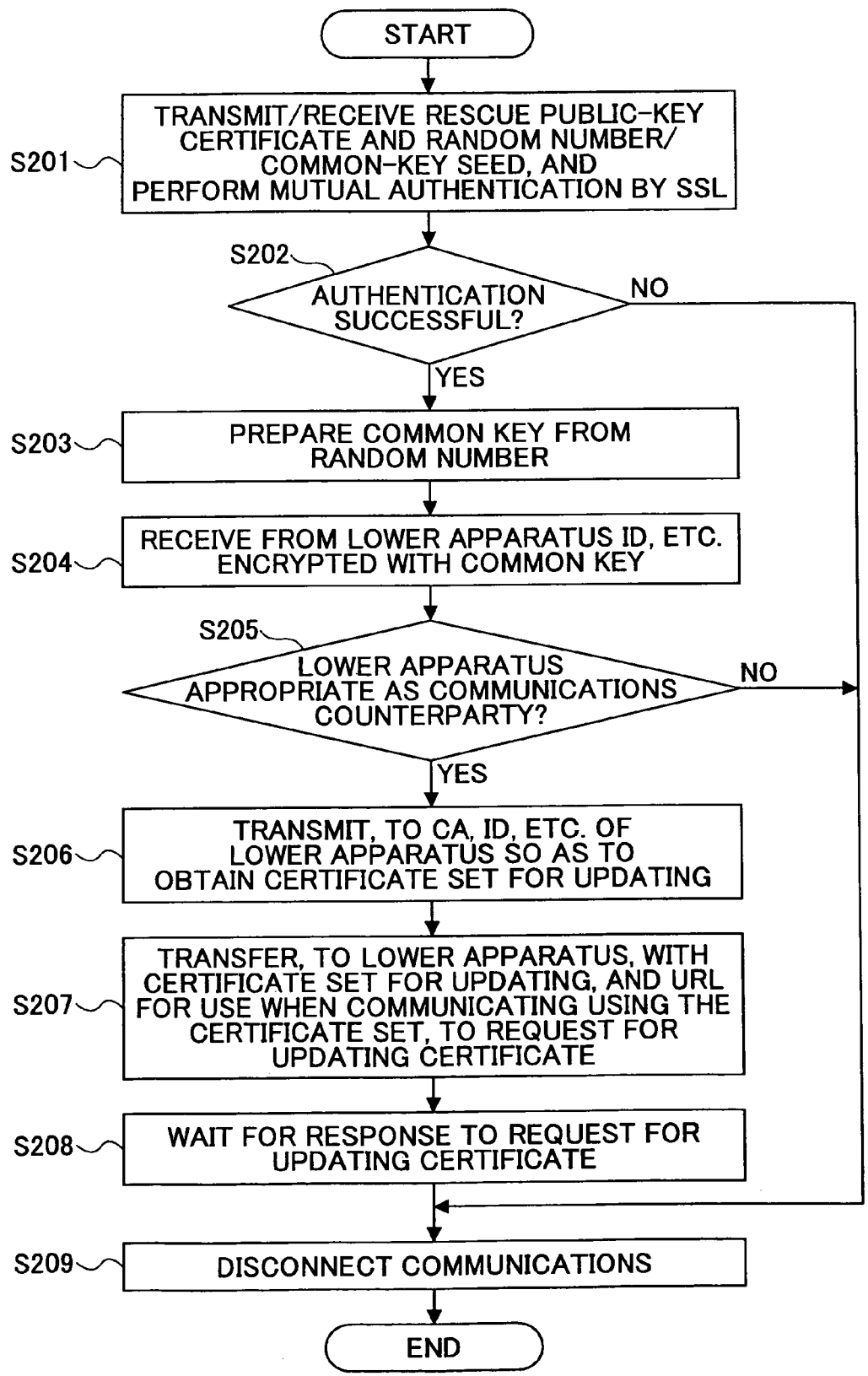
FIG. 15 is a flowchart illustrating executing at the upper-apparatus side out of the process regarding updating of the certificate according to the rescue method, in the system for transferring digital certificate as illustrated in FIGS. 1 and 3.

On the other hand, the upper apparatus 30 upon receiving a request for communications at the rescue URL starts a process illustrated in a flowchart in FIG. 15. It is noted that when receiving a request for communications to a normal URL that is independent from the process illustrated in FIG. 15 and is a process regarding general command transmitting/receiving, the explanation is omitted here.

In the process in FIG. 15, first in step S201, a rescue public-key certificate and a random number and a common-key seed are transmitted/received with an apparatus originating a request for communications (the lower apparatus 40 here) so as to mutually authenticate according to the SSL as illustrated in FIG. 33. In this process is also included the process of obtaining from the received public-key certificate, if any, information identifying the originator of the request for communications.

Then, in step S202 whether this authentication has succeeded is determined. When the authentication has failed here, without performing the process in step S209 the communication is disconnected so as to terminate the process, while if the authentication has succeeded, communication is established with the originator of the request for communications for proceeding to step S203 and beyond for performing the process regarding obtaining and setting the certificate set for updating. Moreover, at the time when the authentication has succeeded, the fact that the originator of the request for communications is any one of the lower apparatuses becomes known.

In other words, first in step S203 a common key is generated from the common-key seed exchanged in step S201. Then, in step S204, information such as the ID, etc., encrypted with the common key is received from the apparatus originating the request for communications so as to determine in step 205 based on the information whether the lower apparatus is an apparatus suitable as a communications counterpart. In other words, whether the counterpart is a counterpart to which the certificate set for updating may be transmitted is determined. This determining may be performed according to such criteria as, for example, whether the identifying information is one of a subject apparatus of the management agreement. It is noted that when sufficient information is described in the rescue public-key certificate, the process of step S204 is not needed.

If the lower apparatus 40 is determined to be not a suitable apparatus in step S205, without performing the process in step S209 the communication is disconnected so as to terminate the process, while if determined to be a suitable apparatus, the process proceeds to step S206.

Then, in step S206, the equipment number, etc., of the lower apparatus 40 are transmitted to a CA issuing a certificate set regarding normal authentication information to be stored in the lower apparatus 40 (for example, a first CA 10) so as to have the CA issue a certificate set for updating and obtain the issued set.

Then, in step S207, as illustrated in FIG. 16, the certificate set obtained in step S206, and information on a communications destination that indicates a URL to which communications is requested when using for authentication a digital certificate included in the certificate set (a normal URL), are transmitted to the apparatus currently communicating. Then, a certificate-setting command is transmitted to an apparatus currently communicating in a manner such that a certificate set transmitted is set as a certificate set for use in communicating with the upper apparatus 30 and a URL transmitted is set as a URL for transmitting a request for communications, when requesting communications, to the upper apparatus 30.

Then, such transmission may be performed by transmitting a certificate set and a URL as parameters of a certificate-setting command. Then, these transmissions are to be performed via a secure communications path according to the SSL that is established using the rescue certificate set. Moreover, it is possible to provide for transmitting a certificate and a URL at different timings and transmitting a certificate-setting command after completion of both transmissions.

Moreover, the reason the URL is also transmitted is that, when the URL of the upper apparatus 30 is changed during the time the lower apparatus 40 cannot communicate with the upper apparatus 30, it is not possible to recover to the state of communicating by transmitting only the certificate to the lower apparatus 40.

Then, in step S208 the process waits for a response to the certificate-setting command so that when there is a response, in step S209 the communication is disconnected so as to terminate the process. It is noted that even when there is no response for a predetermined period or when there is a response that the updating has failed, as it is possible that the rescue URL is accessed again from the lower apparatus 40 side, it is all right to store error information and terminate without performing the process of FIG. 16.

Figure 17:
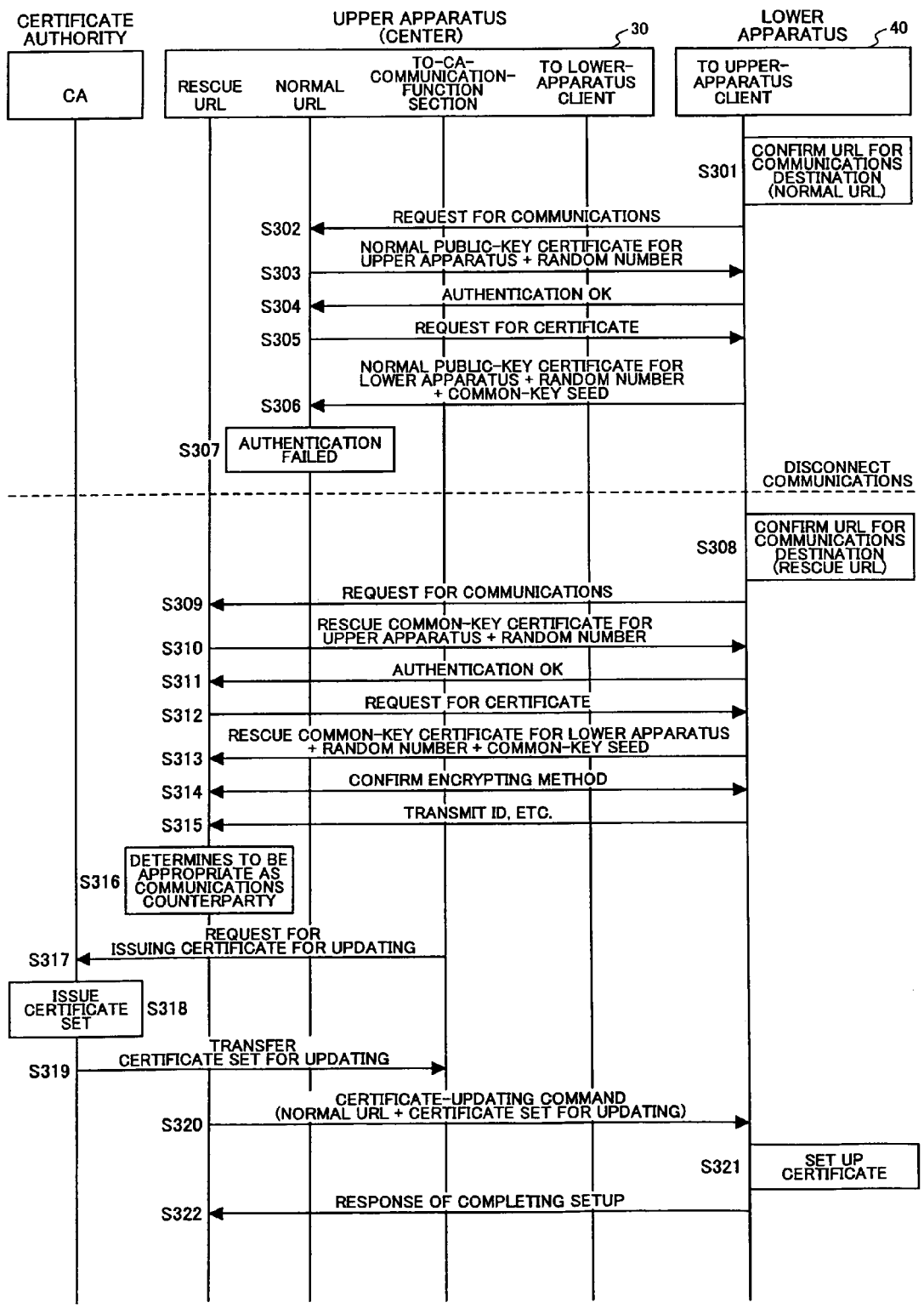
FIG. 17 is a sequence diagram illustrating an exemplary process sequence when the upper apparatus and the lower apparatus update a certificate according to the process as illustrated in FIGS. 14 and 15.

Next, FIG. 17 illustrates an exemplary process sequence when the lower apparatus 40 and the upper apparatus 30 execute the process illustrated in FIGS. 14 and 15. It is noted that here is an exemplary process for when a normal public-key certificate for the lower apparatus, which is stored in the lower apparatus 40, cannot be authenticated due to such reasons as corrupting of the certificate or expiring of the validity period.

In this example, first the lower apparatus 40, when communicating with the upper apparatus 30, confirms the URL for transmitting a request for communications (S301), and sets the HTTPS client-function section 41 to function as a client for the upper apparatus so as to transmit the request for communications to the confirmed normal URL (S302). In this case, at the upper apparatus 30 side, the HTTPS server-function section 32 receives the request for communications and transmits this request to the authentication processor 33. Moreover, it can be said that the upper apparatus 30 has been requested to authenticate using a normal public-key certificate. Then, the authentication processor 33 according to the SSL returns to the lower apparatus 40 a first random number encrypted with a normal private-key for the upper apparatus 30 that is stored in the certificate storage 35 along with a normal common-key certificate for the upper apparatus 30 that is similarly stored in the certificate storage 35 (S303).

While at the lower-apparatus 40 side, the returned random number and the certificate are passed on to the authentication processor 43 so as to authenticate, as the validity of the normal public-key certificate for the upper apparatus 30 received may be confirmed here using the normal root-key certificate for authenticating the upper apparatus 30 that is stored in the certificate storage 45, the authentication is determined to be successful so that the response indicating the success is returned (S304). Then, upon the upper apparatus 30 transmitting a request for a certificate to the lower apparatus (S305), the lower apparatus 40 returns to the upper apparatus 30 a second random number encrypted with a normal private-key for the lower apparatus that is stored in the certificate storage 45 together with, a normal public-key certificate for the lower apparatus that is stored in the same certificate storage 35. Moreover here, as mutual authenticating is performed, a common-key seed encrypted using the normal public-key for the upper apparatus that is received in step S303 is also returned together with the second random number (S306).

At the upper-apparatus 30 side, while the returned certificate and the random numbers are passed on to the authentication processor 33 for authenticating, here as the normal public-key certificate for the lower apparatus that is received is in the state of not being able to get authenticated, the authentication is determined to be a failure (S307). Thus, the communication with the lower apparatus 40 is disconnected.

The lower apparatus 40 not being to be able to get authenticated using a normal certificate, then transmits to a rescue URL a request for communications (S308, S309). Then, using the rescue authentication information, mutual authentication is attempted with the upper apparatus 30 (S310 through S313). It is noted that as this process is the same as steps S303 through S306 with only the type of authentication information used being different, explanation is omitted.

Then, this time the authentication succeeds so that the upper apparatus 30 and the lower apparatus 40 confirms an encrypting method for use in subsequent communications (S314). Then, the lower apparatus 40 transmits the ID, etc., to the upper apparatus 30 (S315). Then, once the upper apparatus 30 determines based on this information that the lower apparatus 40 is an apparatus suitable as a communications counterpart (S316), the function unit for communicating with CA 36 transmits to a CA, together with information on the equipment number, etc., a request for issuing a certificate (S317).

The CA, once receiving the information and the request, issues a certificate set for updating so as to return the issued certificate set to the upper apparatus (S318, S319). Then the upper apparatus collates with a normal URL the certificate set for updating for transmitting to the lower apparatus 40 together with a certificate-setting for command (S319).

Then, the lower apparatus 40 sets the certificate set for updating as normal-authentication information and sets the normal URL as a URL for communications destination (S321) so as to return a response on the set results to the upper apparatus 30 (S322). The process as described above of updating a normal certificate of the lower apparatus 40 using rescue authentication information is now terminated.

The system for transferring certificates as illustrated in FIG. 1 according to the process as described above provides for updating the certificate of the lower apparatus 40 so as to recover to the state of being able to successfully perform authentication when the public-key certificate configuring normal authentication information is caused to be in a state of not being able to get authenticated in the lower apparatus 40.

Now, regarding normal authentication information for use in authenticating at the time of normal communications, it is possible to provide for not only merely updating to the one for which the validity period expires later, but also updating the key length or the format of the public key depending on the progress in technology. For example, this is to provide for using a public-key certificate with the key length of 2048 bits in lieu of a public-key certificate with the key length of 1024 bits as illustrated in FIG. 8. Then when performing such updating, it is not possible to issue a public-key certificate in a new format with a CA being normally used previously (the first CA 10) here.

Then, as illustrated with an imaginary line in FIG. 1, a new CA (a second CA 20) is provided for so as to have this CA 20 issue a certificate set including a public-key certificate in a new format. Then subsequently, the certificate set issued by the second CA 20 (below referred to as "a second CA certificate set") is delivered to each apparatus so as to gradually switch from authenticating between the upper apparatus 30 and the lower apparatus 40 to authenticating using the second CA certificate set. The public-key certificate included in this second CA certificate set corresponds to a second normal certificate. Then both this second normal certificate and the first normal certificate as described above correspond to a normal certificate. Moreover, in the descriptions below, the certificate set issued by the first CA 10 is referred to as a first CA certificate set.

In FIG. 18 is illustrated an exemplary second CA public-key certificate for the lower apparatus included in the second CA certificate set. As may be understood by comparing FIG. 8 with FIG. 18, the key length which is 1024 bits (represented with a letter X) for the first CA public-key certificate is set to be 2048 bits (represented with a letter Y) for the second CA public-key certificate.

Moreover, for these certificates for which the subject is the same apparatus, while the subject apparatus is of course the same (letters C and K), the issuing CA is different (letters A and J). Therefore, the root-key certificate for use in confirming the validity ends up being different. Moreover, the second CA public-key certificate in terms of having a shorter validity period than the rescue public-key certificate or being appended with apparatus-identifying information is the same as the first CA public-key certificate.

Figure 19:
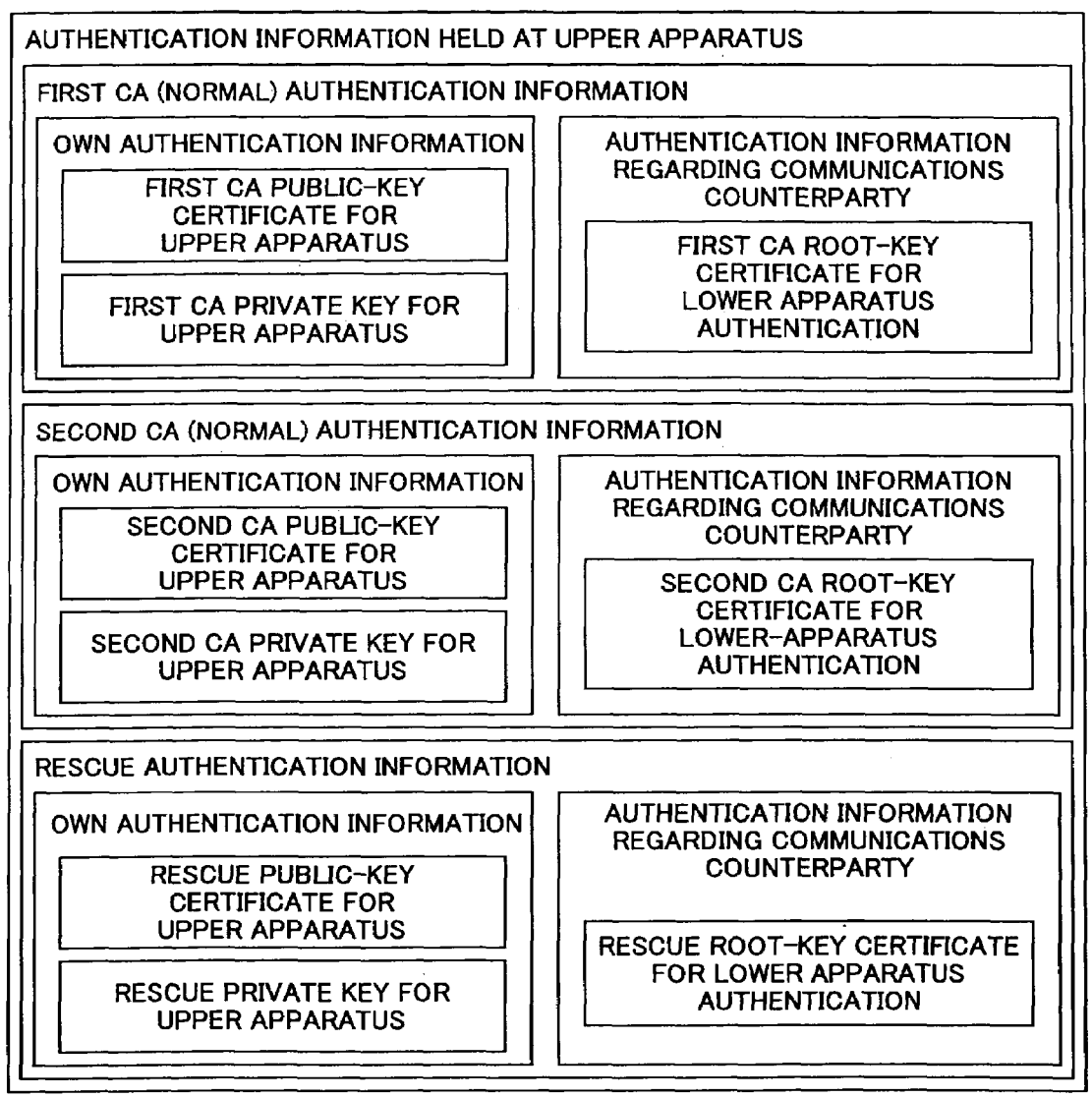
FIG. 19 is a diagram for describing authentication information being stored in the upper apparatus as illustrated in FIGS. 1 and 3 after providing for a second CA.

It is noted that the hardware configuration and the functional configuration of the second CA 20 is the same as in the case of the first CA 10 except for the fact that the format of the certificate and the key included in the certificate set which is issued differ. Moreover, until the delivery to the lower apparatus 40 of the certificate set issued by the second CA 20 is mostly completed, as illustrated in FIG. 19, first CA authentication information issued by the first CA 10 and second CA authentication information issued by the second CA 20 are set to coexist in the upper apparatus 30 as normal authentication information, providing for authentication using either of the two sets of CA authentication information. The rescue authentication information is left stored as before.

It is noted that, as described above, basically the server authenticating according to the SSL having multiple public-key certificates cannot adopt a configuration such that an appropriate one depending on the type of public-key certificate which the communications counterpart is trying to use for authenticating is chosen so as to transmit the chosen one.

Figure 20:
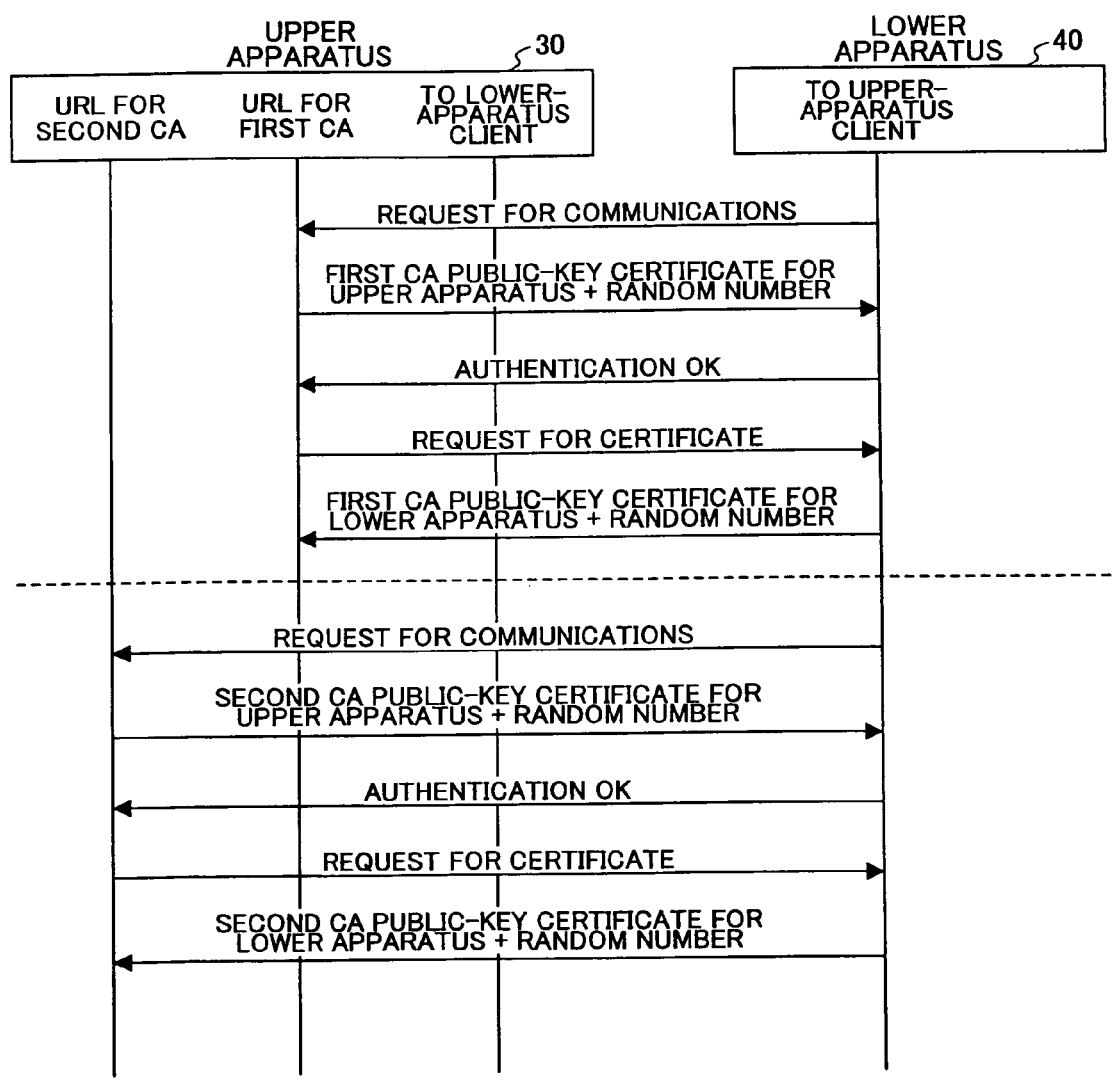
FIG. 20 is a sequence diagram for describing a configuration for making proper use of the first CA public-key certificate and the second CA public-key certificate in the upper apparatus as illustrated in FIGS. 1 and 3.

Therefore, even when the first CA authentication information and the second CA authentication information coexist in the upper apparatus 30 in the middle of the switching of the authentication as described above, as in the case of the rescue public-key certificate, as illustrated in FIG. 20, a URL for the first CA that is for authenticating the first CA authentication information and a URL for the second CA that is for authenticating the second CA authentication information are provided so that the lower apparatus 40, being the side requesting the communications (the side functioning as the client), can selectively designate either of the URLs depending on the type of authentication requested.

It is noted that both the URL for the first CA and the URL for the second CA correspond to a normal URL.

It is noted that in this case, as described above, as there is a need to change the IP address between the URL for the first CA and the URL for the second CA, a section (which may be a separate or the same enclosure, or may be an addition as a logical section) enabled for setting the IP address for the second CA is added to the upper apparatus 30.

In this way, the upper apparatus 30 being the side to which communication is requested (the side functioning as the server) provides for distinguishing a request for communications depending on the URL accepted, returning a first CA public-key certificate when accepting at the URL for the first CA, and returning a second CA public-key certificate when accepting at the URL for the second CA.

As for the lower apparatus 40, as described below the first CA certificate set and the second CA certificate set are set not to coexist, so that such provision as described above does not have to be made.

Now, as described above, when the lower apparatus 40 requests for communications to the upper apparatus 30 so as to try getting authenticated (or try authenticating) using the second CA public-key certificate, there is a need for the URL for the second CA to be stored.

Figure 21:
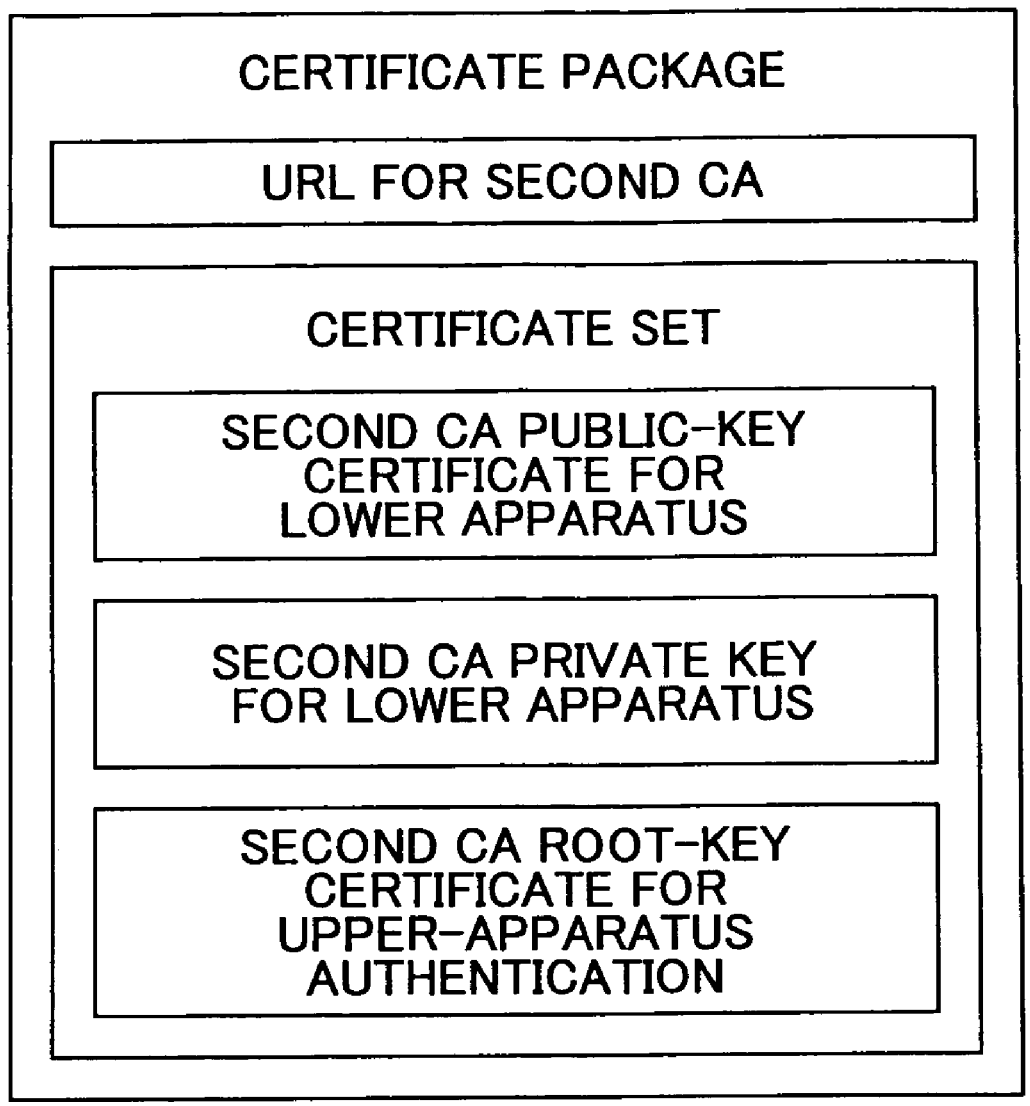
FIG. 21 is a diagram illustrating exemplary information for transferring from the upper apparatus to the lower apparatus as illustrated in FIGS. 1 and 3.

Then, in this system for transferring certificates, the upper apparatus 30 as illustrated in FIG. 21 provides for transferring to the lower apparatus 40 the certificate set issued by the second CA 20, that certificate set together with the URL for the second CA that is information identifying a destination of communications that is to be accessed using the digital certificate included in the certificate set.

Here, appending the certificate set issued by the second CA 20 with an ID, etc., and appending the URL for the second CA with such information as one indicating the ID of the certificate set used for communicating using the URL, enable collating the two sets of information as described above so as to recognize the corresponding relationship at the destination to be transferred to. It is to be noted that collectively transferring these two sets of information are not mandatory.

Moreover, when communicating between the upper apparatus 30 and the lower apparatus 40 using a protocol able to designate a port number, it is possible to set, between the URL for the first CA and the URL for the second CA, the IP address to be common and only the port number to be different. In this way, as only one IP address for setting in the upper apparatus 30 is needed, there is no need to configure the apparatus from multiple portions. The same holds for the rescue URL.

Next, as described above, a process when updating authentication information held by the lower apparatus 40 from one issued by the first CA 10 to one issued by the second CA 20 is described below in greater detail. It is noted that the process as described below is a process for performing in a case where the key length or the format of the public-key certificate is changed, or more specifically when setting a public-key certificate such that getting authenticated at the previous destinations of communications are made not possible. Then, this is different from a process in a case of setting a public-key certificate enabled for getting authenticated at the same destinations of communications as the previous ones, such that a public-key certificate nearing an expiration of the validity date is replaced with a public-key certificate with a new validity period. In the latter case, it suffices to update a certificate in a known method as appropriate. Moreover, this is different from the updating using the rescue authentication information as described above as the process is performed so as to authenticate using normal authentication information.

Figure 22:
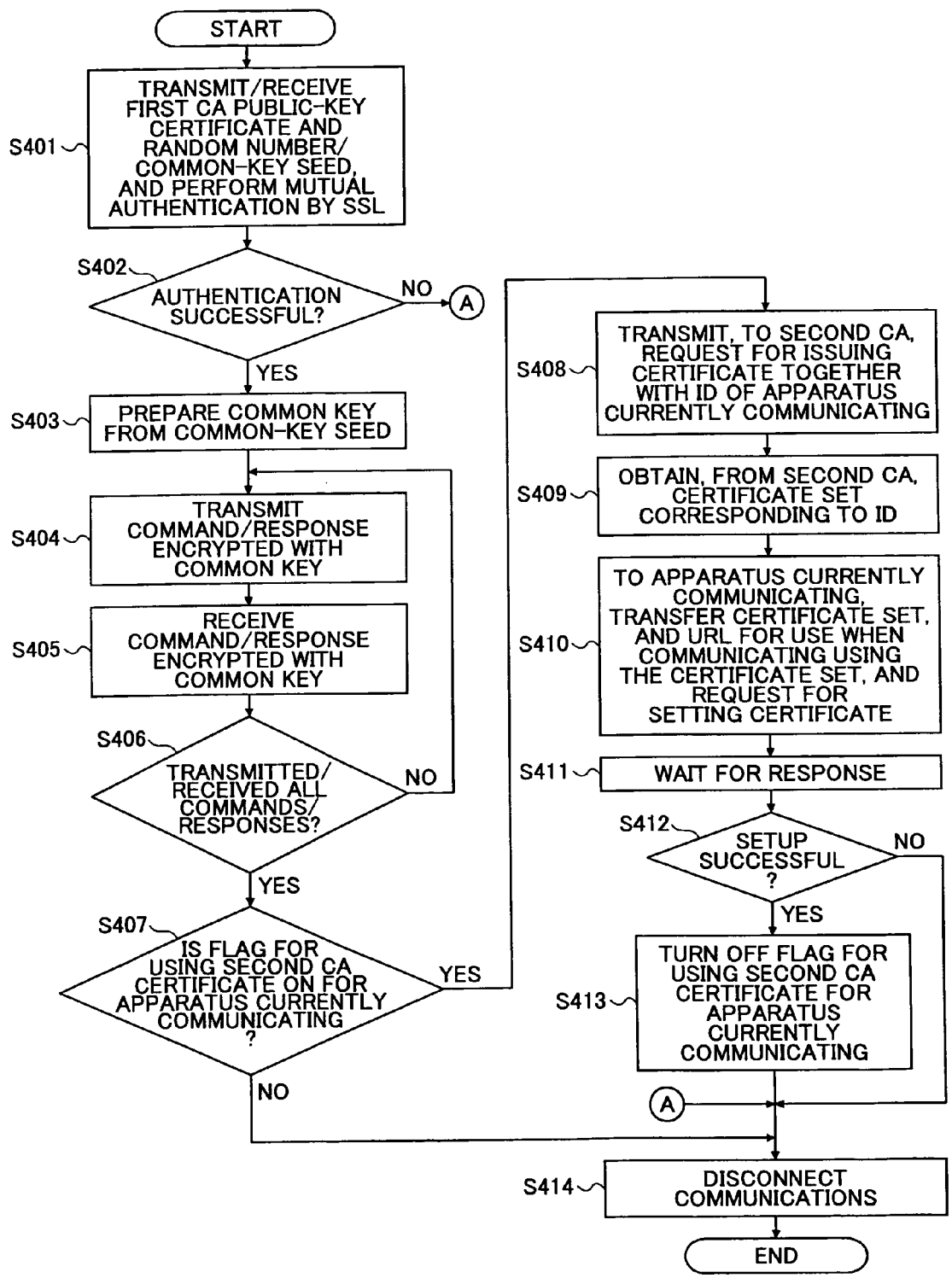
FIG. 22 is a flowchart illustrating a process for the upper apparatus as illustrated in FIGS. 1 and 3 to execute when the URL for a first CA receives a request for communications at the state of being enabled to authenticate using second CA authentication information.

In FIG. 22 is illustrated a process for the upper apparatus 30 to execute when the URL for the first CA receives a request for communications while able to authenticate using second CA authentication information. This process is a process regarding a second transferring procedure such that the CPU of the upper apparatus 30 here functions as second transferring means.

It is noted that out of this process steps S401 through S406 and step S414 constitute a process performed regardless of whether there is a second CA 20. Then, providing a second CA 20, providing for a URL for the second CA, furthermore as illustrated in FIG. 19 having the upper apparatus 30 to store therein as second CA authentication information a certificate set issued by the second CA 20, and additionally performing the process of steps S407 through S413 when authenticating using the second CA authentication information is enabled is provided for.

In the system for transferring a digital certificate as illustrated in FIG. 1, the CPU of the upper apparatus 30 starts the process illustrated in FIG. 22 when receiving a request for communications to the URL for the first CA when able to authenticate using the second CA authentication information.

Then, first in step S401 a first CA public-key certificate and a random number and a common-key seed are transmitted/received with an apparatus originating a request for communications so as to mutually authenticate according to the SSL as illustrated in FIG. 33. This process includes a process of obtaining information identifying the originator of the communications request from the public-key certificate received.

Then, in step S402 whether this authentication has succeeded is determined so that if determined to have failed the process proceeds to step S414 so as to disconnect the communication without performing the process for terminating the process. On the other hand, if the authentication has succeeded in step S402 communication is established with the originator of the request for communications so as to proceed to step S403 for generating a common key from the common-key seed exchanged in step S401.

Then, in step S404, a command and a response to a received command are encrypted with the generated common key for transmitting to an apparatus currently communicating (the lower apparatus 40 here) and in step 405 a command and a response to a transmitted command that are encrypted with the same common key are received from the apparatus currently communicating. Then, in step S406 whether all commands and responses are transmitted/received is determined so that if there is any one remaining the process returns to step 404 to repeat the process and if all are transmitted/received the process proceeds to step S407.

It is noted that the processes of steps S404 and S405 do not have to be performed in any particular order and are omitted if there are no commands and responses to be transmitted/received. Moreover, executing the process regarding the received command so as to generate a response and the process of interpreting the contents of the received response so as to perform the corresponding operations is to be performed separately from the flowchart as illustrated in FIG. 22, having to store the received commands and responses.

In the next step S407 whether the flag for using the second CA certificate for the apparatus currently communicating is turned ON is determined.

Here, the flag for using the second CA certificate as illustrated in FIG. 23 is a flag that the upper apparatus 30 has stored therein, for each lower apparatus 40 which may become a communications counterpart, in correspondence with ID (identifying information). Then, it is a flag which indicates that there is a need for transferring to an apparatus having corresponding identifying-information a certificate set issued by the second CA 20 when it is ON. Moreover, the setting of this flag may be performed manually by an operator of the upper apparatus 30 when a need arises for transferring to the lower apparatus 40 the second CA certificate set, or the upper apparatus 30 itself may perform automatically in a case such that authenticating using second CA authentication information in the upper apparatus 30 is enabled. For these settings, a condition table or an equipment-number information table as described below may be used.

Then, in step S407 if this flag for using the second CA certificate is OFF, as there is no need to transmit the certificate set, without performing the processing, the process proceeds to step S414 so as to disconnect the communications for terminating the process.

On the other hand, in step S407 if the flag for using the second CA certificate is ON, as it is possible to determine that transferring of the second CA certificate set to the lower apparatus 40 is necessary, the process proceeds to the process regarding transferring of the second CA certificate set after step S408. It is noted that it can be said that, based on the ID information being described in the received first CA public-key certificate, whether to transfer the second CA certificate set is determined.

Then, in a process regarding transferring of the second CA certificate set, first in step S408 a request for issuing a certificate together with the ID of the apparatus currently communicating is transmitted to the second CA 20.

Then, with the second CA issuing the certificate set for the apparatus of that ID for transmitting to the upper apparatus 30, in step S409 that certificate set is received from the second CA 20 so as to obtain the received certificate set.

Then, in step S410 the certificate set obtained in step S409 and, the information on the destination of communications that indicates the URL to which a request for communications is made when using for authentication a digital certificate included in that certificate set (the URL for the second CA) are transmitted to an apparatus currently communicating (the lower apparatus 40 here). Then, a command for setting a certificate is transmitted to the apparatus currently communicating, the command requesting such that the certificate set transmitted is set as a certificate set in communicating with the upper apparatus 30 and the transmitted URL is set as the URL for transmitting a request for communications when requesting for communications to the upper apparatus 30.

It is noted that such transmission may be conducted by transmitting the certificate and the URL as a parameter for the certificate-setting command. Moreover, these transmissions are performed in a secure communications path according to the SSL that is established using the first CA certificate set. Furthermore, it is possible that the certificate and the URL are transmitted at different timings so that when both transmissions are completed the certificate-setting command is transmitted.

Then, once the process of step S410 is completed, in step S411 the process waits for a response to the certificate-setting command. Then when there is a response the process proceeds to step S412 for determining whether the setting of the certificate and the URL has succeeded. Then, if successful, the process proceeds to step S413 so as to turn OFF the flag for using the second CA certificate for the apparatus currently communicating that has completed setting the certificate for indicating that the transferring the second CA certificate set is no longer necessary. Subsequently the process proceeds to step S414 so as to disconnect the communications for terminating the process.

If not successful in step S412 (including the case with no response during a predetermined period), without processing the process proceeds to step S414 so as to disconnect the communications for completing the process. In this case, when there is a following request from the same lower apparatus for communications to the URL for the first CA, again setting the second CA certificate set is tried.

According to the process as described above, the upper apparatus 30, when receiving a first CA public-key certificate for the lower apparatus so as to determine based on that received result that transferring a second CA certificate set is necessary, requests to be transmitted, via a secure communications path established using a first CA certificate set, a second CA certificate set, and information identifying a destination of communications to be accessed using the certificate set together, as well as setting these in the lower apparatus 40.

Here, in FIG. 13 is illustrated a process which the lower apparatus 40 executes when receiving a certificate-setting command from the upper apparatus 30.

Figure 24:
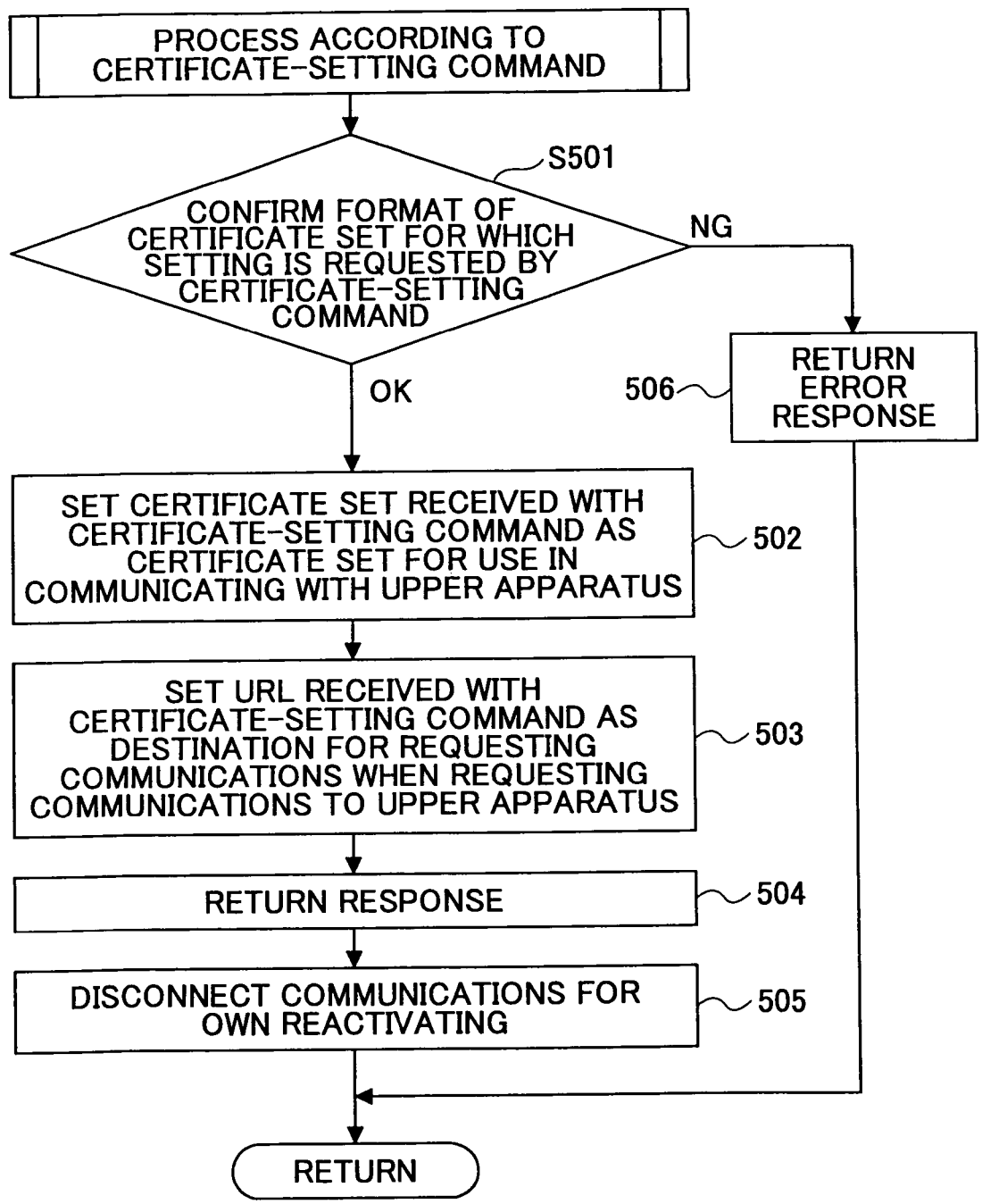
FIG. 24 is a flowchart illustrating a process for executing when the lower apparatus as illustrated in FIGS. 1 and 3 receives a certificate-setting command from the upper apparatus.

The CPU of the lower apparatus 40, when the apparatus receives a certificate-setting command from the upper apparatus 30, starts the process illustrated in a flowchart in FIG. 24. This process is a type of process regarding an execution of a normal command.

Then, in step S501 a format checking is performed for checking the format of a certificate set for which setting is requested with a certificate-setting command. Then, if the result is unsuitable (NG), in step S506 an error response indicating that the setting of a certificate set and a URL has failed is returned so as to terminate the process.

On the other hand, in step S501 if the result is suitable (OK), the process proceeds to step S502 for setting the certificate set for which setting is requested by the certificate-setting command as a certificate set for use in communicating with the upper apparatus 30. Then, in step S503 the URL for which setting is requested by a certificate setting-command is set as a destination when requesting communications to the upper apparatus 30, or for communicating using a new certificate set.

Then, in step S504 a response to the certificate-setting command is returned to the upper apparatus 30 and in step S505 the communication is disconnected for reactivating itself. This reactivating is required when changing an important setting in the lower apparatus 40 that here corresponds to setting the certificate set and the destination for requesting communications. When reactivating, an authorization of reactivating may be sought from the user. Moreover while FIG. 24 illustrates such that the process returns to the original process after step S505, actually at the time of the reactivating in step S505 the process is suspended.

It is noted that the reason the process regarding transferring of certificates of the steps S407 through S413 is performed subsequent to the process regarding the transmitting/receiving of commands and responses of the steps S404 through S406 in the process illustrated in FIG. 22 is to be able to transmit/receive other commands and responses before the communications get disconnected by the reactivation in the step S505 even when having to set the certificate.

According to the process as described above, the lower apparatus 40 collates the certificate set and the URL that are received from the upper apparatus 30 so as to have the collated results stored therein for use in subsequent communications with the upper apparatus 30. Then, if the setting of the certificate set and the destination for requesting communications is successful, after being reactivated, when communicating with the upper apparatus 30 communication is requested to the URL for the second CA, while for authenticating the second CA public-key certificate for the lower apparatus is transmitted to the upper apparatus 30.

It is noted that the setting in steps S502 and S503 is performed by having to store the certificate set and the URL in the certificate storage 45. Moreover, when receiving separately a certificate and a URL for which setting is requested by a certificate-setting command, the received certificate set and URL may be temporarily stored so as to start the process in FIG. 24 and to set the certificate set and the URL when having received the certificate-setting command.

Furthermore, the process illustrated in FIG. 24 may be made common with the process of steps S115 through S120 in FIG. 14.

Moreover, in the lower apparatus 40, for simplifying communications control, a certificate set for use in normal communications with the upper apparatus 30 (normal authentication information) is set to be always of one type. Therefore, when setting a new certificate set or URL, it is done in a format such as to overwrite the previous certificate sets or URLs.

Figure 26:
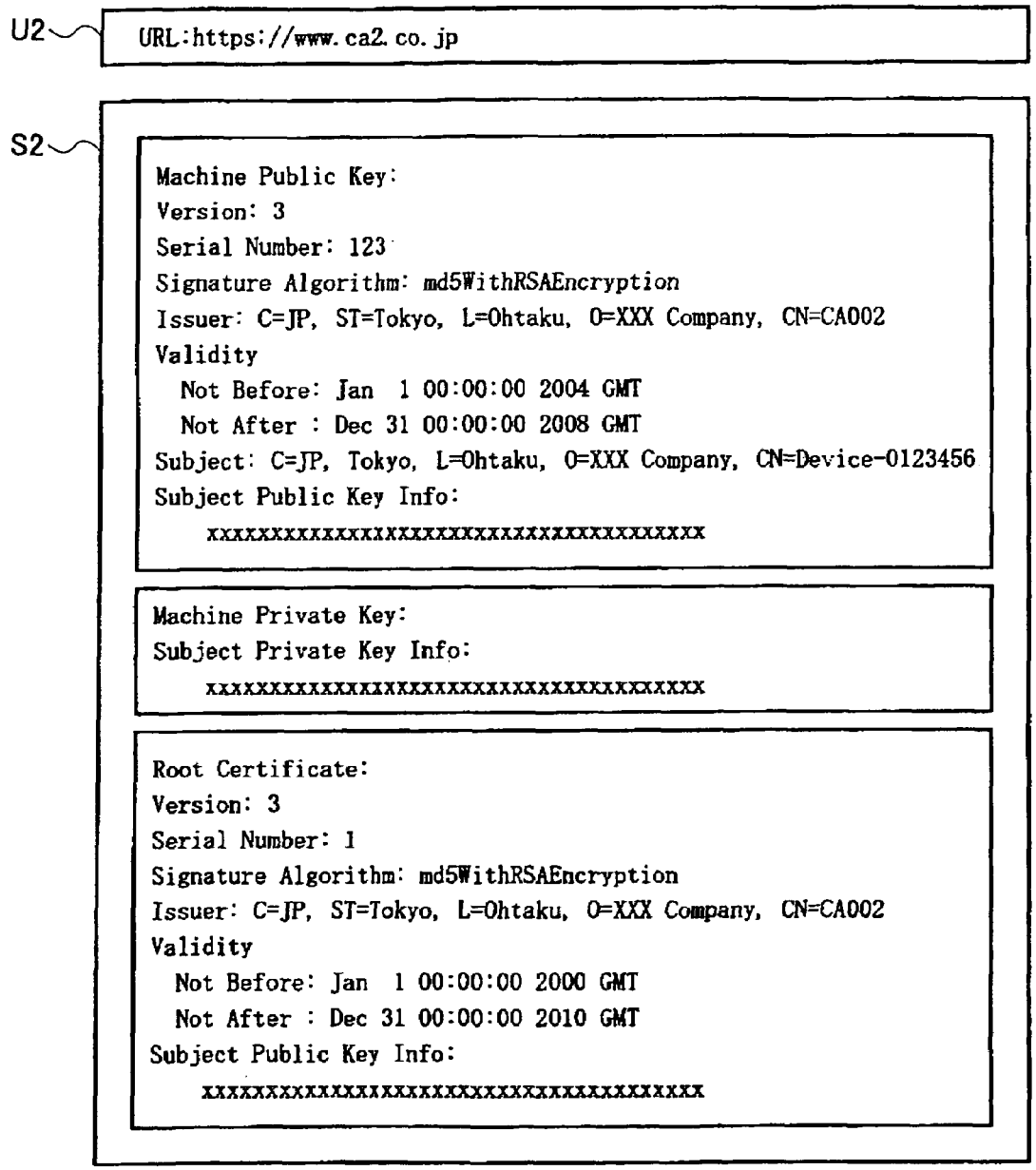
FIG. 26 is a diagram illustrating the state of storage with the communications destination when communicating using a second CA certificate set and its certificate in the certificate storage of the lower apparatus as illustrated in FIGS. 1 and 3.

For example, a case is considered such that in the certificate storage 45 as illustrated in FIG. 25 a first CA certificate set S1 is stored as a certificate set for use in communicating with the upper apparatus 30 and https://www.ca1.co.jp of the URL for CA1 is being registered as a destination U1 for communicating when requesting for communications to the upper apparatus 30. In this case once executing the steps S502 and S503 as illustrated in FIG. 26 a portion of a first CA certificate set S1 is overwritten with a second CA certificate set S2 and a portion of a communications destination U1 is overwritten with https://www.ca2.co.jp of the URL for the CA2 so as to set as the communications destination U2. Then even performing updating by such overwriting maintains being able to communicate with the upper apparatus 30 before and after the updating.

It is noted that a storage area for storing a certificate set and a storage area for storing a URL to which a communication is requested when using the certificate set for authenticating do not have to be necessarily adjacent or proximate as long as grasping of the correspondence between the certificate set and the URL is enabled.

Moreover, if allowing for storing multiple certificate sets and URLs for the lower apparatus 40 to communicate with the upper apparatus 30, it is not mandatory to have the certificate set and the URL for the second CA that are issued by the second CA 20 simultaneously transferred and stored.

Figure 29:
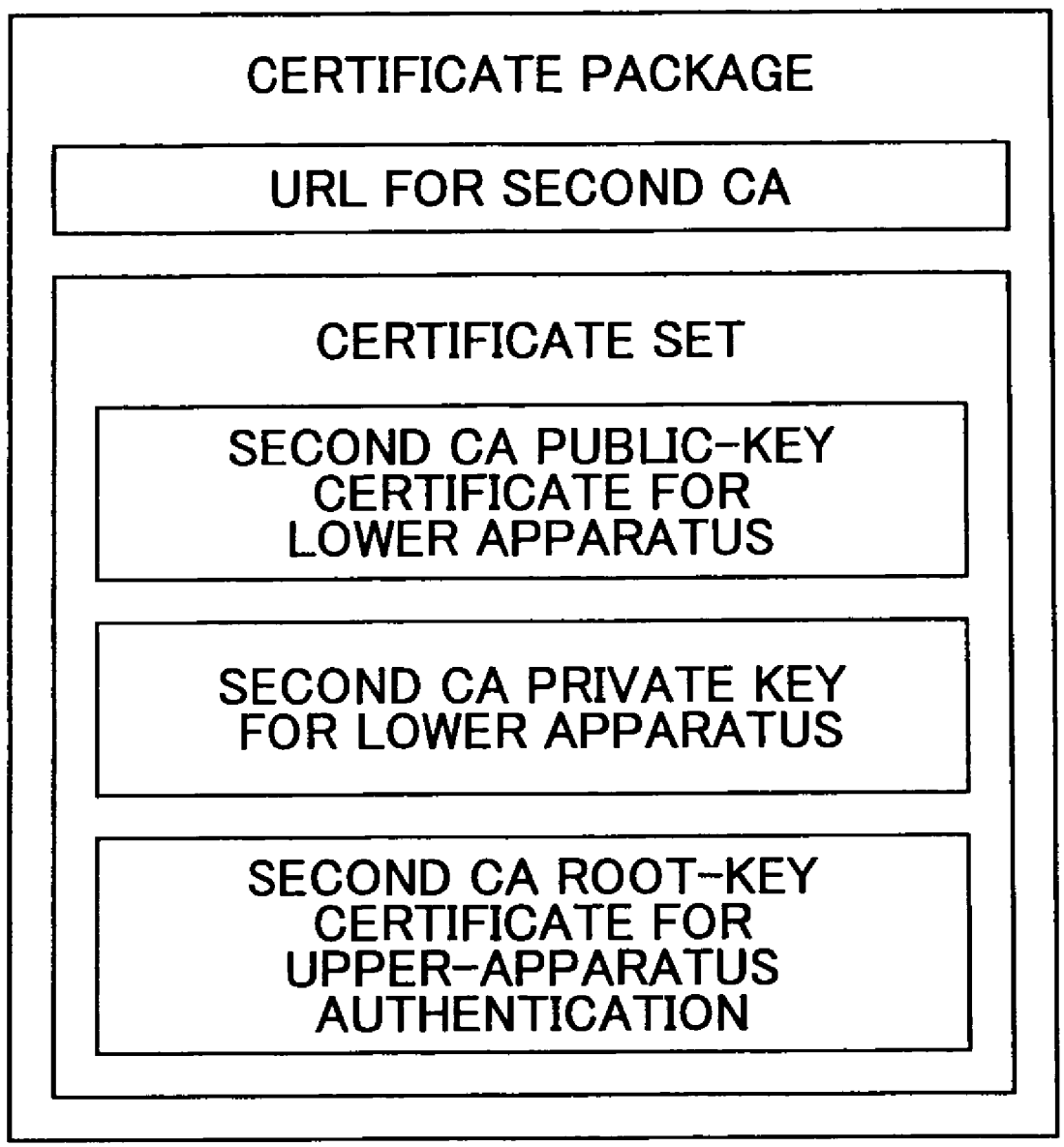
FIG. 29 is a diagram illustrating an exemplary certificate package for use when collectively transferring the second CA certificate set- and the second CA URL.

However, conversely when collectively transferring a second CA certificate set and a second CA URL, it is possible to provide for transmit collectively in one certificate package as illustrated in FIG. 29 for immediate setting. Then, in this way, updating a root key for use in authenticating is enabled while maintaining the state of being able to communicate with the upper apparatus 30 even when only one each of a certificate set and communications-destination information for communicating between the lower apparatus 40 and the upper apparatus 30.

Figure 27:
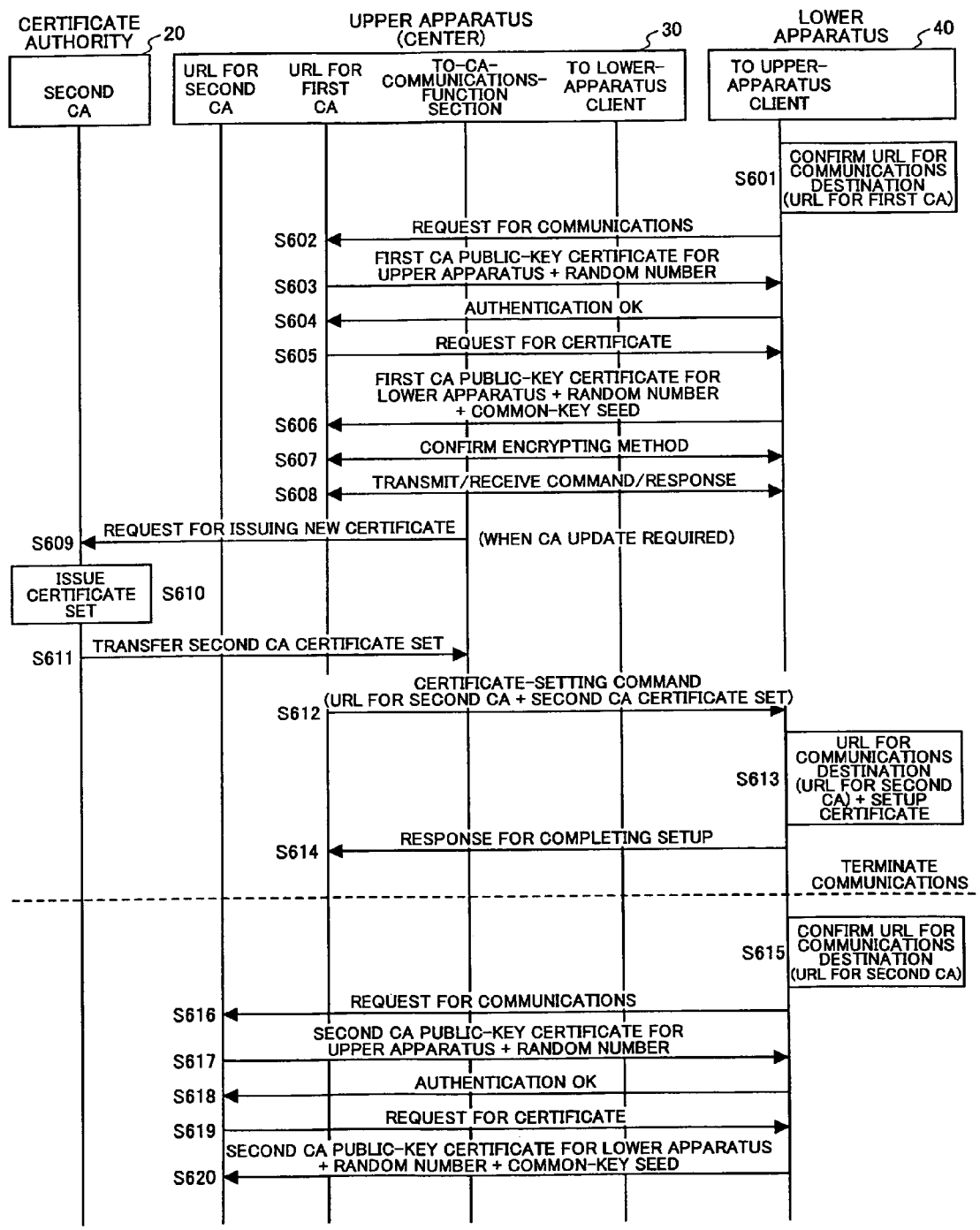
FIG. 27 is a sequence diagram illustrating an exemplary process sequence for the upper apparatus and the lower apparatus to execute changing the CA as illustrated in FIGS. 11 and 13.

Next an exemplary process sequence for the upper apparatus 30 and the lower apparatus 40 to execute the process of changing the CA as described above is described including the process in the second CA 20. In FIG. 27 is illustrated this process sequence.

In this example, first the lower apparatus 40 when communicating with the upper apparatus 30 confirms the URL to which a request for communications is to be transmitted (S601), set the HTTPS client-function section 41 to function as the client for the upper apparatus for transmitting the request for communications to the URL for the first CA that is confirmed (S602). In this case, at the upper apparatus side 30, the HTTPS server-function section 32 receives a request for communications so as to pass on this request to the authentication processor 33. Then, it can be said that the upper apparatus 30 is requested authentication using a first CA public-key certificate. Then the authentication processor 33 according to the SSL protocol returns to the lower apparatus 40 a first random number encrypted with a first CA private key for the upper apparatus that is stored in the certificate storage 35, together with a first CA public-key certificate for the upper apparatus that is stored in the same certificate storage 35 (S603).

At the lower apparatus 40 side, while the returned random number and the certificate are passed on to the authentication processor 43 for authenticating, here as the validity of the normal public-key certificate for the upper apparatus may be confirmed using a normal root-key certificate for authenticating the upper apparatus that is stored in the certificate storage 45, the authentication is determined to be successful so that the response indicating the success is returned (S604) Then, upon the upper apparatus 30 transmitting a request for a certificate to the lower apparatus (S605), the lower apparatus 40 returns to the upper apparatus 30 a second random number encrypted with a normal private-key for the lower apparatus that is stored in the certificate storage 45 together with, a normal public-key certificate for the lower apparatus that is stored in the same certificate storage 35. Moreover here, as mutual authenticating is performed, a common-key seed encrypted using the normal public-key for the upper apparatus that is received in step S603 is also returned together with the second random number (S606).

At the upper-apparatus 30 side, while these are passed on to the authentication processor 33 for authenticating, here as the validity of the normal public-key certificate for the lower apparatus that is received may be confirmed using a normal root-key certificate for authenticating the lower apparatus that is stored in the certificate storage 35, the authentication is determined to be successful so as to confirm an encrypting method for use in subsequent communications (S607).

In the process as described above, communications via a secure communications path according to the SSL is established between the upper apparatus 30 and the lower apparatus 40 so that thereafter the upper apparatus 30 and the lower apparatus 40 transmit/receive commands/responses in a state such that communications are encrypted with a common key generated using a common-key seed exchanged (S608).

Then, the upper apparatus 30 side when determining that there is a need to have the lower apparatus 40 store therein the second CA certificate set, or when determining that there is a need to update the CA issuing a certificate to the lower apparatus 40, communicates with the second CA 20 by means of the function section for communicating with CA 36, transmits to the second CA 20 a request for issuing a certificate and ID, etc., of the lower apparatus 40, and requests for issuing a certificate set to the lower apparatus 40 (S609).

Then, the second CA 20 based on this request issues a second CA certificate to the lower apparatus 40 (S610) so as to transfer the issued set to the upper apparatus 30 (S611).

Then the upper apparatus 30 upon receiving this second CA certificate set collates the received second CA certificate set and information such as the URL for the second CA being the destination of requesting for communications when communicating using this certificate set, for transferring to the lower apparatus together with a certificate-setting command (S612).

Then, the lower apparatus 40 sets respectively the URL for the second CA as the URL of communications destination and the second CA certificate set as a certificate set for use in authenticating when communicating (S613). The process as described above completes the updating of the certificate set so that after a response of completing setting is returned (S614), the lower apparatus 40 disconnects the communications so as to reactivate itself.

Then, after completing the reactivation, as the URL for the second CA being registered as a URL for transmitting a request for communications when the lower apparatus 40 communicates with the upper apparatus 30, the communications is requested, provides for enabling requesting communications thereto, and using a public-key certificate, a private key, and a root-key certificate so as to authenticate (S615 through S620).

In the system for transferring digital certificate as illustrated in FIG. 1, when trying to change the key length and the format of the public-key certificate intended for use in authenticating between the upper apparatus 30 and the lower apparatus 40, performing the process as described above enables transferring a new public-key certificate from the upper apparatus 30 to the lower apparatus 40 while maintaining the state of being enabled for mutual authentication.

Then when there are multiple lower apparatuses 40, the upper apparatus 30 executing the process as illustrated in FIG. 22 whenever receiving a request for communications from each lower apparatus 40 to the URL for the first CA enables sequentially updating for each lower apparatus 40 the certificate set and the information on communications destination. Then eventually as illustrated in FIG. 28, a certificate set issued by the second CA 20 to be stored in all lower apparatuses and the URL for the second CA as information on communications destination to be stored in all lower apparatuses is provided.

Then, with no need to authenticate using the first CA authentication information even at the upper apparatus 30 side, it suffices to keep only the second CA authentication information so that accepting requests for communications into the URL for the second CA so as to simplify the process and the software configuration is consolidated.

It is noted that according to the process as described above, using a certificate set being stored in advance in the upper apparatus 30 and the lower apparatus 40 so as to establish a secure communications path according to the SSL and using the path to provide for transferring from the upper apparatus 30 to the lower apparatus 40 the second CA certificate set and the URL for the second CA enables securely transferring a private key which is not to be leaked to a third party.

Moreover, the upper apparatus 30 providing for transferring the second CA certificate set and the URL for the second CA when authenticating the lower apparatus 40 using the first CA public-key certificate for the lower apparatus enables transferring after confirming that the lower apparatus 40 is certainly a subject of the second CA certificate set intended for transferring.

Then, the upper apparatus 30 transferring the second CA certificate set and the URL for the second CA when receiving a request for communications to the URL for the first CA enables easily identifying the apparatus using a certificate set to be updated so as to update the certificate set. On the other hand, transferring when the flag for using the second CA certificate flag is ON enables even continuing communications using a first CA public-key certificate for an apparatus not needing updating by having to manage the state of the flag for using the second CA certificate.

For instance, even when having provided a second CA 20 in order to extend the key length of the public-key certificate, it is possible that a public key with the long key length cannot be delivered for the overseas user due to export restrictions. Even under these circumstances, having to turn ON the flag for using the second CA certificate as described above only for the lower apparatus 40 used by the domestic user enables easily performing automatically an operation such that the upper apparatus 30 delivers a second CA certificate set only to a lower apparatus 40 at a region without the restrictions. Moreover, while it is possible that there may be an apparatus, not provided for authenticating using a second CA certificate set, that is a old model out of the lower apparatuses 40, even in such a case, easily performing automatically an operation such as to deliver to an apparatus provided for the authentication is enabled.

It is noted that it is also possible, when a second CA certificate set may be delivered to all apparatuses communicating using a first CA certificate set, not to provide the flag for using the second CA certificate so as to provide for determining, by having received a request for communications at the address of the URL for the first URL and having succeeded in authentication, that there is a need to transfer a second CA certificate set to the communications counterpart. In this case, it can be said that whether to transfer the second CA certificate set is determined based on the address having received the first CA public-key certificate. In this way, the process of the step S407 in FIG. 22 becomes unnecessary, simplifying the process. Moreover, the address may be recognized by the IP address, the port number, or the host name, etc. as well as the URL.

Moreover, with having described in the first CA public-key certificate for the lower apparatus the country code, model information, etc., of the apparatus being the subject to be issued, referring to these information items in lieu of the flag for using the second CA certificate enables determining whether to transfer the second CA certificate set by country or by model. Furthermore, it is possible to refer to the serial number of the certificate described in the public-key certificate for the lower apparatus, or the version, the validity period or the user information of the format so as to determine whether to transfer the second CA certificate set.

Then the conditions for such determining are preferably stored as, for example, a condition table illustrated in FIG. 30. In FIG. 30, determining conditions are listed for each parameter which may become a basis for determining. They may be, for example, transferring a second CA certificate set to an apparatus having a country code "JP", transferring to an apparatus of model "1234" or "4567", transferring to an apparatus of model "1474", transferring to an apparatus having the certificate serial number no more than 1000. Then, for each of these conditions, information on whether to use in determining whether to actually transfer the second CA certificate set is described.

Then, when processing as illustrated in FIG. 22, in lieu of the determining of step S407, determining whether information on a subject apparatus to be issued that is described in the public-key certificate applies to a condition being set in the condition table as one to be used for determining whether transferring is required enables determining whether transferring the second CA certificate set is required. In the example illustrated in FIG. 30, it can be said that transferring the second CA certificate set to an apparatus having the country code of "JP" and being the model of "1234" or "4567" is required is determined.

Of course, the conditions to be described in the condition table are not limited to those illustrated in FIG. 30 such that these conditions may be combined, assigned priorities, or logically operated so as to set up complex conditions.

Moreover, it is possible to have the upper apparatus 30 store therein information on the lower apparatus 40 to be a communications counterpart or equipment-information table as illustrated in FIG. 30 that describes information on its user or a public-key certificate being stored. In this way, even when detailed information is not described in the received public-key certificate, the equipment-information table is searched with ID, etc., as a key so as to obtain detailed information regarding the lower apparatus 40 of the communications counterpart for use in determining using the condition table whether to transfer a second CA certificate set. In a case of a system configuration such that the upper apparatus 30 remotely controls the lower apparatus 40, as it may be considered that the upper apparatus 30 normally has stored therein information corresponding to a equipment-information table, preferably this table is used.

It is noted that when searching an equipment-information table, or determining based on conditions specified in the condition table whenever receiving a public-key certificate causes the process load to increase. Thus, a method of extracting in advance an apparatus fulfilling conditions predetermined in the condition table from within the equipment-information table so as to turn the flag for using the second CA certificate ON for that apparatus for determining, as described using FIG. 22, whether to transfer the second CA certificate set depending on the ON/OFF state is effective from a point of view of reducing the process load.

Furthermore for simplifying the process, it is also possible to obtain in advance at the upper apparatus 30 side, for an apparatus requiring a transfer, a second CA certificate set from the second CA 20 so as to set a certificate-setting command for setting the certificate set as a command to be transmitted to the apparatus. In this way, when the subject lower apparatus 40 requests for communications to the upper apparatus 30 and the authentication succeeds, in the process of step S404 in FIG. 22, a normal command is transmitted together with the certificate-setting command to the lower apparatus 40 for causing the commands to be executed. Therefore, as the process of steps S407 through S413 is made unnecessary, the second CA certificate set may be transferred in a process belonging to a normal transmitting/receiving process, further simplifying the process.

In this case, it may be considered that a certificate-setting command to be transmitted to an apparatus of identifying information appended in the public-key certificate received from the lower apparatus 40 being set up, determines that transferring of a second CA certificate set is necessary. It is noted that the public-key certificate received in this case being one before updating is the first CA public-key certificate for the lower apparatus.

It is noted that registering a certificate-setting command as described above may be done manually by an operator of the upper apparatus 30 or may be done automatically by the upper apparatus 30 based on predetermined rules.

As an example of the latter, for example, when automatically updating the first CA certificate set, it is possible to transfer not a new first CA certificate set but a second CA certificate set (and the URL for the second CA) so as to have the transferred certificate set updated. In this case, having received a certificate due for updating at the URL for the first URL results in determining that transferring the second CA certificate set is necessary. The flag for using the second CA certificate as described above may be used concurrently.

Even when not changing the key length, etc., of the certificate, while a process such as to automatically update a certificate having a new validity period before the validity period of the certificate currently in use expires is necessary, according to the method as described above, a certificate set of a new CA may be transferred as a part of procedures for this periodic certificate-updating process. Thus, when there is no hurry to transfer the CA certificate, such method is also effective from a point of view of simplifying the process.

Moreover, according to the method as described above, automatically updating a public-key certificate is enabled so that this method is especially effective when applied to an apparatus for transferring digital certificate for transferring a digital certificate to an apparatus for which updating of a certificate is not possible by an operator where the apparatus is installed, for example, a set-top box of a cable television, or an image-forming apparatus to be a subject of remote maintenance, and to a system for transferring digital certificate including such apparatus for transferring digital certificate.

It is noted that as a method of delivering a second CA certificate set a method of using rescue authentication information is also possible. In other words, in the process of the step S206 in FIG. 15, it is possible to determine, with the flag for using the second CA certificate, etc., from which CA a certificate set for having the lower apparatus 40 being the communications counterpart to store therein is obtained, so that when determining that transferring the second CA certificate set is necessary a certificate set for updating is obtained from the second CA 20.

Figure 32:
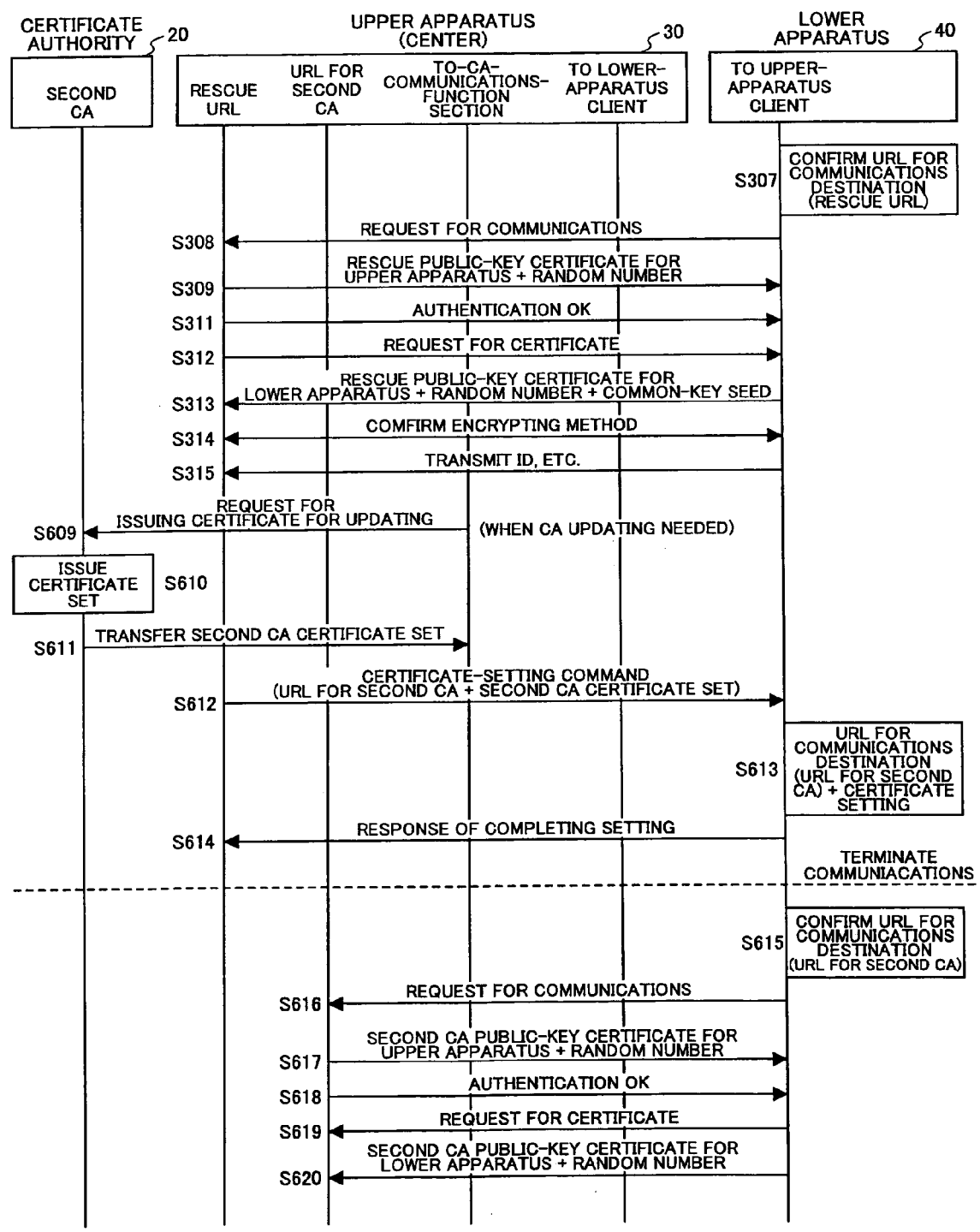
FIG. 32 is a sequence diagram illustrating an exemplary process sequence when updating the certificate set of the lower apparatus from the first CA certificate set to the second CA certificate set according to the rescue method.

A process sequence in such a case is as illustrated in FIG. 32. It is noted that FIG. 32 illustrates only a process after a request for communications to the rescue URL. Moreover, each process illustrated in this diagram is the same as the process with the same step number as one illustrated in FIG. 17 or 27 so that detailed explanations are omitted. However, with such a sequence transferring and setting to the lower apparatus 40 the second CA certificate set and the URL for the second CA are possible.

However, a method of processing as illustrated in FIGS. 22 and 24 (referred to as a multiplex method) has advantages which do not exist in a method using this rescue authentication information (referred to as a rescue method). Now FIG. 33 is used to describe this point. FIG. 33 is a diagram schematically illustrating the transition of the security level and the rescue process load when causing the lower apparatus 40 to set up the second CA certificate set using these methods.

As illustrated, when using the rescue method, for transferring a second CA certificate set to the lower apparatus 40 having to access the rescue URL from the lower apparatus 40 is assumed so that the URL for the second URL is launched while the URL for the first CA is deimplemented. Then, each lower apparatus 40, failing authentication at the normal URL (the URL for the first CA here) (not even being able to access in the first place), accesses the rescue URL so as to receive the second CA certificate set for updating the certificate. Then, after the updating, the URL for the second CA becomes a normal URL.

In this case, while the updating itself is performed swiftly, transferring the second CA certificate set is performed in a communications path having a relatively low security level using rescue authentication information. Therefore, the security level of the system overall ends up being decreased temporarily. Moreover, the load of the process in the rescue URL (the rescue process) temporarily becomes a very large one. However, a communications path using rescue authentication information is basically for emergency use so that having the large load as described above is not desirable from a point of view of system operations.

On the other hand, with the multiplex method, having no need to deimplement the URL for the first CA while launching the URL for the second CA enables having these URL's to coexist. Therefore, a second CA certificate set is transferred via a communications path with a relatively high security level using a first CA certificate set so as to make a transition to still higher security level using a second CA certificate level.

In addition, at this time, there is almost no rescue process load. While a need may arise, at the time of having deimplemented the URL for the first CA, for updating using rescue authentication information to a few apparatuses not being able to update a certificate up to that time, this point is not going to be a problem specifically if the URL for the first CA is deimplemented after setting of the second CA certificate set to most of the apparatuses. Moreover, at the URL for the first URL, as it is envisaged that numerous commands are constantly transmitted/received for the normal process, there is generally no impact even when there is an increase in load corresponding to the certificate-setting command. Furthermore, setting ON the flag for using the second CA certificate for each apparatus in staggered timing distributes the updating process load.

As described above, when receiving a first CA public-key certificate so as to determine based on that received certificate that transferring a second CA certificate set is needed, providing for transferring the certificate set to the communications counterpart enables changing the key length or the format of the digital certificate for use in authenticating without decreasing the security level or causing a burden on the processing path for emergency, so as to improve the security level, and the convenience of the system.

Also with the rescue method, the lower apparatus 40 for obtaining the certificate set for the second CA is required to perform communications three times such as: trying to access the URL for the first CA for transmitting/receiving commands and failing; accessing the rescue URL so as to obtain the URL for the certificate set for the second CA and the URL for the second CA; and accessing the URL for the second CA so as to transmit/receive commands.

On the other hand, with the multiplex method even after the URL for the second CA is launched, the URL for the first CA is accessed so as to complete transmitting/receiving commands for subsequently obtaining the certificate set for the second CA and the URL for the second CA. Therefore, it is necessary to communicate only once.

In this way, the multiplex method has also an advantage of reducing the number of times necessary for communicating for updating the certificate so as to reduce the load on the system overall.

It is noted that simultaneously providing for updating with the rescue method enables delivering the certificate set for the second CA when the lower apparatus 40 tries to communicate with the upper apparatus 30 even when updating has failed or updating was not performed during a predetermined transition period, enabling more accurately delivering to each lower apparatus 40 the certificate set for the second CA.

It is noted that while an example with the first CA 10 and the second CA 20 being configured with different hardware is described, it is also possible to use the same piece of hardware so as to configure the CAs with different pieces of software. Moreover, while the process as described above is a process especially advantageous when the first CA 10 and the second CA are different CAs, applying the process when the first CA 10 and the second CA 20 are the same CAs is not prevented.

Moreover, the process as described above may be applied when changing the root-key certificate (and the root private-key). Having to update a root key only for one of the upper apparatus 30 and the lower apparatus 40 makes confirming the validity of the public-key certification of the counterpart not possible, causing the authentication to fail. However, as described above, changing the destination of communications and providing for transmitting information identifying communications destination to be accessed using a new certificate set and a public-key certificate included therein enables securely delivering a new certificate set while being able to authenticate.

Moreover, while an example is described that requests the lower apparatus 40, when the second CA certificate set and the URL for the second CA are transferred from the upper apparatus 30 to the lower apparatus 40, for setting these items, such a process is not mandatory. Providing for performing at a minimum transferring at the upper apparatus 30 side enables also leaving the setting up to the operation of the lower apparatus 40 side.

Furthermore while an example of using the URL as information of communications destination is described, as long as this information is able to indicate the destination for transmitting a request for communications when the lower apparatus 40 communicates with the upper apparatus 30, it may be information described in other forms. For example, the IP address, etc., are possible.

Moreover here an example is described in which when there is a request for communications from the lower apparatus 40 to the upper apparatus 30 the second CA certificate set and the URL for the second CA are transferred from the upper apparatus 30 to the lower apparatus 40 in response to the communications request. While such a process is superior in terms of being applicable even when the lower apparatus 40 resides within a firewall, a configuration may be adopted such as to request for communications from the upper apparatus 30 to the lower apparatus 40 so as to transfer the certificate set and the URL. Even in this case, transferring the second CA certificate and the URL for the second CA together obtains the same advantages as those described in the above.

Moreover, it is possible to provide as separate apparatuses a portion for performing the process regarding the normal URL and a portion for performing the process regarding the rescue URL out of the functions of the upper apparatus 30. While it is preferable to provide an apparatus for collectively managing both of these processes, these processes may be set to function totally independently.

Furthermore, transferring the certificate set and communications-destination information together as a certificate package is not mandatory. In the communications system as described above, when trying to simultaneously transfer these items so as to have them updated, updating a root key for use in authentication while being able to communicate with the upper apparatus 30 is enabled, even in a case of having the lower apparatus 40 to store therein only one each of certificate set and communications-destination information item for communicating with the upper apparatus 30, so that such process is adopted. However, in a case that having to store multiple of the items as described above is possible, certificate set and the communications-destination information can be separately transferred so as to have them stored.

Moreover, in the embodiment as described above, a case is described such that authenticating using a certificate included in the second CA certificate set is enabled without updating a program regarding authenticating. However, when the algorithm for digital signature is changed or the format of the certificate is changed fundamentally (when a change is made such that the version of the certificate itself changes), updating the program for authenticating may need to be changed. Then in such a case, it is preferable to provide for transferring, in a secure communications path established using a certificate included in the first CA certificate set, also a program for performing an authentication process using a certificate included in the second CA certificate set in addition to the second CA certificate set and the URL for the second CA so as to cause the lower apparatus 40 to set them.

Furthermore, in the embodiment as described above, an example is described for a case of authenticating according to the SSL as described using FIG. 34 or 36 or one similar to such authenticating. However, this invention is advantageous even when this authentication is not necessarily done in such a manner as described in the above.

For example, TLS (Transport Layer Security), having improved on the SSL, that is also known is of course applicable when authenticating based on this protocol.

Moreover, in the embodiment as described above, while an example is described that provides the first CA 10 and the second CA 20 separately from the upper apparatus 30, providing the CAs integrally in the upper apparatus is not prevented. In this case, while components such as the CPU, the ROM, and the RAM, etc., for implementing the functions of the CA may be provided independently, using the CPU, ROM, and RAM, etc., of the upper apparatus 30 to cause the CPU to execute a suitable piece of software so as to cause the software to function as a CA is also possible.

In such a case, the communications between the CA and the upper apparatus 30 being integrated with the CA is to include an inter-process communication between the process for causing the hardware to function as a CA and the process for causing the hardware to function as the upper apparatus 30.

Furthermore, it is a matter of course that each of the variants as described above may be applied in combination as appropriate.

Moreover, the program according to the invention, causes the computer controlling the upper apparatus 30 to implement the functions as described above, and causes the computer to execute such a program obtains the advantages as described above.

While such a program may be stored in storage means such as a ROM or a HDD, etc., that is comprised in the computer from the beginning, it may also be recorded in a CD-ROM or a flexible disk being a recording medium, or an non-volatile recording medium (memory) such as a SRAM, an EEPROM, a memory card, etc., for provision. Installing in the computer the program stored in the memory so as to cause the CPU to execute the program, or reading out this program from the memory into the CPU so as to cause the CPU to execute the program enables causes each procedure as described above to be executed.

Furthermore, downloading from a piece of external equipment, being connected to a network, comprising a recording medium having recorded therein a program, the program, or downloading from a piece of external equipment having stored a program in storage means the program so as to cause the program to be executed is also possible.

The present application is based on the Japanese Priority Application No. 2004-004722 filed on Jan. 9, 2004 and Internal Priority Application No. 2004-360615 filed on Dec. 13, 2004, the entire contents of which are hereby incorporated by reference.

The invention claimed is:

1. A method of transferring digital certificates, from a digital-certificate transferring apparatus, to a communications apparatus which is a communications counterpart of the digital-certificate transferring apparatus, comprising:

authenticating the communications counterpart using a common certificate being a digital certificate without apparatus-identifying information, and transferring a normal certificate being a digital certificate with information identifying said communications counterpart to the communications counterpart when the authenticating succeeds; and receiving a first normal certificate, at an address of the digital-certificate transferring apparatus corresponding to the first normal certificate, from said communications counterpart, and when, based on said received first normal certificate, it is determined to be necessary to transfer a second normal certificate to the communications counterpart for the communications counterpart to use when communicating with the digital-certificate transferring apparatus, transferring to the communications counterpart the second normal certificate along with the information identifying the communications counterpart and an address of the digital-certificate transferring apparatus corresponding to a second normal certificate for the communications counterpart to use when communicating with the digital-certificate transferring apparatus, said second normal certificate being a different type than said first normal certificate.

2. A method of transferring digital certificates from a digital-certificate transferring apparatus to a communications apparatus which is a communications counterpart of the digital-certificate transferring apparatus, comprising:

using two types of digital certificates having different validity periods for authenticating the communications counterpart when communicating; and authenticating the communications counterpart using a long-term certificate having a longer validity period of said two types of digital certificates, and transferring a normal certificate having a shorter validity period of said two types of digital certificates to the communications counterpart when the authenticating succeeds during the validity period of said long-term certificate; and receiving a first normal certificate, at an address of the digital-certificate transferring apparatus which corresponds to the first normal certificate, from said communications counterpart, and when, based on said received first normal certificate, it is determined to be necessary to transfer a second normal certificate to the communications counterpart for the communications counterpart to use when communicating with the digital-certificate transferring apparatus, transferring to the communications counterpart the second normal certificate along with an address of the digital-certificate transferring apparatus corresponding to the second normal certificate for the communications counterpart to use when communicating with the digital-certificate transferring apparatus, said second normal certificate having a validity period shorter relative to said long-term certificate, and being different from said first normal certificate.

3. The method of transferring digital certificates as claimed in claim 1, further comprising:
determining whether to transfer said second normal certificate to said communications counterpart based on information being described in the received first normal certificate.

4. The method of transferring digital certificates as claimed in claim 1, further comprising:
determining whether to transfer said second normal certificate on said communications counterpart based on an address at which said first normal certificate is received.

5. The method of transferring digital certificate as claimed in claim 1, wherein a certification key for use in confirming the validity of said first normal certificate and a certification key for use in confirming the validity of said second normal certificate are different.

6. The method of transferring digital certificate as claimed in claim 1, further comprising:
when transferring said each one of said first normal certificate and said second normal certificate, requesting for setting the digital certificate in the communications counterpart.

7. An apparatus for transferring digital certificates to a communications apparatus which is a communications counterpart, comprising:
first transferring means for authenticating the communications counterpart using a common certificate being a digital certificate without apparatus-identifying information and transferring a normal certificate being a digital certificate with information identifying said communications counterpart to the communications counterpart when the authenticating succeeds; and
second transferring means for receiving a first normal certificate, at an address of the apparatus corresponding to the first normal certificate, from said communications counterpart, and when, based on said received first normal certificate, it is determined to be necessary to transfer a second normal certificate to the communications counterpart for the communications counterpart to use when communicating with the apparatus, transferring to the communications counterpart along with the information identifying the communications counterpart and an address of the apparatus corresponding to the second normal certificate for the communications counterpart to use when communicating with the apparatus, said second normal certificate being a different type than said first normal certificate.

8. An apparatus for transferring digital certificates to a communications apparatus which is a communications counterpart, comprising:
means for using two types of digital certificates having different validity periods for authenticating the communications counterpart when communicating;
first transferring means for authenticating the communications counterpart using a long-term certificate having a longer validity period of said two types of digital certificates, and transferring a normal certificate having a shorter validity period of said two types of digital certificates to the communications counterpart when the authenticating succeeds during the validity period of said long-term certificate; and
second transferring means for receiving a first normal certificate, at an address of the apparatus which corresponds to the first normal certificate, from said communications counterpart, and when, based on said received first normal certificate, it is determined to be necessary to transfer a second normal certificate to the communications counterpart for the communications counterpart to use when communicating with the apparatus, transferring to the communications counterpart the second normal certificate along with an address of the apparatus corresponding to the second normal certificate for the communications counterpart to use when communicating with the apparatus, said second normal certificate having a validity period shorter relative to said long-term certificate, and being different from said first normal certificate.

9. The apparatus for transferring digital certificates as claimed in claim 7, wherein said second transferring means determines whether to transfer said second normal certificate based on information described in the received first normal certificate.

10. The apparatus for transferring digital certificates as claimed in claim 7, wherein said second transferring means determines whether to transfer said second normal certificate based on an address at which said first normal certificate is received.

11. The apparatus for transferring digital certificate as claimed in claim 7, wherein a certification key for use in confirming the validity of said first normal certificate and a certification key for use in confirming the validity of said second normal certificate are different.

12. The apparatus for transferring digital certificate as claimed in claim 7, further comprising in each of said first certificate-transferring means and second certificate-transferring means:
means for, requesting when transferring each one of said first normal certificate and said second normal certificate, setting the digital certificate in the communications counterpart.

13. A system for transferring digital certificates, comprising:
a digital-certificate transferring apparatus for transferring a digital certificate to a communications apparatus; and
the communications apparatus to be a communications counterpart of the digital-certificate transferring apparatus,
the digital-certificate transferring apparatus further comprising:
first transferring means for authenticating the communications counterpart using a common certificate being a digital certificate without apparatus-identifying information and transferring a normal certificate being a digital certificate with information identifying said communications counterpart to the communications counterpart when the authenticating succeeds; and
second transferring means for receiving a first normal certificate, at an address of the apparatus corresponding to the first normal certificate, from said communications counterpart, and when, based on said received first normal certificate, it is determined to be necessary to transfer a second normal certificate to the communications counterpart for the communications counterpart to use when communicating with the apparatus, transferring to the communications counterpart along with the information identifying the communications counterpart and an address of the apparatus corresponding to the second normal certificate for the communications counterpart to use when communicating with the apparatus, said second normal certificate being a different type than said first normal certificate; and, the communications apparatus further comprising:

means for receiving each one of said first normal certificate and said second normal certificate from said certificate-transferring means so as to store the received certificate.

14. A system for transferring digital certificates, comprising:

a digital-certificate transferring apparatus for transferring a digital certificate to a communications apparatus; and the communications apparatus to be a communications counterpart of the digital-certificate transferring apparatus, the digital-certificate transferring apparatus further comprising:

means for using two types of digital certificates having different validity periods for authenticating the communications counterpart when communicating;

first transferring means for authenticating the communications counterpart using a long-term certificate having a longer validity period of said two types of digital certificates, and transferring a normal certificate having a shorter validity period of said two types of digital certificates to the communications counterpart when the authenticating succeeds during the validity period of said long-term certificate; and second transferring means for receiving a first normal certificate, at an address of the apparatus which corresponds to the first normal certificate, from said communications counterpart, and when, based on said received first normal certificate, it is determined to be necessary to transfer a second normal certificate to the communications counterpart for the communications counterpart to use when communicating with the apparatus, transferring to the communications counterpart the second normal certificate along with an address of the apparatus corresponding to the second normal certificate for the communications counterpart to use when communicating with the apparatus, said second normal certificate having a validity period shorter relative to said long-term certificate, and being different from said first normal certificate; and, the communications apparatus further comprising:

means for receiving said each one of said first normal certificate and said second normal certificate from said certificate-transferring means so as to store said received certificate.

15. A computer readable storage medium encoded with computer executable instructions, which when executed by a computer, cause the computer to function as a digital-certificate transferring apparatus for transferring a digital certificate to a communications apparatus to be a communications counterpart, comprising:

first transferring means for authenticating the communications counterpart using a common certificate being a digital certificate without apparatus-identifying information and transferring a normal certificate being a digital certificate with information identifying said communications counterpart to the communications counterpart when the authenticating succeeds; and second transferring means for receiving a first normal certificate, at an address of the apparatus corresponding to the first normal certificate, from said communications counterpart, and when, based on said received first normal certificate, it is determined to be necessary to transfer a second normal certificate to the communications counterpart for the communications counterpart to use when communicating with the apparatus, transferring to the communications counterpart along with the information identifying the communications counterpart and an address of the apparatus corresponding to the second normal certificate for the communications counterpart to use when communicating with the apparatus, said second normal certificate being a different type than said first normal certificate.

16. A computer readable storage medium encoded with computer executable instructions, which when executed by a computer, cause the computer to function as a digital-certificate transferring apparatus for transferring a digital certificate to a communications apparatus to be a communications counterpart, comprising:

means for using two types of digital certificates having different validity periods for authenticating the communications counterpart when communicating;

first transferring means for authenticating the communications counterpart using a long-term certificate having a longer validity period of said two types of digital certificates, and transferring a normal certificate having a shorter validity period of said two types of digital certificates to the communications counterpart when the authenticating succeeds during the validity period of said long-term certificate; and second transferring means for receiving a first normal certificate, at an address of the apparatus which corresponds to the first normal certificate, from said communications counterpart, and when, based on said received first normal certificate, it is determined to be necessary to transfer a second normal certificate to the communications counterpart for the communications counterpart to use when communicating with the apparatus, transferring to the communications counterpart the second normal certificate along with an address of the apparatus corresponding to the second normal certificate for the communications counterpart to use when communicating with the apparatus, said second normal certificate having a validity period shorter relative to said long-term certificate, and being different from said first normal certificate.

* * * * *